US012804663B2

(12) United States Patent
Choi et al.

(10) Patent No.: US 12,804,663 B2
(45) Date of Patent: Nov. 17, 2026

(54) METHOD AND APPARATUS FOR NETWORK CONTROLLED REPEATER IN WIRELESS COMMUNICATION SYSTEM

(71) Applicant: Samsung Electronics Co., Ltd., Suwon-si (KR)

(72) Inventors: Kyungjun Choi, Suwon-si (KR); Kyunggyu Lee, Suwon-si (KR); Seongmok Lim, Suwon-si (KR); Youngrok Jang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 548 days.

(21) Appl. No.: 18/180,774

(22) Filed: Mar. 8, 2023

(65) Prior Publication Data

US 2023/0292330 A1 Sep. 14, 2023

(30) Foreign Application Priority Data

Mar. 8, 2022 (KR) ........................ 10-2022-0029703

(51) Int. Cl.
*H04W 72/23* (2023.01)
*H04L 27/26* (2006.01)

(52) U.S. Cl.
CPC ....... *H04W 72/23* (2023.01); *H04L 27/26025* (2021.01)

(58) Field of Classification Search
CPC ......................... H04W 72/23; H04L 27/26025
See application file for complete search history.

(56) References Cited

U.S. PATENT DOCUMENTS

2012/0294225 A1 11/2012 Awad et al.
2016/0192358 A1* 6/2016 Lee ..................... H04W 74/006
2017/0288763 A1* 10/2017 Yoo .......................... H01Q 3/30
2019/0246434 A1* 8/2019 Tang ................... H04W 88/023
(Continued)

FOREIGN PATENT DOCUMENTS

WO 2021186608 A1 9/2021

OTHER PUBLICATIONS

International Search Report and Written Opinion of the International Searching Authority dated Jun. 7, 2023, in connection with International Application No. PCT/KR2023/003195, 7 pages.
(Continued)

*Primary Examiner* — Ronald B Abelson

(57) ABSTRACT

The disclosure relates to a 5G or 6G communication system for supporting a higher data transmission rate. According to an embodiment of the disclosure, a method and an apparatus for operating a repeater in a wireless communication system. According to an embodiment of the disclosure, a method performed by a repeater in a wireless communication system is provided. The method includes receiving, from a base station, a repeater control information (RCI) including information on beam via physical downlink control channel (PDCCH) or medium access control (MAC) control element (CE), receiving, from the base station, a signal, and amplifying and transmitting the amplified signal, to a user equipment (UE), based on the RCI and a subcarrier spacing for the beam, wherein the RCI includes information on time for the beam.

20 Claims, 21 Drawing Sheets

(56) References Cited

U.S. PATENT DOCUMENTS

2019/0260456 A1 8/2019 Zhou et al.
2020/0412519 A1 12/2020 Krishnaswamy et al.
2021/0409106 A1 12/2021 Ashworth et al.
2022/0045742 A1 2/2022 Abedini et al.
2022/0053486 A1 2/2022 Abedini et al.
2023/0085726 A1 3/2023 Iwabuchi et al.
2024/0205914 A1* 6/2024 Wang ........................ H04L 5/00
2024/0275658 A1* 8/2024 Li ........................ H04B 7/0695

OTHER PUBLICATIONS

Supplementary European Search Report dated Mar. 17, 2025, in connection with European Application No. 23767173.0, 10 pages.
Office Action dated Jun. 16, 2026, in connection with European Patent Application No. 23767173.0, 6 pages.
Office Action dated Sep. 24, 2026, in connection with Indian Patent Application No. 202417069370, 6 pages.

* cited by examiner

METHOD AND APPARATUS FOR NETWORK CONTROLLED REPEATER IN WIRELESS COMMUNICATION SYSTEM

CROSS-REFERENCE TO RELATED APPLICATION

This application is based on and claims priority under 35 U.S.C. § 119 to Korean Patent Application No. 10-2022-0029703, filed on Mar. 8, 2022, in the Korean Intellectual Property Office, the disclosure of which is herein incorporated by reference in its entirety.

BACKGROUND

1. Field

The disclosure relates to operations of a terminal, a base station, and a repeater in a wireless communication system, and more particularly, to a method for determining a beamforming method when a repeater operates in an amplify-forward method.

2. Description of Related Art 5G mobile communication technologies define broad frequency bands such that high transmission rates and new services are possible, and can be implemented not only in “Sub 6 GHz” bands such as 3.5 GHz, but also in “Above 6 GHz” bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G wireless communication systems are commercialized, connected devices that have been exponentially increasing will be connected to communication networks, and it is accordingly expected that enhanced functions and performances of 5G wireless communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G wireless communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next generation distributed computing technology for implementing services at levels of complexity exceeding the limit of UE operation capability by utilizing ultra-high-performance communication and computing resources.

SUMMARY

Aspects of the disclosure are to address at least the above-mentioned problems and/or disadvantages and to provide at least the advantages described below. Accordingly, an aspect of the disclosure is to provides a method and an apparatus for operating a repeater in a wireless communication system.

In accordance with an aspect of the disclosure, a method performed by a repeater in a wireless communication system is provided. The method includes receiving, from a base station, a repeater control information (RCI) including information on beam via physical downlink control channel (PDCCH) or medium access control (MAC) control element (CE), receiving, from the base station, a signal, and amplifying and transmitting the amplified signal, to a user equipment (UE), based on the RCI and a subcarrier spacing for the beam, wherein the RCI includes information on time for the beam.

In accordance with an aspect of the disclosure, a method performed by a base station in a wireless communication system is provided. The method includes transmitting, to a repeater, a repeater control information (RCI) including information on beam via physical downlink control channel (PDCCH) or medium access control (MAC) control element (CE), and transmitting, to a user equipment (UE) and/or the repeater, a signal, wherein the signal is amplified and transmitted to the UE, by the repeater, based on the RCI and a subcarrier spacing for the beam, and wherein the RCI includes information on time for the beam.

In accordance with an aspect of the disclosure, a repeater in a wireless communication system is provided. The repeater includes a transceiver, and at least one controller operably coupled to the transceiver, the at least one controller configured to receive, from a base station, a repeater control information (RCI) including information on beam via physical downlink control channel (PDCCH) or medium access control (MAC) control element (CE), receive, from the base station, a signal, and amplify and transmit the amplified signal, to a user equipment (UE), based on the RCI and a subcarrier spacing for the beam, wherein the RCI includes information on time for the beam.

In accordance with an aspect of the disclosure, a base station in a wireless communication system is provided. The base station includes a transceiver, and at least one controller operably coupled to the transceiver, the at least one controller configured to transmit, to a repeater, a repeater control information (RCI) including information on beam via physical downlink control channel (PDCCH) or medium access control (MAC) control element (CE) and transmit, to a user equipment (UE) and/or the repeater, a signal, wherein the signal is amplified and transmitted to the UE, by the repeater, based on the RCI and a subcarrier spacing for the beam, and wherein the RCI includes information on time for the beam.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
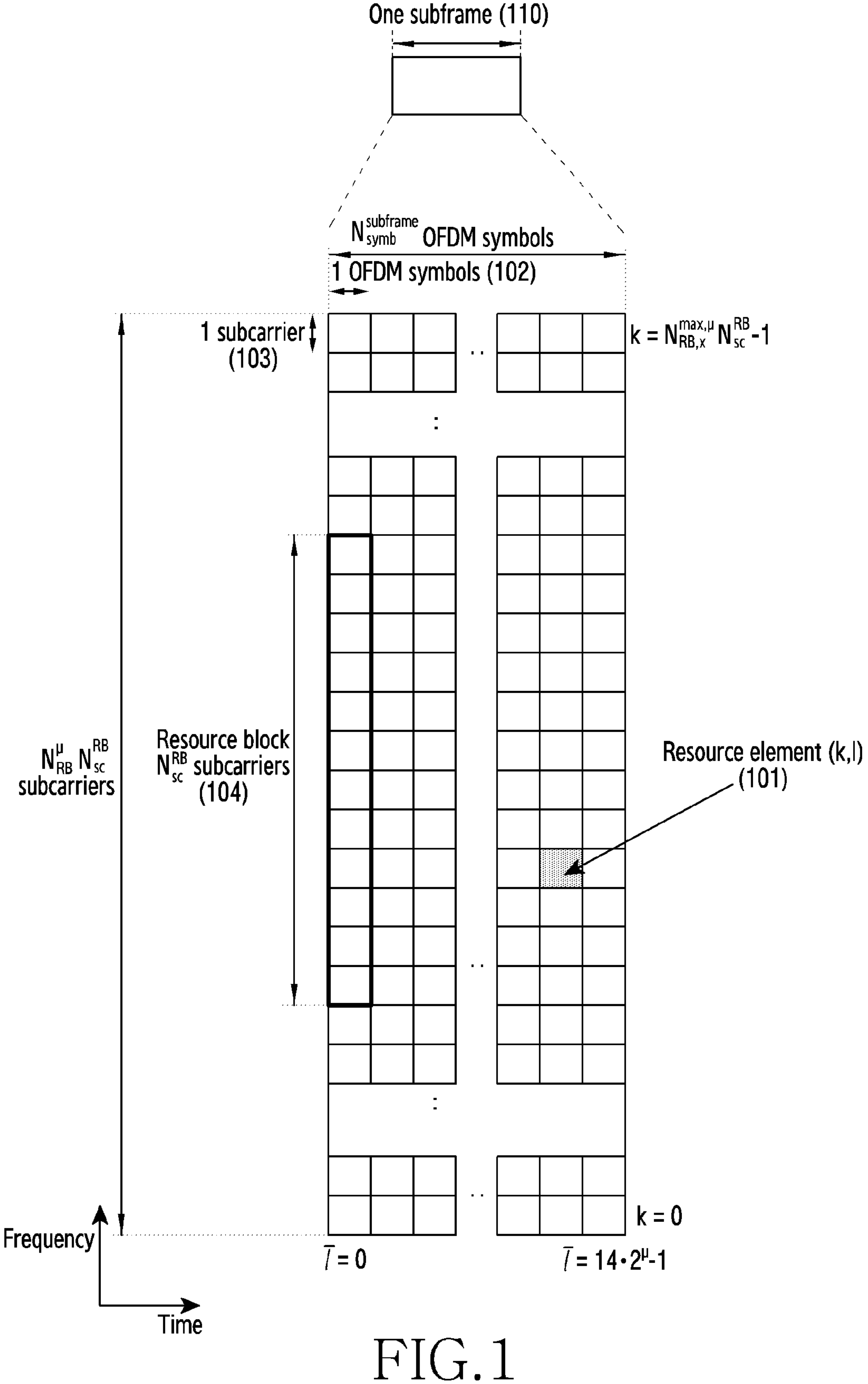
FIG. 1 illustrates a basic structure of a time-frequency area in a wireless communication system according to an embodiment of the present disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In explaining embodiments, descriptions of technology contents that are well known in the technical field to which the disclosure belongs, and are not directly related to the disclosure will be omitted. This is to convey the subject matters of the disclosure more clearly without obscuring, by omitting redundant explanations.

For the same reasons, some components in the accompanying drawings may be exaggerated, omitted, or schematically illustrated. In addition, the size of each component does not completely reflect a real size. The same reference numerals are used for the same or corresponding components in each drawing.

The advantages and features of the disclosure, and methods for achieving the same will be apparent by referring to embodiments, which will be described below in detail along with the accompanying drawings. However, the disclosure is not limited to embodiments disclosed hereinbelow, and may be embodied in many different forms. Embodiments disclosed hereinbelow are provided only to make the disclosure thorough and complete and fully convey the scope of the disclosure to those of ordinary skill in the art, and the disclosure may be defined only by the scope of the appended claims. Throughout the specification, the same reference numerals indicate the same components. In describing the disclosure, detailed descriptions of well-known functions or configurations will be omitted since they would unnecessarily obscure the subject matters of the disclosure. Also, the terms used herein are defined according to the functions of the disclosure. Thus, the terms may vary depending on users' or operators' intentions or practices. Therefore, the terms used herein should be understood based on the descriptions made herein.

A base station which will be described hereinbelow refers to an entity that performs resource allocations of a terminal, and may be at least one of a gNode B, an eNode B, a Node B, a base station (BS), a radio access unit, a base station controller, or a node over a network. A terminal may include user equipment (UE), a mobile station (MS), a cellular phone, a smartphone, a computer, or a multimedia system performing a communication function. In the disclosure, downlink (DL) refers to a wireless transmission path of a signal that a base station transmits to a terminal, and uplink (UL) refers to a wireless transmission path of a signal that a terminal transmits to a base station. In addition, a long-term evolution (LTE) or LTE-advanced (LTE-A) system will be described by way of an example, but embodiments of the disclosure may be applied to other communication systems having similar technical background or channel type. For example, a 5th generation mobile communication technology (5G, new radio (NR)) developed after LTE-A may be included therein, and 5G, which will be described below, may be a concept that includes existing LTE, LTE-A, and similar other services. In addition, embodiments of the disclosure may be applied to other communication systems through some modification within the scope without departing from the scope of the disclosure, based on determination of a person skilled in the art.

It will be understood that each block of the process flowcharts described hereinbelow and combinations of the flowcharts may be performed by computer program instructions. These computer program instructions may be loaded into a processor of a generic-purpose computer, a special computer, or other programmable data processing equipment. Therefore, the instructions performed by the processor of the computer or other programmable data processing equipment may generate a means for performing functions explained in the block(s) of the flowcharts. The computer program instructions may be stored in a computer usable or computer readable memory which is directed at a computer or other programmable data processing equipment in order to implement a function in a specific method. Accordingly, the instructions stored in the computer usable or computer readable memory may produce a manufacturing item including an instruction means for performing functions explained in the block(s) of the flowcharts. The computer program instructions may be loaded on a computer or other programmable data processing equipment. Accordingly, a series of operation steps may be performed on the computer or other programmable data processing equipment to generate a process to be executed by the computer, and the instructions performing the computer or other programmable data processing equipment may provide steps for executing functions explained in the block(s) of the flowcharts.

In addition, each block may indicate a part of a module, a segment or a code including one or more executable instructions for executing a specified logical function(s). It should be noted that, in some alternative examples, functions mentioned in blocks may be performed irrespective of an order. For example, two blocks which are successively illustrated may be performed substantially at the same time, or may be performed in the inverse order according to their corresponding functions.

The term "unit" used in the present embodiments refers to a software component or a hardware component such as a field programmable gate array (FPGA) or an application specific integrated circuit (ASIC), and the "unit" performs a certain role. However, the "unit" is not limited to software or hardware, The "unit" may be configured to exist in a storage medium which may address, and may be configured to reproduce one or more processors. For example, the "unit" may include components such as software components, object-oriented software components, class components and task components, and processes, functions, attributes, procedures, sub-routines, segments of a program code, drivers, firmware, microcode, circuit, data, database, data structures, tables, arrays, and variables. Functions provided in the components and the "units" may be coupled with fewer components and "units" or may further be divided into additional components and "units." In addition, the components and the "units" may be implemented to reproduce one or more central processing units (CPUs) in a device or a security multimedia card. In addition, in an embodiment, the "unit" may include one or more processors.

Beyond the initial function of providing a voice-oriented service, a wireless communication system is developing into a broadband wireless communication system which provides a packet data service of high-speed, high quality like communication standards, such as high speed packet access (HSPA) of 3GPP, long term evolution (LTE) or evolved universal terrestrial radio access (E-UTRA), LTE-Advanced (LTE-A), LTE-Pro, high rate packet data of 3GPP2, ultra mobile broadband (UWB), and 802.16e of IEEE.

In an LTE system, which is a representative example of the broadband wireless communication system, an orthogonal frequency division multiplexing (OFDM) scheme may be employed in downlink (DL), and a single carrier-frequency division multiple access (SC-FDMA) scheme may be employed in uplink (UL). The uplink refers to a wireless link through which a terminal (user equipment (UE) or a mobile station (MS)) transmits data or a control signal to a base station (eNode B or a base station (BS)), and the downlink refers to a wireless link through which a base station transmits data or a control signal to a terminal. In addition, the above-described multiple access schemes may assign or manage time-frequency resources for carrying and transmitting data or control information for each user not to overlap one another, that is, to establish orthogonality, and thereby distinguish data or control information of each user.

A 5G communication system which is a post-LTE communication system should support a service satisfying various requirements simultaneously so as to freely reflect various requirements of a user and a service provider. Services which are considered for the 5G communication system may include enhanced mobile broadband (eMBB), massive machine type communication (mMTC), ultra-reliability low latency communication (URLLC).

eMBB aims at providing a high data transmission speed which is more enhanced in comparison to a data transmission speed supported by existing LTE, LTE-A, or LTE-Pro. For example, in a 5G communication system, eMBB should be able to provide a peak data rate of 20 Gbps in downlink and to provide a peak data rate of 10 Gbps in uplink from the point of view of one base station. In addition, the 5G communication system should provide an increased user perceived data rate of a terminal, while providing the peak data rate. In order to meet the requirements described above, there may be a request for enhancement of various transmission and reception technologies including an enhanced multi input multi output (MIMO) transmission technology. In an LTE system, signals are transmitted by using a maximum transmission bandwidth of 20 MHz in a 20 GHz band. On the other hand, in a 5G communication system, a frequency bandwidth larger than 20 MHz is used in a frequency band of 3-6 GHz or 6 GHz or more, so that a data transmission rate required in the 5G communication system may be satisfied.

At the same time, mMTC is being considered to support an application service such as Internet of thing (IoT) in the 5G communication system. mMTC may require support of access by massive terminals within a cell, enhanced coverage of a terminal, an increased battery time, reduction in a cost of a terminal in order to provide IoT efficiently. Since IoT is attached to various sensors and various devices to provide a communication function, IoT should be able to support many terminals (for example, 1,000,000 terminals/km2) within a cell. In addition, since terminals supporting mMTC are likely to be positioned in a shaded region that is not covered by a cell, such as a basement of a building, due to characteristics of a service, the service of mMTC may require a broader coverage compared to other services provided by the 5G communication system. Since terminals supporting mMTC should be configured with low-priced terminals, and there may be difficulty in replacing a battery of a terminal frequently, there may be a need for a long battery lifetime, for example, a battery life of 10-15 years.

Lastly, URLLC is a cellular-based wireless communication service which is used for a specific purpose (mission-critical). For example, services used for remote control of a robot or a machinery, industrial automation, an unmanned aerial vehicle, remote health care, an emergency alert are being considered. Accordingly, communication provided by URLLC should provide very low latency and very high reliability. For example, services supporting URLLC should satisfy air interface latency shorter than 0.5 millisecond, and simultaneously, should satisfy requirements of a packet error rate of 10-5 or less. Accordingly, the 5G system should provide a shorter transmit time interval (TTI) than other services in order to provide a service supporting URLLC, and simultaneously, may need to meet design requirements to allocate broad resources in a frequency band in order to guarantee reliability of a communication link.

The three services considered in the 5G communication system, that is, eMBB, URLLC, mMTC, may be multiplexed in one system and may be transmitted. In this case, in order to satisfy different requirements of respective services, different transceiving techniques and transceiving parameters may be used between services. Of course, 5G is not limited to the above-described three services.

The disclosure relates to a base station controlled repeater for increasing a coverage of a base station in an NR system. A method according to an embodiment may include: as a first step, a step of receiving, from a base station, a configuration of QCL mapping information regarding a transmit QCL assumption of the base station and a transmit QCL assumption of the repeater; as a second step, a step of receiving an indication of a transmit QCL of the base station from the base station at a specific time; as a third step, a step of determining a transmit QCL assumption of the repeater at a specific time according to the transmit QCL indicated by the base station and the QCL mapping information; and, as a fourth step, a step of amplifying a signal received from the base station and forwarding the signal to a terminal, based on the determined transmit QCL assumption of the repeater.

The QCL mapping information indicates a connection relationship between a transmit QCL assumption of the base station and a transmit QCL assumption of the repeater, and may be characterized in that a transmit QCL assumption of one repeater is connected to one base station transmit QCL assumption. Accordingly, the repeater may determine a unique transmit QCL assumption of the repeater corresponding to the indicated transmit QCL assumption of the base station.

The QCL mapping information indicates a connection relationship between a transmit QCL assumption of the base station and a transmit QCL assumption of the repeater, and may be characterized in that transmit QCL assumptions of a plurality of repeaters are connected to one base station transmit QCL assumption. Accordingly, the repeater may determine transmit QCL assumptions of a plurality of repeaters corresponding to the indicated transmit QCL assumption of the base station. The second step and the third step may be changed to determine one of the transmit QCL assumptions of the plurality of repeaters as follows.

In an embodiment, the method may further include: as the second step, a step of receiving an indication of a transmit QCL of the base station of a specific time and a repeater QCL assumption selector from the base station; and, as the third step, a step of determining, by the repeater, a transmit QCL assumption of the repeater at a specific time according to the transmit QCL indicated by the base station and the QCL mapping information, and, when transmit QCLs of a plurality of repeaters are determined, determining one repeater QCL assumption based on the repeater QCL assumption selector.

In this case, the information indicated to the repeater by the base station at the second step may be transmitted through a group-common PDCCH (GC-PDCCH), and may be forwarded to the plurality of repeaters.

[NR Time-Frequency Resources]

Hereinafter, a frame structure of a 5G system will be described in detail with reference to the drawings.

FIG. 1 illustrates a basic structure of a time-frequency area in a wireless communication system according to an embodiment of the present disclosure. More specifically, FIG. 1 is a view illustrating a basic structure of a time-frequency area which is a radio resource area through which data or a control channel is transmitted in a 5G system.

The horizontal axis of FIG. 1 indicates a time area and the vertical axis indicates a frequency area. In the time and frequency areas, a basic unit of a resource may be a resource element (RE) 101, and may be defined by one orthogonal frequency division multiplexing (OFDM) symbol 102 on the time axis and one subcarrier 103 on the frequency axis.

$$N_{SC}^{RB}$$

(for example, 12) consecutive REs in the frequency area may constitute one resource block (RB) 104.

Figure 2:
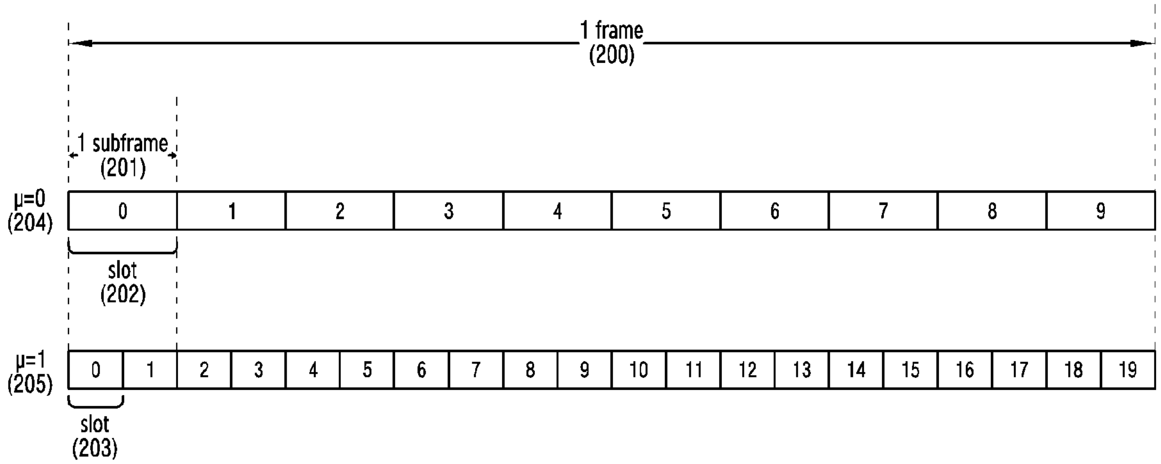
FIG. 2 illustrates structures of a frame, a subframe, a slot in a wireless communication system according to an embodiment of the present disclosure.

FIG. 2 illustrates structures of a frame, a subframe, a slot in a wireless communication system according to an embodiment of the present disclosure.

In FIG. 2, examples of structures of a frame 200, a subframe 201, a slot 202 are illustrated. One frame 200 may be defined as being 10 ms long. One subframe 201 may be defined as being 1 ms long. Accordingly, one frame 200 may be comprised of 10 subframes 201 in total. One slot 202, 203 may be defined as 14 OFDM symbols (that is, the number of symbols per one slot $$\left(N_{sym}^{slot}\right) = 14).$$

One subframe 201 may be comprised of one or a plurality of slots 202, 203, and the number of slots 202, 230 per one subframe 201 may vary according to a configuration value μ 204, 205 regarding a subcarrier spacing. In the example of FIG. 2, a case in which a subcarrier spacing configuration value μ equals 0 (204) and a case in which μ equals 1 (205) are illustrated. If μ=0 (204), one subframe 201 may be comprised of one slot 202, and, if μ=1 (205), one subframe 201 may be comprised of two slots 203. That is, the number of slots per one subframe $$\left(N_{slot}^{subframe,\mu}\right)$$

may vary according to the configuration value μ regarding the subcarrier spacing, and accordingly, the number of slots per one frame $$\left(N_{slot}^{frame,\mu}\right)$$

may vary.

$$N_{slot}^{subframe,\mu}$$

and $$N_{slot}^{frame,\mu}$$

changing according a subcarrier spacing configuration μ may be defined as shown in table 1 presented below:

TABLE 1

| μ | $N_{sym}^{slot}$ | $N_{slot}^{frame, u}$ | $N_{slot}^{subframe, u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Hereinafter, a bandwidth part (BWP) configuration in a 5G communication system will be described in detail with reference to the drawings.

Figure 3:
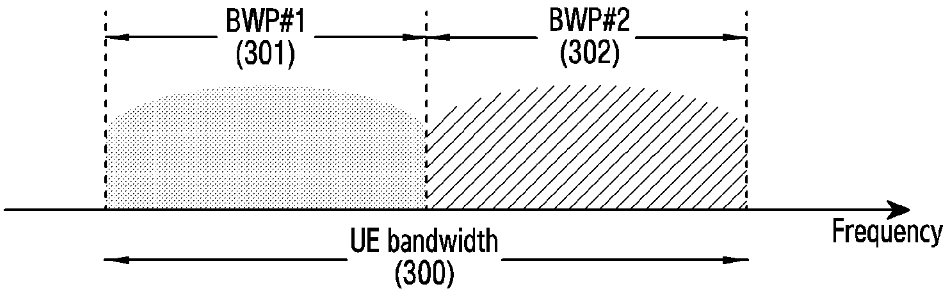
FIG. 3 illustrates an example of a bandwidth part configuration in a wireless communication system according to an embodiment of the present disclosure.

FIG. 3 illustrates an example of a BWP configuration in a wireless communication system according to an embodiment of the present disclosure.

FIG. 3 shows an example in which a UE bandwidth 300 is configured to two bandwidth parts, that is, a bandwidth part #1 (BWP #1) 301 and a bandwidth part #2 (BWP #2) 302. A base station may configure one or a plurality of bandwidth parts for a terminal, and information shown in table 2 may be configured for each bandwidth part.

TABLE 2

| | |
|---|---|
| BWP ::= | SEQUENCE { |
| bwp-Id (bandwidth part identifier) | BWP-Id, |
| locationAndBandwidth (bandwidth part location ) | INTEGER (1..65536), |
| subcarrierSpacing (subcarrier spacing) | ENUMERATED {n0, n1, n2, n3, n4, n5}, |
| cyclicPrefix (cyclic prefix) | ENUMERATED { extended } |
| } | |

Of course, the configuration of the bandwidth part is not limited by table 2. Various parameters related to the bandwidth part may be configured for the terminal in addition to configuration information of table 2. The configuration information may be forwarded to the terminal by the base station through a higher layer signaling, for example, a radio resource control (RRC) signaling. At least one bandwidth part of the configured one or plurality of bandwidth parts may be activated. Activation or inactivation of the configured bandwidth part may be semi-statically forwarded from the base station to the terminal through the RRC signaling or may be dynamically forwarded through downlink control information (DCI). According to an embodiment, before RRC connected, the terminal may receive a configuration of an initial BWP for initial access from the base station through a master information block (MIB). More specifically, at an initial access step, the terminal may receive, through the MIB, configuration information regarding a control resource set (CORESET) and a search space through which a PDCCH for receiving system information (remaining system information (RMSI) or system information block 1 (SIB 1)) necessary for initial access is transmitted. The CORESET and the search space configured by the MIB may be regarded as an identity (ID) 0, respectively. The base station may notify the terminal of configuration information regarding CORESET #0, such as frequency allocation information, time allocation information, numerology, through the MIB. In addition, the base station may notify the terminal of a monitoring period of CORESET #0 and configuration information regarding an occasion, that is, configuration information regarding search space #0, through the MIB. The terminal may regard a frequency area configured as CORESET #0, which is obtained from the MIB, as an initial bandwidth part for initial access. In this case, the identity (ID) of the initial bandwidth part may be regarded as 0.

According to an embodiment of the disclosure, a configuration regarding a bandwidth part supported in 5G may be used for various purposes.

According to an embodiment, when a bandwidth supported by the terminal is smaller than a system bandwidth, the small bandwidth may be supported through the configuration of the bandwidth part described above. For example, the base station configures a frequency location (configuration information 2) of a bandwidth part for the terminal, such that the terminal may transceiver data at a specific frequency location within the system bandwidth.

In addition, according to an embodiment, the base station may configure a plurality of bandwidth parts for the terminal for the purpose of supporting different numerologies. For example, in order to support data transceiving using a subcarrier spacing of 15 kHz and a subcarrier spacing of 30 kHz for a certain terminal, two bandwidth parts may be configured by subcarrier spacings of 15 kHz and 30 kHz, respectively. Frequency division multiplexing may be performed with respect to the different bandwidth parts, and, when data is to be transceived at a specific subcarrier spacing, a bandwidth part configured by the corresponding subcarrier spacing may be activated.

In addition, according to an embodiment, the base station may configure bandwidth parts having bandwidths of different sizes for the terminal for the purpose of reducing power consumption of the terminal. For example, when the terminal supports a very large bandwidth, for example, a bandwidth of 100 MHz, and always transceives data in the corresponding bandwidth, vary high power consumption may occur. In particular, unnecessarily monitoring a downlink control channel in a large bandwidth of 100 MHz in a situation without traffic may be inefficient in terms of power consumption. The base station may configure a bandwidth part of a relatively small bandwidth, for example, a bandwidth part of 20 MHz, for the terminal for the purpose of reducing power consumption of the terminal. The terminal may perform a monitoring operation in the bandwidth part of 20 MHz in a situation without traffic, and, when data occurs, may transceive data in a bandwidth part of 100 MHz according to an instruction of the base station.

According to an embodiment of the disclosure, in a method of configuring a bandwidth part, terminals before RRC connected may receive configuration information regarding an initial bandwidth part through a MIB at an initial access step. More specifically, the terminal may receive a configuration of a CORESET for a downlink control channel, through which DCI for scheduling a system information block (SIB) is transmitted, from an MIB of a physical broadcast channel (PBCH). A bandwidth of the CORESET configured by the MIB may be regarded as an initial bandwidth part, and the terminal may receive a physical downlink shared channel (PDSCH), through which the SIB is transmitted, through the configured initial bandwidth part. The initial bandwidth part may be utilized for other system information (OSI), paging, random access, in addition to the purpose of receiving the SIB.

[BWP Change]

When one or more bandwidth parts are configured for the terminal, the base station may indicate a change (or switch or shift) of the bandwidth part to the terminal by using a bandwidth part indicator field in DCI. For example, when a currently activated bandwidth part of the terminal is a bandwidth part #1 301 in FIG. 3, the base station may indicate a bandwidth part #2 302 to the terminal with a bandwidth part indicator in DCI, and the terminal may change a bandwidth part to the bandwidth part #2 302 as indicated by the bandwidth part indicator in the received DCI.

Since the DCI-based bandwidth part change is indicated by DCI for scheduling a PDSCH or PUSCH as described above, the terminal may be able to smoothly receive or transmit the PDSCH or PUSCH scheduled by the corresponding DCI in the changed bandwidth part when receiving a request for change of the bandwidth part. To achieve this, standards prescribe requirements regarding a delay time (TBWP) required when a bandwidth part is changed, and for example, the requirements may be defined as shown in table 3 presented below:

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

[Note 1]Depends on UE capability.

Note 2: If the BWP switch involves changing of SCS, the BWP switch delay is determined by the larger one between the SCS before BWP switch and the SCS after BWP switch.

The requirements on the bandwidth part change delay time support a type 1 or a type 2 according to capability of the terminal. The terminal may report a supportable bandwidth part delay time type to the base station.

According to the requirements on the bandwidth part change delay time described above, when the terminal receives DCI including a bandwidth part change indicator at a slot n, the terminal may complete changing to a new bandwidth part indicated by the bandwidth part change indicator at a time that is not later than slot n+TBWP, and may perform transceiving on a data channel scheduled by the corresponding DCI in the changed new bandwidth part. When the base station intends to schedule a data channel in the new bandwidth part, the base station may determine time domain resource assignment on the data channel by considering the bandwidth part change delay time (TBWP) of the terminal. That is, when the base station schedules a data channel in the new bandwidth part, the base station may schedule the corresponding data channel after the bandwidth part change delay time in determining time domain resource assignment on the data channel. Accordingly, the terminal may not expect that DCI indicating the bandwidth part change indicates a smaller slot offset (K0 to K2) value than the bandwidth change delay time (TBWP).

If the terminal receives DCI indicating a bandwidth part change (for example, DCI format 1_1 or 0_1), the terminal may not perform any transmission or reception during a time interval from a third symbol of a slot which receives a PDCCH including the corresponding DCI to a start point of a slot indicated by a slot offset (K0 or K2) value indicated by a time domain resource assignment indicator field in the corresponding DCI. For example, when the terminal receives DCI indicating a bandwidth part change at a slot n and a slot offset value indicated by the corresponding DCI is K, the terminal may not perform any transmission or reception from a third symbol of the slot n to a symbol before slot n+K (that is, a last symbol of slot n+K−1).

[SS/PBCH Block]

Hereinbelow, a synchronization signal (SS)/PBCH block in 5G will be described.

The SS/PBCH block may refer to a physical layer channel block which is comprised of a primary SS (PSS), a secondary SS (SSS), and a PBCH, which are as follows:

- PSS: This is a signal that is used as a reference for downlink time/frequency synchronization, and provides partial information of a cell ID;
- SSS: This is used as a reference for downlink time/frequency synchronization, and provides other information of the cell ID that is not provided by the PSS. Additionally, this signal may perform a role of a reference signal for demodulating a PBCH;
- PBCH: This provides essential system information necessary for transceiving a data channel of the terminal and a control channel of the terminal. The essential system information may include search space-related control information indicating radio resource mapping information of a control channel, and scheduling information regarding a separate data channel for transmitting system information; and
- SS/PBCH block: The SS/PBCH block is comprised of a combination of the PSS, SSS, PBCH. One or a plurality of SS/PBCH blocks may be transmitted within 5 ms, and each of the SS/PBCH blocks transmitted may be identified by an index.

The terminal may detect a PSS and an SSS and may decode a PBCH at an initial access step. An MIB may be obtained from the PBCH, and CORESET #0 (which is a CORESET of a CORESET index 0) may be configured therefrom. The terminal may monitor the CORESET #0 on the assumption that the selected SS/PBCH block and a demodulation reference signal (DMRS) transmitted through the CORESET #0 have a quasi co location (QCL) relationship. The terminal may receive system information through downlink control information transmitted on the CORESET #0. The terminal may acquire configuration information related to a random access (RACH) necessary for initial access from the received system information. The terminal may transmit a physical RACH (PRACH) to the base station by considering the index of the selected SS/PBCH, and the base station which receives the PRACH may obtain information regarding the SS/PBCH block index selected by the terminal. The base station may know what block is selected by the terminal from the SS/PBCH blocks, and that the terminal monitors the CORESET #0 associated with the selected block.

[PDCCH: Related to DCI]

Hereinbelow, DCI in a 5G system will be described in detail.

In the 5G system, scheduling information regarding uplink data (or a physical uplink shared channel (PUSCH)) or downlink data (or a physical downlink shared channel (PDSCH)) may be forwarded from the base station to the terminal through DCI. The terminal may monitor a DCI format for fallback and a DCI format for non-fallback with respect to the PUSCH or PDSCH. The DCI format for fallback may be constituted by a fixed field that is predefined between the base station and the terminal, and the DCI format for non-fallback may include a configurable field.

The DCI may be transmitted through a physical downlink control channel (PDCCH) after undergoing through a channel coding and modulation process. A cyclic redundancy check (CRC) may be attached to a DCI message payload, and the CRC may be scrambled into a radio network temporary identifier (RNTI) which corresponds to an identity of the terminal. Different RNTIs may be used according to a purpose of the DCI message, for example, UE-specific data transmission, a power control command or a random access response, etc. That is, the RNTI is not explicitly transmitted and is transmitted while being included in a CRC calculation process. When the DCI message transmitted on the PDCCH is received, the terminal may identify the CRC by using an allocated RNTI, and, when a result of identifying the CRC matches, the terminal may know that the corresponding message is transmitted to the terminal.

For example, DCI for scheduling a PDSCH on system information (SI) may be scrambled into an SI-RNTI. DCI for scheduling a PDSCH for a random access response (PAR) message may be scrambled into an RA-RNTI. DCI for scheduling a PDSCH for a paging message may be scrambled into a P-RNTI. DCI for notifying a slot format indicator (SFI) may be scrambled into an SFI-RNTI. DCI for notifying transmit power control (TPC) may be scrambled into a TPC-RNTI. DCI for scheduling a UE-specific PDSCH or PUSCH may be scrambled into a cell-RNTI (C-RNTI).

A DCI format 0_0 may be used as fallback DCI for scheduling the PDSCH, and in this case, the CRC may be scrambled into the C-RNTI. The DCI format 0_0 in which the CRC is scrambled into the C-RNTI may include information shown in table 4 presented below:

TABLE 4

| |
|---|
| Identifier for DCI formats - [1] bit |
| Frequency domain resource assignment -[$\lceil \log_2(N_{RB}^{UL,BWP}(N_{RB}^{UL,BWP}+1)/2)\rceil$] bits |
| Time domain resource assignment - X bits |
| Frequency hopping flag - 1 bit. |
| Modulation and coding scheme - 5 bits |
| New data indicator - 1 bit |
| Redundancy version - 2 bits |
| HARQ process number - 4 bits |
| Transmit power control (TPC) command for scheduled PUSCH - [2] bits |
| Uplink/ supplementary uplink (UL/SUL) indicator - 0 or 1 bit |

A DCI format 0_1 may be used as non-fallback DCI for scheduling the PUSCH, and in this case, the CRC may be scrambled into the C-RNTI. The DCI format 0_1 in which the CRC is scrambled into the C-RNTI may include information shown in table 5 presented below:

TABLE 5

| |
|---|
| Carrier indicator - 0 or 3 bits |
| UL/SUL indicator - 0 or 1 bit |
| Identifier for DCI formats - [1] bits |
| Bandwidth part indicator - 0, 1 or 2 bits |
| Frequency domain resource assignment |
| For resource allocation type 0, $\lceil N_{RB}^{UL,BWP}/P\rceil$ bits |
| For resource allocation type 1, $\lceil \log_2(N_{RB}^{UL,BWP}(N_{RB}^{UL,BWP}+1$ bits |
| Time domain resource assignment –1, 2, 3, or 4 bits |
| Virtual resource block (VRB)-to-physical resource block (PRB) mapping - 0 or 1 bit, only for resource allocation type 1. |
| 0 bit if only resource allocation type 0 is configured; |
| 1 bit otherwise. |
| Frequency hopping flag - 0 or 1 bit, only for resource allocation type 1. |
| 0 bit if only resource allocation type 0 is configured; |
| 1 bit otherwise. |
| Modulation and coding scheme - 5 bits |
| New data indicator - 1 bit |
| Redundancy version - 2 bits |
| HARQ process number - 4 bits |
| 1st downlink assignment index - 1 or 2 bits |
| 1 bit for semi-static HARQ-ACK codebook; |
| 2 bits for dynamic HARQ-ACK codebook with single HARQ-ACK codebook. |
| 2nd downlink assignment index - 0 or 2 bits |
| 2 bits for dynamic HARQ-ACK codebook with two HARQ-ACK sub-codebooks; |
| 0 bit otherwise. |
| TPC command for scheduled PUSCH - 2 bits |
| SRS resource indicator – $\left\lceil \log_2\left(\sum_{k=1}^{L_{max}}\binom{N_{SRS}}{k}\right)\right\rceil$ or $\lceil \log_2(N_{SRS})\rceil$ bits |
| $\left\lceil \log_2\left(\sum_{k=1}^{L_{max}}\binom{N_{SRS}}{k}\right)\right\rceil$ bits for non-codebook based PUSCH transmission; |
| $\lceil \log_2(N_{SRS})\rceil$ bits for codebook based PUSCH transmission. |
| Precoding information and number of layers up to 6 bits |
| Antenna ports - up to 5 bits |
| SRS request - 2 bits |
| CSI request - 0, 1, 2, 3, 4, 5, or 6 bits |
| Code block group (CBG) transmission information - 0, 2, 4, 6, or 8 bits |
| Phase tracking reference signal (PTRS)-demodulation reference signal (DMRS) association - 0 or 2 bits. |
| beta_offset indicator - 0 or 2 bits |
| DMRS sequence initialization - 0 or 1 bit |

A DCI format 0_1 may be used as fallback DCI for scheduling the PDSCH, and in this case, the CRC may be scrambled into the C-RNTI. The DCI format 0_1 in which the CRC is scrambled into the C-RNTI may include information shown in table 6 presented below.

TABLE 6

| |
|---|
| Identifier for DCI formats - [1] bit |
| Frequency domain resource assignment - [$\lceil \log_2(N_{RB}^{DL,BWP}(N_{RB}^{DL,BWP}+1)/2)\rceil$ ] bits |
| Time domain resource assignment - X bits |
| VRB-to-PRB mapping - 1 bit. |
| Modulation and coding scheme - 5 bits |
| New data indicator - 1 bit |
| Redundancy version - 2 bits |
| HARQ process number - 4 bits |
| Downlink assignment index - 2 bits |
| TPC command for scheduled PUCCH - [2] bits |
| Physical uplink control channel (PUCCH) resource indicator- 3 bits |
| PDSCH-to-HARQ feedback timing indicator- [3] bits |

A DCI format 1_1 may be used as non-fallback DCI for scheduling the PDSCH, and in this case, the CRC may be scrambled into the C-RNTI. The DCI format 1_1 in which the CRC is scrambled into the C-RNTI may include information shown in table 7 presented below.

TABLE 7

| |
|---|
| Carrier indicator - 0 or 3 bits |
| Identifier for DCI formats - [1] bits |
| Bandwidth part indicator - 0, 1 or 2 bits |
| Frequency domain resource assignment |
| For resource allocation type 0, $\lceil N_{RB}^{DL,BWP} / P \rceil$ bits |
| For resource allocation type 1, $\lceil \log_2 (N_{RB}^{DL,BWP}(N_{RB}^{DL,BWP} + 1) / 2 \rceil$ bits |
| Time domain resource assignment -1, 2, 3, or 4 bits |
| VRB-to-PRB mapping - 0 or 1 bit, only for resource allocation type 1. |
| 0 bit if only resource allocation type 0 is configured; |
| 1 bit otherwise. |
| Physical resource block (PRB) bundling size indicator- 0 or 1 bit |
| Rate matching indicator - 0, 1, or 2 bits |
| Zero power channel state information (ZP CSI)-reference signal (RS) trigger- 0, 1, or 2 bits |
| For transport block 1: |
| Modulation and coding scheme - 5 bits |
| New data indicator - 1 bit |
| Redundancy version - 2 bits |
| For transport block 2: |
| Modulation and coding scheme - 5 bits |
| New data indicator - 1 bit |
| Redundancy version - 2 bits |
| HARQ process number - 4 bits |
| Downlink assignment index - 0 or 2 or 4 bits |
| TPC command for scheduled PUCCH - 2 bits |
| PUCCH resource indicator - 3 bits |
| PDSCH-to-HARQ_feedback timing indicator - 3 bits |
| Antenna ports - 4, 5 or 6 bits |
| Transmission configuration indication- 0 or 3 bits |
| SRS request - 2 bits |
| CBG transmission information - 0, 2, 4, 6, or 8 bits |
| Code block group (CBG) flushing out information- 0 or 1 bit |
| DMRS sequence initialization - 1 bit |

[PDCCH: CORESET, REG, CCE, Search Space]

Hereinbelow, a downlink control channel in a 5G communication system will be described in detail with reference to the drawings.

Figure 4:
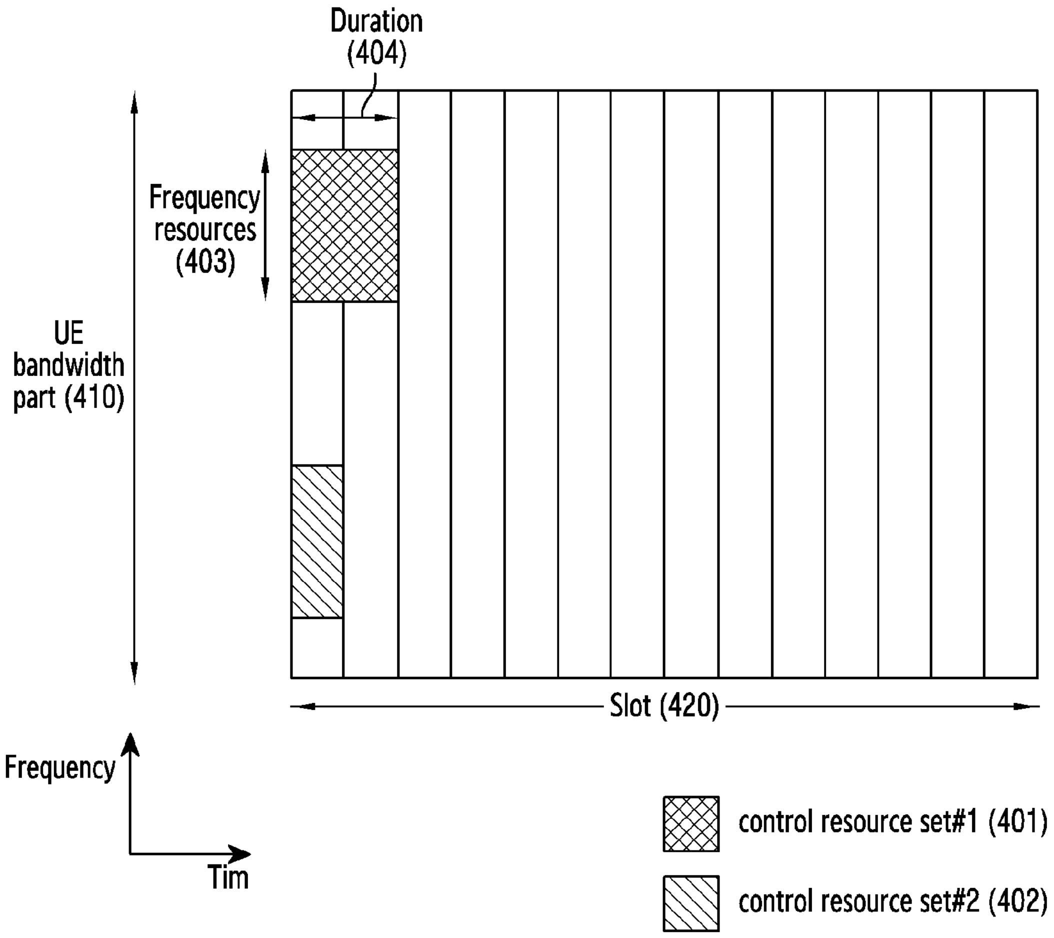
FIG. 4 illustrates an example of a configuration of a control resource set of a downlink control channel in a wireless communication system according to an embodiment of the present disclosure.

FIG. 4 illustrates an example of a CORESET through which a downlink control channel is transmitted in a 5G wireless communication system. FIG. 4 illustrates an example in which a bandwidth part of a terminal (UE bandwidth part) 410 is configured on a frequency axis and two CORESETs (CORESET #1 401, CORESET #2 402) are configured within one slot 420 on a time axis. The CORESET 401, 402 may be configured in a specific frequency resource 403 within the whole UE bandwidth part 410 on the frequency axis. One or a plurality of OFDM symbols may be configured on the time axis, and may be defined as a control resource set duration 404. Referring to the example shown in FIG. 4, the CORESET #1 401 may be configured by a control resource set duration of two symbols, and the CORESET #2 402 may be configured by a control resource set duration of one symbol.

In 5G described above, the CORESET may be configured for the terminal by the base station through a higher layer signaling (for example, system information, a master information block (MIB), a radio resource control (RRC) signaling). Configuring the CORESET for the terminal refers to providing information such as a CORESET identity, a frequency location of the CORESET, and a symbol length of the CORESET, etc. For example, the information may include information of table 8 presented below:

TABLE 8

```
ControlResourceSet ::=                    SEQUENCE {
    -- Corresponds to L1 parameter 'CORESET-ID'
    controlResourceSetId                  ControlResourceSetId,
  (CORESET Identity)
    frequencyDomainResources               BIT STRING (SIZE (45)),
  (Frequency axis resource assignment information)
    duration                              INTEGER (1..maxCoReSetDuration),
  (Time axis resource assignement information)
    cce-REG-MappingType                          CHOICE {
  (CCE-to-REG Mapping Scheme)
      interleaved                          SEQUENCE {
        reg-BundleSize                     ENUMERATED {n2, n3, n6},
    (REG Budle Size)
        precoderGranularity                  ENUMERATED {sameAsREG-
      bundle, allContiguousRBs},
        interleaverSize                    ENUMERATED {n2, n3, n6}
        (Interleaver Size)
        shiftIndex
        INTEGER(0..maxNrofPhysicalResourceBlocks-1)
        OPTIONAL
        (Interleaver Shift)
    },
```

TABLE 8-continued

```
nonInterleaved                    NULL
  },
  tci-StatesPDCCH                   SEQUENCE(SIZE (1..maxNrofTCI-
    StatesPDCCH)) OF TCI-StateId        OPTIONAL,
(QCL Configuration Information)
  tci-PresentInDCI                ENUMERATED {enabled}
                                  OPTIONAL,   -- Need S
}
```

In table 8, tci-StatesPDCCH (simply, referred to as transmission configuration indication (TCI) state) configuration information may include information of one or a plurality of SS/PBCH block indexes which have a QCL relationship with a DMRS transmitted in a corresponding CORESET, or channel state information reference signal (CSI-RS) index.

Figure 5:
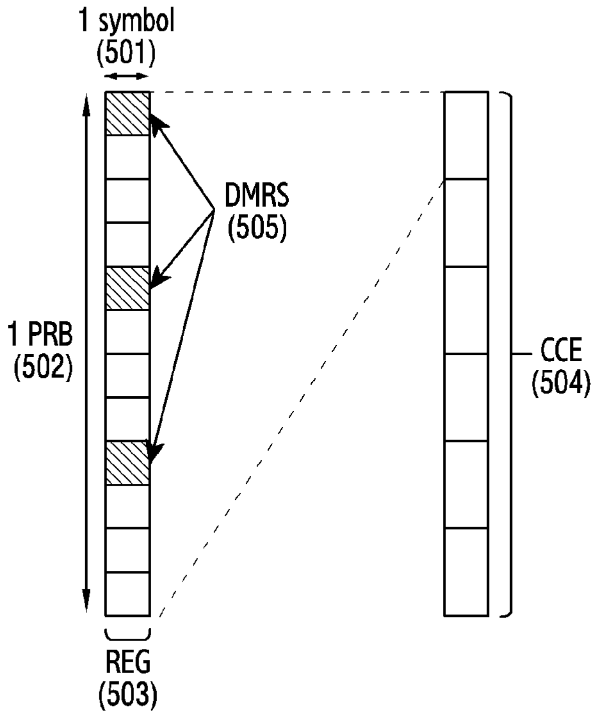
FIG. 5 illustrates a structure of a downlink control channel in a wireless communication system according to an embodiment of the present disclosure.

FIG. 5 illustrates an example of a basic unit of time and frequency resources constituting a downlink control channel to be used in 5G. Referring to FIG. 5, a basic unit of time and frequency resources constituting a control channel may be a resource element group (REG) 503, and the REG 503 may be defined by one OFDM symbol 501 on the time axis and one physical resource block (PRB) 502, that is, 12 subcarriers, on the frequency axis. The base station may constitute a downlink control channel allocation unit by concatenating the REG 503.

As shown in FIG. 5, when a basic unit for allocating a downlink control channel in 5G is a control channel element (CCE) 504, one CCE 504 may include a plurality of REGs 503. Explaining the REG 503 shown in FIG. 5 by way of an example, the REG 503 may include 12 REs, and, when one CCE 504 includes 6 REGs 503, one CCE 504 may include 72 REs. When a downlink CORESET is configured, the corresponding area may be comprised of a plurality of CCEs 504 and a specific downlink control channel may be mapped onto one or a plurality of CCEs 504 according to an aggregation level (AL) in the CORESET, and may be transmitted. The CCEs 504 in the CORESET may be identified by numbers, and in this case, the numbers of the CCEs 504 may be assigned according to a logical mapping method.

The basic unit of the downlink control channel shown in FIG. 5, that is, the REG 503, may include REs to which DCI is mapped, and areas where a DMRS 505 which is a reference signal for decoding the REs is mapped. As shown in FIG. 5, three DMRSs 505 may be transmitted within one REG 503. The number of CCEs necessary for transmitting a PDCCH may be 1, 2, 4, 8, 16 according to an aggregation level (AL), and different numbers of CCEs may be used for implementing link adaption of the downlink control channel. If AL=L, one downlink control channel may be transmitted through L CCEs. The terminal may detect a signal without knowing information on the downlink control channel, and a search space indicating a set of CCEs is defined for blind decoding. The search space may be a set of downlink control channel candidates which are comprised of CCEs that the terminal may try to decode on a given aggregation level, and, since there are various aggregation levels to make one group with 1, 2, 4, 8, 16 CCEs, the terminal may have a plurality of search spaces. The set of search spaces may be defined as a set of search spaces on all aggregation levels configured.

The search space may be divided into a common search space and a UE-specific search space. Terminals of a certain group or all terminals may scan a common search space of a PDCCH in order to receive control information common to cells, such as dynamic scheduling on system information or a paging message. For example, PDSCH scheduling assignment information for transmitting an SIB including information of a cell operator may be received by scanning the common search space of the PDCCH. Since terminals of a certain group or all terminals may receive a PDCCH in the case of the common search space, the common search space may be defined as a set of pre-arranged CCEs. Scheduling assignment information regarding a UE-specific PDSCH or PUSCH may be received by scanning the UE-specific search space of the PDCCH. The UE-specific search space may be defined as being UE-specific according to an identity of the terminal and a function of various system parameters.

In 5G, the parameter regarding the search space for the PDCCH may be configured for the terminal by the base station through a higher layer signaling (for example, an SIB, an MIB, an RRC signaling). For example, the base station may configure the number of PDCCH candidates at each aggregation level L, a period for monitoring a search space, a monitoring occasion of a symbol unit within a slot for a search space, a search space type (common search space or UE-specific search space), a combination of a DCI format and an RNTI which are to be monitored in a corresponding search space, a CORESET index for monitoring a search space for the terminal. For example, configuration information may include information shown in table 9 presented below.

TABLE 9

```
SearchSpace ::=                                  SEQUENCE {
    -- Identity of the search space. SearchSpaceId = 0 identifies the
        SearchSpace configured via PBCH (MIB) or
        ServingCellConfigCommon.
    searchSpaceId                                  SearchSpaceId,
  (Search Space Identity)
    controlResourceSetId                           ControlResourceSetId,
  (CORESET Identity)
    monitoringSlotPeriodicityAndOffset               CHOICE {
  (Monitoring slot level period)
        sl1                                          NULL,
        sl2                                          INTEGER (0..1),
        sl4                                          INTEGER (0..3),
        sl5                                        INTEGER (0..4),
```

TABLE 9-continued

| | |
|---|---|
| sl8 | INTEGER (0..7), |
| sl10 | INTEGER (0..9), |
| sl16 | INTEGER (0..15), |
| sl20 | INTEGER (0..19) |
| } | |
| | OPTIONAL, |
| duration(Monitoring duration) | INTEGER (2..2559) |
| monitoringSymbolsWithinSlot | BIT STRING (SIZE (14)) OPTIONAL, |
| (Monitoring symbol within slot) | |
| nrofCandidates | SEQUENCE { |
| (Number of PDCCH candidates at each aggregation level) | |
| aggregationLevel1 | ENUMERATED {n0, n1, n2, |
| n3, n4, n5, n6, n8}, | ENUMERATED {n0, n1, n2, |
| aggregationLevel2 | |
| n3, n4, n5, n6, n8}, | ENUMERATED {n0, n1, n2, |
| aggregationLevel4 | |
| n3, n4, n5, n6, n8}, | ENUMERATED {n0, n1, n2, |
| aggregationLevel8 | |
| n3, n4, n5, n6, n8}, | ENUMERATED {n0, n1, n2, |
| aggregationLevel16 | |
| n3, n4, n5, n6, n8} | |
| }, | |
| searchSpaceType | CHOICE { |
| (Search space type) | |
| -- Configures this search space as common search space (CSS) and DCI formats to monitor. | |
| common | SEQUENCE { |
| (Common search space) | |
| } | |
| ue-Specific | SEQUENCE { |
| (UE-specific search space) | |
| -- Indicates whether the UE monitors in this USS for DCI formats 0-0 and 1-0 or for formats 0-1 and 1-1. | |
| formats | ENUMERATED {formats0-0- |
| And-1-0, formats0-1-And-1-1}, | |
| ... | |
| } | |

According to configuration information, the base station may configure one or a plurality of search space sets for the terminal. According to some embodiments, the base station may configure a search space set 1 and a search space set 2 for the terminal. A DCI format A which is scrambled into an X-RNTI in the search space set 1 may be configured to be monitored in a common search space, and a DCI format B which is scrambled into a Y-RNTI in the search space set 2 may be configured to be monitored in a UE-specific search space.

According to configuration information, there may exist one or a plurality of search space sets in the common search space or the UE-specific search space. For example, a search space set #1 and a search space set #2 may be configured as common search spaces, and a search space set #3 and a search space set #4 may be configured as UE-specific search spaces.

In the common search space, a combination of a DCI format and an RNTI as described below may be monitored. The disclosure is not limited to the following example:

- DCI format 0_0/1_0 with CRC scrambled by C-RNTI, CS-RNTI, SP-CSI-RNTI, RA-RNTI, TC-RNTI, P-RNTI, SI-RNTI;
- DCI format 2_0 with CRC scrambled by SFI-RNTI;
- DCI format 2_1 with CRC scrambled by INT-RNTI;
- DCI format 2_2 with CRC scrambled by TPC-PUSCH-RNTI, TPC-PUCCH-RNTI; and
- DCI format 2_3 with CRC scrambled by TPC-SRS-RNTI.

In the UE-specific search space, a combination of a DCI format and an RNTI as described below may be monitored. The disclosure is not limited to the following example:

- DCI format 0_0/1_0 with CRC scrambled by C-RNTI, CS-RNTI, TC-RNTI; and
- DCI format 1_0/1_1 with CRC scrambled by C-RNTI, CS-RNTI, TC-RNTI.

The specified RNTIs may conform to the following definitions and purposes:

- C-RNTI (Cell RNTI): For the purpose of UE-specific PDSCH scheduling;
- TC-RNTI (Temporary Cell RNTI): For the purpose of UE-specific PDSCH scheduling;
- CS-RNTI(Configured Scheduling RNTI): For the purpose of semi-statically configured UE-specific PDSCH scheduling;
- RA-RNTI (Random Access RNTI): For the purpose of PDSCH scheduling at a random access step;
- P-RNTI (Paging RNTI): For the purpose of scheduling a PDSCH through which paging is transmitted;
- SI-RNTI (System Information RNTI): For the purse of scheduling a PDSCH through which system information is transmitted;
- INT-RNTI (Interruption RNTI): For the purpose of informing about puncturing on a PDSCH;
- TPC-PUSCH-RNTI (Transmit Power Control for PUSCH RNTI): For the purpose of indicating a power adjustment command regarding a PUSCH;
- TPC-PUCCH-RNTI (Transmit Power Control for PUCCH RNTI): For the purpose of indicating a power adjustment command regarding a PUCCH; and
- TPC-SRS-RNTI (Transmit Power Control for SRS RNTI): For the purpose of indicating a power adjustment command regarding an SRS.

The specified DCI formats described above may be defined as shown in table 1 presented below.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space of an aggregation level L in a CORESET p, a search space set s may be expressed by Equation 1 presented below:

$$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\left\lfloor\frac{N_{CCE,p}}{L}\right\rfloor\right\}+i \qquad \text{[Equation 1]}$$

L: Aggregation level;

$n_{CI}$: Carrier index;

$N_{CCE,p}$: Total number of CCEs existing in a CORESET p;

$-n^{\mu}_{s,f}$: Slot index, $-M^{(L)}_{s,max}$: Number of PDCCH candidates of aggregation level $L$;

$-m_{s,n_{CI}}=0, \ldots, M^{(L)}_{s,max}-1$: PDCCH candidate index of aggregation level $L$;

i=0, . . . , L−1;

$$-Y_{p,n^{\mu}_{s,f}}=\left(A_p\cdot Y_{p,n^{\mu}_{s,f}-1}\right)\bmod D,\ Y_{p,-1}=N_{RNTI}\neq 0,$$
$$A_p=39827 \text{ for } p \bmod 3=0,\ A_p=39829 \text{ for } p \bmod 3=1,$$
$$A_p=39839 \text{ for } p \bmod 3=2,\ D=65537;$$

$n_{RNTI}$: Terminal identifier; and $Y_{p,n^{\mu}_{s,f}}$ may correspond to 0 in the case of a common search space.

$Y_{p,n^{\mu}_{s,f}}$ may correspond to a value that changes according to an identity of a terminal (C-RNTI or an ID configured for the terminal by the base station), and a time index in the case of a UE-specific search space.

As a plurality of search space sets in 5G are configurable by different parameters (for example, parameters of table 9), a set of search space sets which are monitored by the terminal may vary every time they are monitored. For example, when a search space set #1 is configured by an X-slot period and a search space set #2 is configured as a Y-slot period, and X and Y are different, the terminal may monitor all of the search space set #1 and the search space set #2 at a specific slot, or may monitor one of the search space set #1 and the search space set #2 at a specific slot.

[PDCCH: BD/CCE Limit]

When a plurality of search space sets are configured for the terminal, the following conditions may be considered in a method of determining a search space set that the terminal may monitor.

If the terminal receives a configuration of a value of monitoringCapabilityConfig-r16 which is a higher layer signaling as r15monitoringcapability, the terminal may define maximum values regarding the number of PDCCH candidates that the terminal may monitor, and the number of CCEs constituting a whole search space (herein, the whole search space refers to a universal set of CCEs corresponding to a union area of the plurality of search space sets) for every slot, and, if the value of monitoringCapabilityConfig-r16 is configured by r16monitoringcapability, the terminal may define maximum values regarding the number of PDCCH candidates that the terminal may monitor, and the number of CCEs constituting a whole search space (herein, the whole search space refers to a universal set of CCEs corresponding to a union area of the plurality of search space sets) for every span.

[Condition 1: Limit to the Maximum Number of PDCCH Candidates]

When the maximum number of PDCCH candidates that the terminal may monitor, $M^{\mu}$, is defined with reference to a slot in a cell configured by a subcarrier spacing of $15\cdot 2^{\mu}$ kHz according to the configuration value of the higher layer signaling as described above, table 11 presented below may be applied, and, when $M^{\mu}$ is defined with reference to a span, table 12 presented below may be applied.

TABLE 11

| μ | Maximum number of PDCCH candidates per slot and per serving cell ($M^{\mu}$) |
|---|---|
| 0 | 44 |
| 1 | 36 |
| 2 | 22 |
| 3 | 20 |

TABLE 12

| μ | Maximum number $M^{\mu}$ of monitored PDCCH candidates per span for combination (X, Y) and per serving cell | | |
|---|---|---|---|
| | (2, 2) | (4, 3) | (7, 3) |
| 0 | 14 | 28 | 44 |
| 1 | 12 | 24 | 36 |

[Condition 2: Limit to the Maximum Number of CCEs]

When the maximum number of CCEs constituting a whole search space (herein, the whole search space refers to a universal set of CCEs corresponding to an union area of a plurality of search space sets), $C^\mu$, is defined with reference to a slot in a cell configured by a subcarrier spacing of $15 \cdot 2^\mu$ kHz according to the configuration value of the higher layer signaling described above, table 13 presented below may be applied, and, when $C^\mu$ is defined with reference to a span, table 14 presented below may be applied.

TABLE 13

| μ | Maximum number of non-overlapped CCEs per slot and per serving cell ($C^\mu$) |
|---|---|
| 0 | 56 |
| 1 | 56 |
| 2 | 48 |
| 3 | 32 |

TABLE 14

| μ | Maximum number $C^\mu$ of non-overlapped CCEs per span for combination (X, Y) and per serving cell | | |
|---|---|---|---|
| | (2, 2) | (4, 3) | (7, 3) |
| 0 | 18 | 36 | 56 |
| 1 | 18 | 36 | 56 |

For convenience of explanation, a case in which both the conditions 1, 2 described above are satisfied at a specific time is defined as a "condition A." Accordingly, if the condition A is not satisfied, it means that at least one of the conditions 1, 2 is not satisfied.

[PDCCH: Overbooking]

At a specific time, the condition A may not be satisfied according to a configuration of search space sets of the base station. When the condition A is not satisfied at a specific time, the terminal may select only some of search space sets configured to satisfy the condition A at the corresponding time, and may monitor the same, and the base station may transmit a PDCCH via the selected search space sets.

As a method of selecting some search spaces from the whole search space sets configured, the following method may be applied.

When the condition A regarding a PDCCH is not satisfied at a specific time (slot), the terminal (or the base station) may select a search space set that is configured as a common search space among the search space sets existing at the corresponding time, in preference to a search space set that is configured as a UE-specific search space.

When all of the search space sets configured as common search spaces are selected (that is, when the condition A is satisfied even after all of the search spaces configured as common search spaces are selected), the terminal (or base station) may select the search space sets that are configured as UE-specific search spaces. In this case, when there are a plurality of search space sets that are configured as UE-specific search spaces, a search space set that has a low search space set index may have a higher priority. Considering the priority, UE-specific search space sets may be selected with a range in which the condition A is satisfied.

[Regarding Rate Matching/Puncturing]

Hereinafter, a rate matching operation and a puncturing operation will be described in detail.

When a time and frequency resource A for transmitting a certain symbol sequence A overlaps a certain time and frequency resource B, a rate matching or puncturing operation may be considered as a transceiving operation of a channel A which considers a resource C where the resource A and the resource B overlap each other. The rate matching and puncturing operations will be described in detail hereinbelow.

Rate Matching Operation

Among all resources A for transmitting a symbol sequence A to the terminal, the base station may map a channel A only onto the other resource areas except for a resource C corresponding to an overlapping area with a resource B, and may transmit the channel A. For example, when the symbol sequence A is comprised of {symbol #1, symbol #2, symbol #3, symbol #4} and the resources A are {resource #1, resource #2, resource #3, resource #4} and the resource B is {resource #3, resource #5}, the base station may map the symbol sequence A onto the other resources {resource #1, resource #2, resource #4} except for {resource #3} corresponding to the resource C among the resources A in sequence, and may transmit the symbol sequence A. As a result, the base station may map the symbol sequence {symbol #1, symbol #2, symbol #3} to {resource #1, resource #2, resource #4}, respectively, and may transmit the symbol sequence.

The terminal may determine the resources A and the resources B based on scheduling information regarding the symbol sequence A obtained from the base station, and may determine the resource C which is an overlapping area between the resources A and the resources B. The terminal may receive the symbol sequence A on the assumption that the symbol sequence A is mapped onto the other areas except for the resource C among all of the resources A. For example, when the symbol sequence A is comprised of {symbol #1, symbol #2, symbol #3, symbol #4} and the resources A are {resource #1, resource #2, resource #3, resource #4} and the resources B are {resource #3, resource #5}, the terminal may receive on assumption that the symbol sequence A is mapped onto the other resources {resource #1, resource #2, resource #4} except for {resource #3} corresponding to the resource C among the resources A in sequence. As a result, the terminal may perform a series of subsequent receiving operations on the assumption that the symbol sequence {symbol #1, symbol #2, symbol #3} are mapped onto {resource #1, resource #2, resource #4}, respectively.

Puncturing Operation

When there is the resource C corresponding to the overlapping area with the resource B among all of the resources A for transmitting the symbol sequence A to the terminal, the base station may map the symbol sequence A onto all of the resources A, but may not perform transmission in the resource area corresponding to the resource A, and may perform transmission only in the other resource areas except for the resource C among the resources A. For example, when the symbol sequence A is comprised of {symbol #1, symbol #2, symbol #3, symbol #4} and the resources A are {resource #1, resource #2, resource #3, resource #4} and the resources B are {resource #3, resource #5}, the base station may map the symbol sequence {symbol #1, symbol #2, symbol #3, symbol #4} onto the resources A {resource #1, resource #2, resource #3, resource #4}, respectively, and may transmit only the symbol sequence {symbol #1, symbol #2, symbol #4} corresponding to the other resources {resource #1, resource #2, resource #4} except for {resource #3} corresponding the resource C among the resources A, and may not transmit {symbol #3} mapped onto {resource #3} corresponding the resource C. As a result, the base station may map the symbol sequence {symbol #1, symbol

#2, symbol #4} onto {resource #1, resource #2, resource #4}, respectively, and may transmits the symbol sequence.

The terminal may determine the resources A and the resources B based on scheduling information regarding the symbol sequence A obtained from the base station. Through this, the terminal may determine the resource C which is the overlapping area between the resources A and the resources B. The terminal may receive the symbol sequence A on the assumption that the symbol sequence A is mapped onto all of the resources A but is transmitted only in the other areas except for the resource C among the resource areas A. For example, when the symbol sequence A is comprised of {symbol #1, symbol #2, symbol #3, symbol #4} and the resources A are {resource #1, resource #2, resource #3, resource #4} and the resources B are {resource #3, resource #5}, the terminal may assume that the symbol sequence A {symbol #1, symbol #2, symbol #3, symbol #4} are mapped onto the resources A {resource #1, resource #2, resource #3, resource #4}, respectively, but {symbol #3} mapped onto {resource #3} corresponding the resource C is not transmitted, and may receive on the assumption that the symbol sequence {symbol #1, symbol #2, symbol #4} corresponding to the other resources {resource #1, resource #2, resource #4} except for {resource #3} corresponding the resource C among the resources A are mapped and transmitted. As a result, the terminal may perform a series of subsequent receiving operations on the assumption that the symbol sequence {symbol #1, symbol #2, symbol #4} is mapped onto {resource #1, resource #2, resource #4}, respectively and is transmitted.

Hereinbelow, a method of configuring rate matching resources for the purpose of rate matching in a 5G communication system will be described. Rate matching refers to adjusting a size of a signal by considering an amount of resources capable of transmitting the signal. For example, rate matching of a data channel may refer to mapping a data channel to a specific time and frequency resource area but not transmitting, and adjusting a size of data accordingly.

Figure 6:
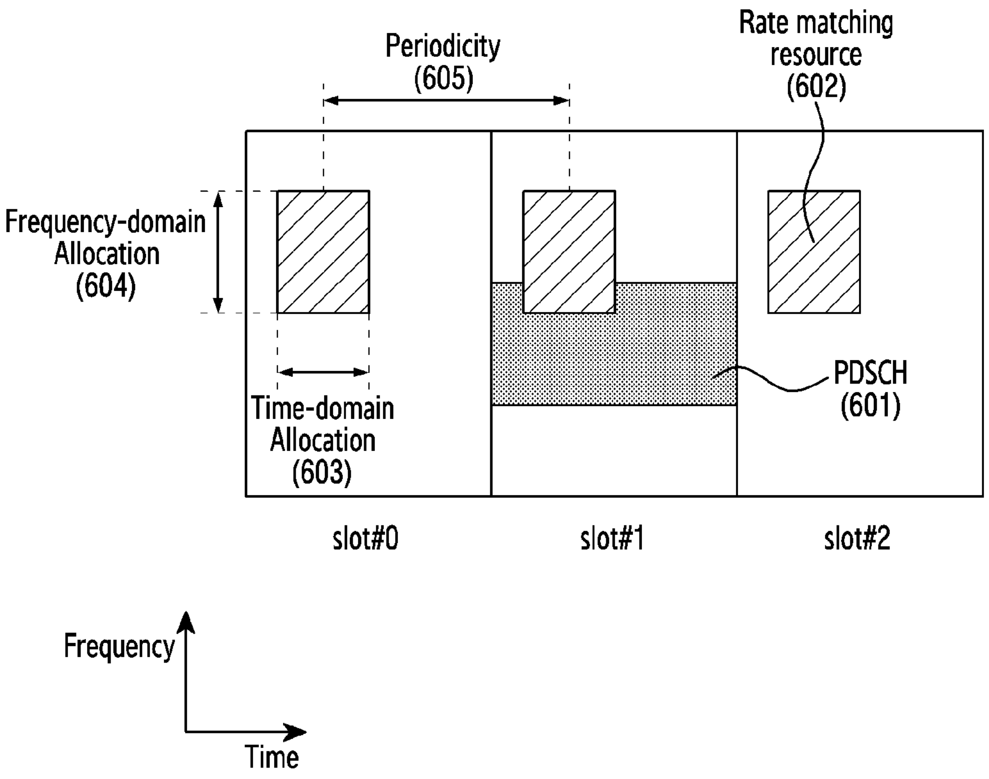
FIG. 6 illustrates a method for a base station and a terminal to transceiver data by considering a downlink data channel and a rate matching resource in a wireless communication system according to an embodiment of the present disclosure.

FIG. 6 illustrates a method of transceiving data in a base station and a terminal by considering a downlink data channel and a rate matching resource.

In FIG. 6, a downlink data channel (PDSCH) 601 and a rate matching resource 602 are illustrated. The base station may configure one or a plurality of rate matching resources 602 for the terminal through a higher layer signaling (for example, an RRC signaling). Configuration information of the rate matching resource 602 may include time-axis resource allocation information 603, frequency-axis resource allocation information 604, and periodicity information 605. In the following descriptions, a bitmap corresponding to the frequency-axis resource allocation information 604 will be referred to as a "first bit map," a bit map corresponding to the time-axis resource allocation information 603 will be referred to as a "second bit map," and a bit map corresponding to the periodicity information 605 will be referred to as a "third bit map." When all or a part of the time and frequency resources of the scheduled data channel 601 overlaps the configured rate matching resource 602, the base station may rate-match the data channel 601 in the rate matching resource 602 part, and may transmit the data channel 601. The terminal may receive and decode on the assumption that the data channel 601 is rate-matched in the rate matching resource 602 part.

The base station may dynamically notify, through DCI, the terminal of whether to rate-match the data channel in the configured rate matching resource part through an additional configuration (corresponding to a "rate matching indicator" in the above-described DCI format). Specifically, the base station may select some of the configured rate matching resources, and may group the selected rate matching resources to a rate matching resource group, and may indicate, to the terminal through DCI, whether the data channel is rate-matched with each rate matching resource group by using a bit map method. For example, when four rate matching resources, PMR #1, PRM #2, PRM #3, PMR #4, are configured, the base station may configure RMG #1={RMR #1, RMR #2}, RMG #2={RMR #3, RMR #4} as rate matching groups, and may indicate, to the terminal through a bit map, whether rate matching is performed for RMG #1 and RMG #2 by using 2 bits in a DCI field. For example, when rate matching is needed, the base station may indicate "1," and, when rate matching is not needed, the base station may indicate "0."

As a method of configuring the above-described rate matching resources for the terminal in 5G, granularity of "RB symbol level" and "RE level" is supported in 5G. More specifically, the following configuration method may be performed.

RB Symbol Level

The terminal may receive a configuration of a maximum of 4 pieces of RateMatchPattern for every bandwidth part through a higher layer signaling, and one piece of RateMatchPattern may include the following contents:

As a reserved resource in a bandwidth part, a resource in which a time and frequency resource area of the corresponding reserved resource is configured in a combination of a bit map of an RB level and a bit map of a symbol level on the frequency axis may be included. The reserved resources may span over one or two slots. A time domain pattern (periodicityAndPattern) in which a time and frequency domain comprised of a bitmap pair of an RB level and a symbol level is repeated may be additionally configured; and Time and frequency domain resource areas configured as CORESETs within the BWP and resource areas corresponding to a time domain pattern configured as a search space configuration in which the corresponding resource areas are repeated may be included.

RE Level

The terminal may receive a configuration regarding the following contents through a higher layer signaling:

As configuration information (lte-CRS-ToMatchAround) regarding an RE corresponding to an LTE CRS (cell-specific reference signal or common reference signal) pattern, the number of ports of LTE CRS (nrofCRS-Ports) and an LTE-CRS-vshift(s) value (v-shift), center subcarrier location information (carrierFreqDL) of an LTE carrier from a frequency point which is used as a reference (for example, reference point A), bandwidth size (carrierBandwidthDL) information of the LTE carrier, subframe configuration information (mbsfn-SubframeConfigList) corresponding to a multicast-broadcast single-frequency network (MBSFN) may be included. The terminal may determine a location of the CRS in an NR slot corresponding to an LTE subframe, based on the above-described information; and Configuration information regarding a resource set corresponding to one or a plurality of zero power (ZP) CSI-RSs in a bandwidth part may be included.

[Regarding LTE CRS Rate Match]

Hereinbelow, a rate matching process regarding the above-described LTE CRS will be described in detail. For the sake of coexistence of long term evolution (LTE) and new RAT (NR) (LTE-NR coexistence), the NR provides a function of configuring a pattern of a cell specific reference signal (CRS) of LTE for an NR terminal. More specifically, the CRS pattern may be provided by an RRC signaling which includes at least one parameter within ServingCell-Config information element (IE) or ServingCellConfigCommon IE. For example, the parameter may include lte-CRS-ToMatchAround, lte-CRS-PatternList1-r16, lte-CRS-PatternList2-r16, crs-RateMatch-PerCORESETPoolIndex-r16.

Rel-15 NR provides a function of configuring one CRS pattern per serving cell through the lte-CRS-ToMatchAround parameter. In Rel-16 NR, the above-described function may be extended to allow a plurality of CRS patterns to be configured per serving cell. More specifically, in a single-transmission and reception point (TRP) configuration terminal, one CRS pattern may be configured per one LTE carrier, and, in a multi-TRP configuration terminal, two CRS patterns may be configured per one LTE carrier. For example, in the single-TRP configuration terminal, a maximum of three CRS patterns may be configured per serving cell through the lte-CRS-PatternList1-r16 parameter. In another example, in the multi-TRP configuration terminal, a CRS may be configured per TRP. That is, a CRS pattern for TRP1 may be configured through the lte-CRS-PatternList1-r16 parameter, and a CRS pattern for TRP2 may be configured through the lte-CRS-PatternList2-r16 parameter. When the two TRPs are configured as above-described, it may be determined whether all of the CRS patterns of TRP1 and TRP2 are applied to a specific PDSCH or whether only the CRS pattern on one TRP is applied, through the crs-RateMatch-PerCORESETPoolIndex-r16 parameter. If the crs-RateMatch-PerCORESETPoolIndex-r16 parameter is configured as being enabled, only the CRS pattern of one TRP may be applied. In other cases, the CRS patterns of the two TRPs are all applied.

Table 15 illustrates ServingCellConfig IE including the above-described CRS pattern, and table 16 illustrates RateMatchPatternLTE-CRS IE including at least one parameter regarding the CRS pattern.

TABLE 15

```
ServingCellConfig ::=                    SEQUENCE {
   tdd-UL-DL-ConfigurationDedicated TDD-UL-DL-ConfigDedicated
OPTIONAL, -- Cond TDD
   initialDownlinkBWP                    BWP-DownlinkDedicated              OPTIONAL, --
Need M
   downlinkBWP-ToReleaseList               SEQUENCE (SIZE (1..maxNrofBWPs)) OF BWP-Id
OPTIONAL, -- Need N
   downlinkBWP-ToAddModList                  SEQUENCE (SIZE (1..maxNrofBWPs)) OF BWP-
Downlink                          OPTIONAL, -- Need N
   firstActiveDownlinkBWP-Id               BWP-Id                          OPTIONAL, -- Cond
SyncAndCellAdd
   bwp-InactivityTimer                   ENUMERATED {ms2, ms3, ms4, ms5, ms6, ms8, ms10,
ms20, ms30,

                              ms40,ms50, ms60, ms80,ms100, ms200,ms300, ms500,
                              ms750, ms1280, ms1920, ms2560, spare10, spare9, spare8,
                              spare7, spare6, spare5, spare4, spare3, spare2, spare1 } OPTIONAL, --
Need R
   defaultDownlinkBWP-Id                  BWP-Id                        OPTIONAL, -- Need S
   uplinkConfig                       Uplink Config                  OPTIONAL, -- Need M
   supplementaryUplink                   Uplink Config                  OPTIONAL, -- Need M
   pdcch-ServingCellConfig                SetupRelease { PDCCH-ServingCellConfig }
OPTIONAL, -- Need M
   pdsch-ServingCellConfig                SetupRelease { PDSCH-ServingCellConfig }
OPTIONAL, -- Need M
   csi-MeasConfig                      SetupRelease { CSI-MeasConfig             OPTIONAL, --
Need M
   sCellDeactivationTimer                 ENUMERATED {ms20, ms40, ms80, ms160, ms200,
ms240,
                              ms320, ms400, ms480, ms520, ms640, ms720,
                              ms840, ms1280, spare2,spare1}   OPTIONAL, -- Cond
ServingCellWithoutPUCCH
   crossCarrierSchedulingConfig   CrossCarrierSchedulingConfig
OPTIONAL, -- Need M
   tag-Id                          TAG-Id,
   dummy                           ENUMERATED {enabled}               OPTIONAL, -- Need R
   pathlossReferenceLinking               ENUMERATED {spCell, sCell }
OPTIONAL, -- Cond SCellOnly
servingCellMO                         MeasObjectId                  OPTIONAL, -- Cond MeasObject
   ...,
   [[
   lte-CRS-ToMatchAround                  SetupRelease { RateMatchPatternLTE-CRS }
OPTIONAL, -- Need M
   rateMatchPatternToAddModList   SEQUENCE (SIZE (1..maxNrofRateMatchPatterns))
OF RateMatchPattern   OPTIONAL, -- Need N
   rateMatchPatternToReleaseList   SEQUENCE (SIZE (1..maxNrofRateMatchPatterns))
OF RateMatchPatternId   OPTIONAL, -- Need N
   downlinkChannelBW-PerSCS-List   SEQUENCE (SIZE (1..maxSCSs)) OF SCS-
SpecificCarrier                      OPTIONAL -- Need S
   ]],
   [[
   supplementaryUplink Release   ENUMERATED {true}                         OPTIONAL, --
Need N
   tdd-UL-DL-ConfigurationDedicated-IAB-MT-r16 TDD-UL-DL-ConfigDedicated-IAB-
MT-r16                           OPTIONAL, -- Cond TDD_IAB
```

TABLE 15-continued

```
  dormantBWP-Config-r16                    SetupRelease { DormantBWP-Config-r16 }
OPTIONAL, -- Need M
  ca-SlotOffset-r16                    CHOICE {
    refSCS15kHz                        INTEGER (-2..2),
    refSCS30KHz                        INTEGER (-5..5),
    refSCS60KHz                        INTEGER (-10..10),
    refSCS120KHz                       INTEGER (-20..20)
  }                                            OPTIONAL, -- Cond AsyncCA
  channelAccessConfig-r16                  SetupRelease { ChannelAccessConfig-r16 }
OPTIONAL, -- Need M
  intraCellGuardBandsDL-List-r16   SEQUENCE (SIZE (1..maxSCSs)) OF
IntraCellGuardBandsPerSCS-r16   OPTIONAL, -- Need S
  intraCellGuardBandsUL-List-r16   SEQUENCE (SIZE (1..maxSCSs)) OF
IntraCellGuardBandsPerSCS-r16   OPTIONAL, -- Need S
  csi-RS-ValidationWith-DCI-r16   ENUMERATED {enabled}
OPTIONAL, -- Need R
  lte-CRS-PatternList1-r16                 SetupRelease { LTE-CRS-PatternList-r16 }
OPTIONAL, -- Need M
  lte-CRS-PatternList2-r16                 SetupRelease { LTE-CRS-PatternList-r16 }
OPTIONAL, -- Need M
  crs-RateMatch-PerCORESETPoolIndex-r16 ENUMERATED {enabled}
OPTIONAL, -- Need R
  enableTwoDefaultTCI-States-r16   ENUMERATED {enabled}
OPTIONAL, -- Need R
  enableDefaultTCI-StatePerCoresetPoolIndex-r16 ENUMERATED {enabled}
OPTIONAL, -- Need R
  enableBeamSwitchTiming-r16   ENUMERATED {true}                              OPTIONAL,
-- Need R
  cbg-TxDiffTBsProcessingType1-r16 ENUMERATED {enabled}
OPTIONAL, -- Need R
  cbg-TxDiffTBsProcessingType2-r16 ENUMERATED {enabled}
OPTIONAL -- Need R
  ]]
}
```

TABLE 16

RateMatchPatternLTE-CRS
The IE RateMatchPatternLTE-CRS is used to configure a pattern to rate match around LTE CRS. See TS 38.214, clause 5.1.4.2.

RateMatchPatternLTE-CRS information element

```
-- ASN1START
-- TAG-RATEMATCHPATTERNLTE-CRS-START
RateMatchPatternLTE-CRS ::=            SEQUENCE {
  carrierFreqDL                    INTEGER (0..16383),
  carrierBandwidthDL                 ENUMERATED {n6, n15, n25, n50, n75, n100, spare2, spare1},
  mbsfn-SubframeConfigList             EUTRA-MBSFN-SubframeConfigList
OPTIONAL, -- Need M
  nrofCRS-Ports                    ENUMERATED {n1, n2, n4},
  v-Shift                        ENUMERATED {n0, n1, n2, n3, n4, n5}
}
LTE-CRS-PatternList-r16 ::=            SEQUENCE (SIZE (1..maxLTE-CRS-Patterns-r16)) OF
RateMatchPatternLTE-CRS
-- TAG-RATEMATCHPATTERNLTE-CRS-STOP
-- ASN1STOP
```

RateMatchPatternLTE-CRS field descriptions carrierBandwidthDL
BW of the LTE carrier in number of PRBs (see TS 38.214, clause 5.1.4.2).
carrierFreqDL
Center of the LTE carrier (see TS 38.214, clause 5.1.4.2).
mbsfn-SubframeConfigList
LTE MBSFN subframe configuration (see TS 38.214, clause 5.1.4.2).
nrofCRS-Ports
Number of LTE CRS antenna port to rate-match around (see TS 38.214, clause 5.1.4.2).
v-Shift
Shifting value v-shift in LTE to rate match around LTE CRS (see TS 38.214, clause 5.1.4.2).

[PDSCH: Regarding Frequency Resource Allocation]

Figure 7:
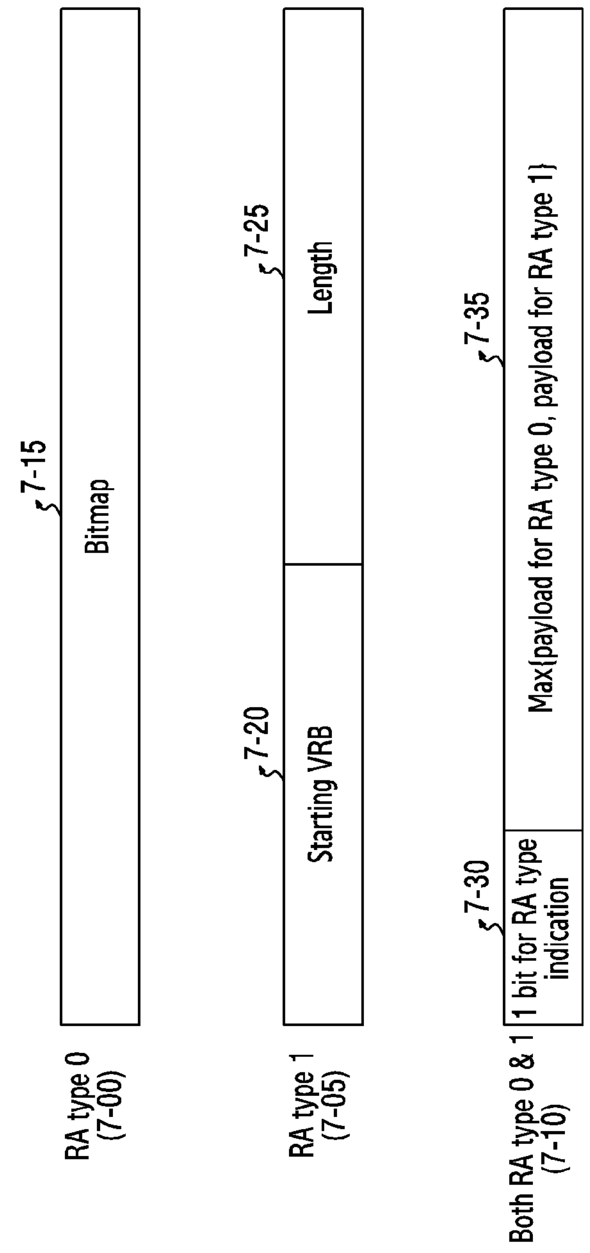
FIG. 7 illustrates an example of frequency axis resource allocation of a PDSCH in a wireless communication system according to an embodiment of the present disclosure.

FIG. 7 illustrates an example of frequency-axis resource allocation of a PDSCH in a wireless communication system according to an embodiment of the disclosure.

FIG. 7 illustrates three frequency-axis resource allocation methods including a type 0 7-00, a type 1 7-05, and a dynamic switch 7-10 which are configurable through a higher layer in an NR wireless communication system.

Referring to FIG. 7, if the terminal is configured to use only a resource type 0 through a higher layer signaling (7-00), some pieces of DCI for allocating the PDSCH to the corresponding terminal include a bitmap comprised of NRBG bits. A condition for this will be described later. In this case, NRBG refers to the number of resource block groups (RBGs) which are determined according to a BWP size allocated by a BWP indicator and a higher layer parameter rbg-Size as shown in table 17 presented below, and data may be transmitted in the RGB displayed as 1 by a bitmap.

TABLE 17

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the terminal is configured to use only a resource type 1 through a higher layer signaling (7-05), some pieces of DCI for allocating the PDSCH to the corresponding terminal include frequency-axis resource allocation information which is comprised of $$\lceil \log_2(N_{RB}^{DL,BWP}(N_{RB}^{DL,BWP}+1)/2) \rceil$$

bits. A condition for this will be described later. Through this, the base station may configure starting VRB 7-20 and a length of a frequency-axis resource 7-25 consecutively allocated therefrom.

If the terminal is configured to use all of the resource type 0 and the resource type 1 through a higher layer signaling (7-10), some pieces of DCI for allocating the PDSCH to the corresponding terminal includes frequency-axis resource allocation information which is comprised of bits of a large value 7-35 out of a payload 7-15 for configuring the resource type 0 and a payload 7-20, 7-25 for configuring the resource type 1. A condition for this will be described later. In this case, one bit may be added to the head portion (MSB) of the frequency-axis resource allocation information in the DCI, and, if the corresponding bit is "0," it is indicated that the resource type 0 is used, and, if the corresponding bit is "1," it is indicated that the resource type 1 is 1.

[PDSCH/PUSCH: Regarding Time Resource Allocation]

Hereinafter, a time domain resource allocation method for a data channel in the next-generation wireless communication system (5G or NR system) is described.

The base station may configure a table regarding time domain resource allocation information regarding a PDSCH and a PUSCH for the terminal through a higher layer signaling (for example, an RRC signaling). With respect to the PDSCH, a table comprised of a maximum of 16 (=maxNrofDL–Allocations) entries may be configured, and, with respect to the PUSCH, a table comprised of a maximum of 16 (=maxNrofUL–Allocations) entries may be configured. In an embodiment, the time domain resource allocation information may include a PDCCH-to-PDSCH slot timing (corresponding to a time interval of a slot unit between a time at which a PDCCH is received and a time at which a PDSCH scheduled by the PDCCH is transmitted, expressed by K0), a PDCCH-to-PUSCH slot timing (corresponding to a time interval of a slot unit between a time at which a PDCCH is received and a time at which a PUSCH scheduled by the received PDCCH is transmitted, expressed by K2), information regarding a location and a length of a start symbol in which the PDSCH or PUSCH is scheduled in a slot, a mapping type of the PDSCH or PUSCH. For example, information shown in table 18 or table 19 may be transmitted from the base station to the terminal.

TABLE 18

PDSCH-TimeDomainResourceAllocationList information element

```
PDSCH-TimeDomainResourceAllocationList ::=SEQUENCE (SIZE 1..maxNrofDL-Allocations)   OF
PDSCH-TimeDomainResourceAllocation
PDSCH-TimeDomainResourceAllocation ::=SEQUENCE (
K0                                                          INTEGER (0..32)
OPTIONAL,                      -- Need S
    (PDCCH-to-PDSCH timing, slot unit)
  mappingType                                   ENUMERATED (typeA, typeB),
    (PDSCH mapping type)
      startSymbolAndLength
      (Start symbol and length of PDSCH)
      )
```

TABLE 19

PUSCH-TimeDomainResourceAllocation information element

```
PUSCH-TimeDomainResourceAllocationList ::=SEQUENCE (SIZE 1..maxNrofUL-Allocations)   OF
PUSCH-TimeDomainResourceAllocation
PUSCH-TimeDomainResourceAllocation ::=SEQUENCE (
K2                                 INTEGER (0..32)   OPTIONAL, --Need S
    (PDCCH-to-PUSCH timing, slot unit)
  mappingType                      ENUMERATED (typeA, typeB),
```

TABLE 19-continued

| PUSCH-TimeDomainResourceAllocation information element |
|---|
| (PUSCH mapping type)<br>startSymbolAndLength<br>(Start symbol and length of PUSCH)<br>) |

The base station may notify the terminal of one of the entries of the table regarding the time domain resource allocation information described above through an L1 signaling (for example, DCI) (for example, indicated by a "time domain resource allocation" field in DCI). The terminal may obtain time domain resource allocation information regarding a PDSCH or PUSCH based on DCI received from the base station.

Figure 8:
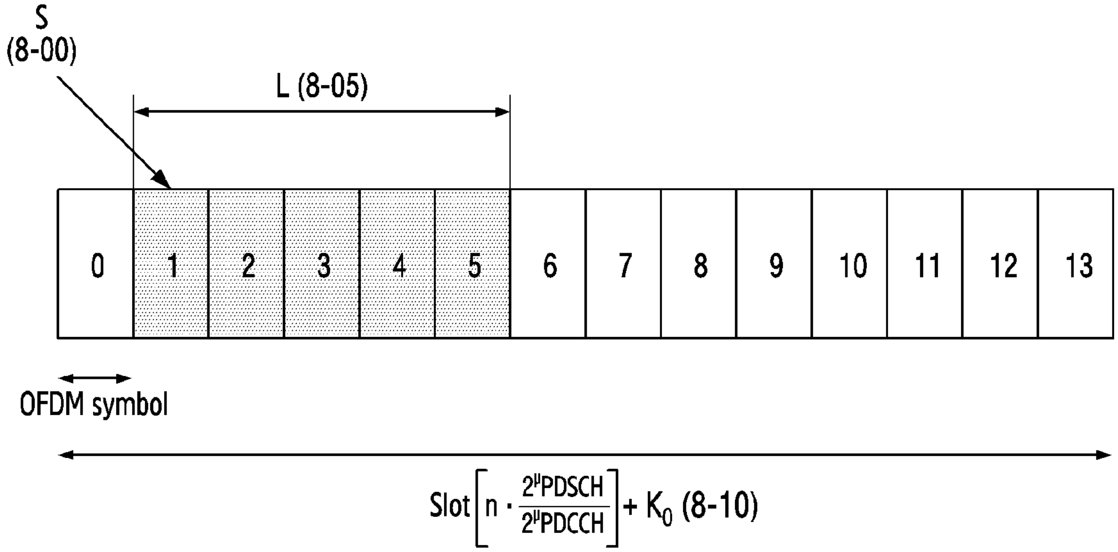
FIG. 8 illustrates an example of time axis resource allocation of a PDSCH in a wireless communication system according to an embodiment of the present disclosure.

FIG. 8 illustrates an example of time-axis resource allocation of a PDSCH in a wireless communication system according to an embodiment of the present disclosure.

Referring to FIG. 8, the base station may indicate a time axis location of a PDSCH resource according to subcarrier spacings (SCSs) ($\mu_{PDSCH}$, $\mu_{PDCCH}$) of a data channel and a control channel, which are configured by using a higher layer, a scheduling offset (K0) value, and a start position 8-00 and a length 8-05 of an OFDM symbol in one slot which is dynamically indicated through DCI.

Figure 9:
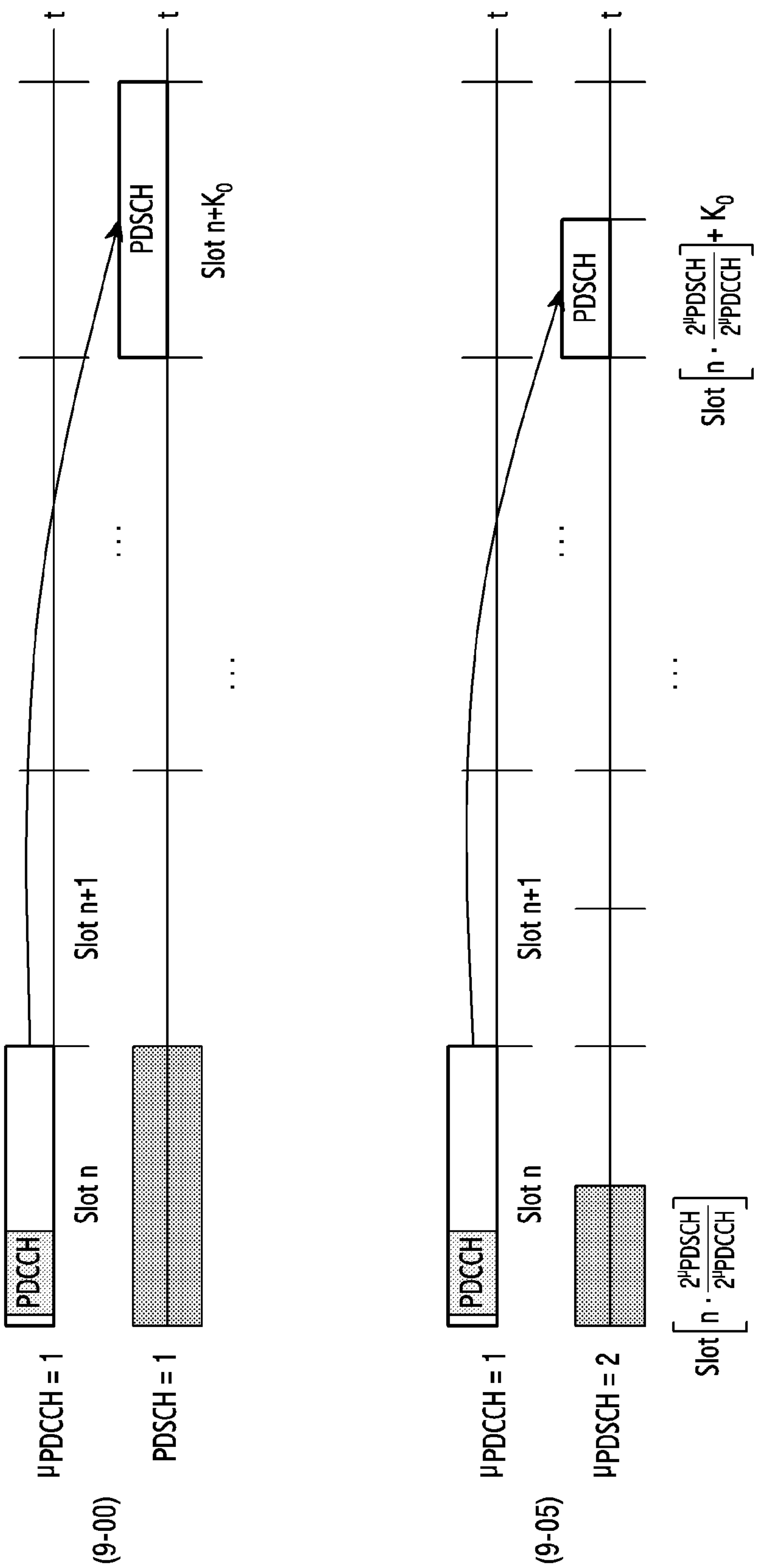
FIG. 9 illustrates an example of time axis resource allocation according to a subcarrier spacing of a data channel and a control channel in a wireless communication system according to an embodiment of the present disclosure.

FIG. 9 illustrates an example of time-axis resource allocation according to subcarrier spacings of a data channel and a control channel in a wireless communication system according to an embodiment of the present disclosure.

Referring to FIG. 9, when the subcarrier spacings of the data channel and the control channel are the same as each other (9-00) ($\mu_{PDSCH}=\mu_{PDCCH}$), data and slot number for controlling may be the same. Therefore, the base station and the terminal may generate a scheduling offset according to a pre-defined slot offset K0. On the other hand, when the subcarrier spacings of the data channel and the control channel are different from each other (9-05) ($\mu_{PDSCH}\neq\mu_{PDCCH}$), data and slot number for controlling are different. Therefore, the base station and the terminal may generate a scheduling offset according to a pre-defined slot offset K0 with reference to the subcarrier spacing of the PDCCH.

[PUSCH: Regarding Transmission Method]

Hereinafter, a scheduling method of PUSCH transmission will be described. PUSCH transmission may be dynamically scheduled by UL grant in DCI, or may be operated by configured grant type 1 or type 2. Dynamic scheduling indication on PUSCH transmission may be possible with a DCI format 0_0 or 0_1.

Configured grant Type 1 PUSCH transmission may be semi-statically configured by receiving configuredGrant-Config including rrc-ConfiguredUplinkGrant of table 20 through a higher signaling, without reception of UL grant in DCI. Configured grant Type 2 PUSCH transmission may be semi-continuously scheduled by UL grant in DCI after reception of cofiguredGrantConfig that does not include rrc-ConfiguredUplinkGrant of table 20 through a higher signaling. When PUSCH transmission is operated by configured grant, parameters applied to PUSCH transmission may be applied through configuredGrantConfig which is a higher signaling of table 20, except for dataScramblingIdentityPUSCH, txConfig, codebookSubset, maxRank, scaling of UCI-OnPUSCH provided to pusch-Config of table 21, which is a higher signaling. If the terminal receives transformPrecoder in configuredGrantConfig which is a higher signaling of table 20, the terminal may apply tp-pi2BPSK in pusch-Config of table 21 to PUSCH transmission which is operated by configured grant.

TABLE 20

```
ConfiguredGrantConfig ::=                  SEQUENCE {
  frequencyHopping                      ENUMERATED {intraSlot, interSlot}
OPTIONAL, -- Need S,
  cg-DMRS-Configuration                    DMRS-UplinkConfig,
  mcs-Table                           ENUMERATED {qam256, qam64LowSE}
OPTIONAL, -- Need S
  mcs-TableTransformPrecoder                 ENUMERATED {qam256, qam64LowSE}
OPTIONAL, -- Need S
  uci-OnPUSCH                           SetupRelease { CG-UCI-OnPUSCH }
OPTIONAL, -- Need M
  resourceAllocation                      ENUMERATED { resourceAllocationType0,
resourceAllocationType1, dynamicSwitch },
  rbg-Size                            ENUMERATED {config2}         OPTIONAL, -- Need S
  powerControlLoopToUse                      ENUMERATED {n0, n1},
  p0-PUSCH-Alpha                        P0-PUSCH-AlphaSetId,
  transformPrecoder                     ENUMERATED {enabled, disabled}
OPTIONAL, -- Need S
  nrofHARQ-Processes                       INTEGER(1..16),
  repK                               ENUMERATED {n1, n2, n4, n8},
  repK-RV                            ENUMERATED {s1-0231, s2-0303, s3-0000}
OPTIONAL, -- Need R
  periodicity                           ENUMERATED {
                                   sym2, sym7, sym1x14, sym2x14, sym4x14, sym5x14, sym8x14,
sym10x14, sym16x14, sym20x14,
                                   sym32x14, sym40x14, sym64x14, sym80x14, sym128x14, sym160x14,
sym256x14, sym320x14, sym512x14,
                                   sym640x14, sym1024x14, sym1280x14, sym2560x14, sym5120x14,
                                   sym6, sym1x12, sym2x12, sym4x12, sym5x12, sym8x12, sym10x12,
sym16x12, sym20x12, sym32x12,
                                   sym40x12, sym64x12, sym80x12, sym128x12, sym160x12, sym256x12,
```

TABLE 20-continued

```
sym320x12, sym512x12, sym640x12,
                                        sym1280x12, sym2560x12
  },
  configuredGrantTimer                  INTEGER (1..64)          OPTIONAL, -- Need
R
  rrc-ConfiguredUplinkGrant               SEQUENCE {
    timeDomainOffset                    INTEGER (0..5119),
    timeDomainAllocation                  INTEGER (0..15),
    frequencyDomainAllocation                 BIT STRING (SIZE(18)),
    antennaPort                     INTEGER (0..31),
    dmrs-SeqInitialization                INTEGER (0..1)        OPTIONAL, -- Need R
    precodingAndNumberOfLayers                 INTEGER (0..63),
    srs-ResourceIndicator                 INTEGER (0..15)          OPTIONAL, -- Need
R
    mcsAndTBS                             INTEGER (0..31),
    frequencyHoppingOffset                  INTEGER (1..maxNrofPhysicalResourceBlocks-1)
OPTIONAL, -- Need R
    pathlossReferenceIndex                  INTEGER (0..maxNrofPUSCH-
PathlossReferenceRSs-1),
    ...
  }                                         OPTIONAL, -- Need R
  ...
}
```

Hereinafter, a PUSCH transmission method will be described. A DMRS antenna port for PUSCH transmission is the same as an antenna port for SRS transmission. The PUSCH transmission may follow a codebook-based transmission method or a non-codebook-based transmission method according to whether a value of txConfig in pusch-Config of table 21, which is a higher signaling, is "codebook" or "nonCodeBook."

As described above, the PUSCH transmission may be dynamically scheduled through a DCI format 0_0 or 0_1, and may be semi-statically configured by configured grant. If the terminal receives an indication of scheduling regarding PUSCH transmission through the DCI format 0_0, the terminal may configure a beam for PUSCH transmission by using pucch-spatialRelationInfoID corresponding to a UE-specific PUCCH resource corresponding to a minimum ID within an uplink BWP activated within a serving cell, and in this case, PUSCH transmission is based on a single antenna port. The terminal does not expect scheduling regarding PUSCH transmission through the DCI format 0_0 within a BWP in which a PUCCH resource including pucch-spatial-RelationInfo is not configured. If the terminal does not receive a configuration of txConfig within pusch-Config of table 21, the terminal may not expect to receive scheduling through the format 0_1.

TABLE 21

```
PUSCH-Config ::=                    SEQUENCE {
  dataScramblingIdentityPUSCH               INTEGER (0..1023)             OPTIONAL,
-- Need S
  txConfig                       ENUMERATED {codebook, nonCodebook}
OPTIONAL, -- Need S
  dmrs-UplinkForPUSCH-MappingTypeA   SetupRelease { DMRS-UplinkConfig }
OPTIONAL, -- Need M
  dmrs-UplinkForPUSCH-MappingTypeB   SetupRelease { DMRS-UplinkConfig }
OPTIONAL, -- Need M
  pusch-PowerControl                   PUSCH-PowerControl             OPTIONAL, --
Need M
  frequencyHopping                  ENUMERATED {intraSlot, interSlot}
OPTIONAL, -- Need S
  frequencyHoppingOffsetLists             SEQUENCE (SIZE (1..4)) OF INTEGER (1..
maxNrofPhysicalResourceBlocks-1)
                                        OPTIONAL, -- Need M
  resourceAllocation                ENUMERATED { resourceAllocationType0,
resourceAllocationType1, dynamicSwitch},
  pusch-TimeDomainAllocationList  SetupRelease { PUSCH-
TimeDomainResourceAllocationList }                  OPTIONAL, -- Need M
  pusch-AggregationFactor               ENUMERATED { n2, n4, n8 }
OPTIONAL, -- Need S
  mcs-Table                      ENUMERATED {qam256, qam64LowSE}
OPTIONAL, -- Need S
  mcs-TableTransformPrecoder              ENUMERATED {qam256, qam64LowSE}
OPTIONAL, -- Need S
  transformPrecoder                 ENUMERATED {enabled, disabled}
OPTIONAL, -- Need S
  codebookSubset                    ENUMERATED {fullyAndPartialAndNonCoherent,
partialAndNonCoherent,nonCoherent}
                                      OPTIONAL, -- Cond codebookBased
  maxRank                        INTEGER (1..4)                OPTIONAL, -- Cond
codebookBased
  rbg-Size                     ENUMERATED { config2}            OPTIONAL, -- Need S
  uci-OnPUSCH                       SetupRelease { UCI-OnPUSCH}          OPTIONAL, --
```

TABLE 21-continued

```
Need M
  tp-pi2BPSK                ENUMERATED {enabled}          OPTIONAL, -- Need S
  ...
}
```

Hereinafter, codebook-based PUSCH transmission will be described. The codebook-based PUSCH transmission may be dynamically scheduled through a DCI format 0_0 or 0_1, and may be semi-statically operated by configured grant. When the codebook-based PUSCH is dynamically scheduled by a DCI format 0_1 or semi-statically configured by configured grant, the terminal determines a precoder for PUSCH transmission based on an SRS resource indicator (SRI), a transmission precoding matrix indicator (TPMI), and a transmission rank (the number of PUSCH transmission layers).

In this case, the SRI may be given through a field SRS resource indicator in DCI or may be configured through srs-ResourceIndicator which is a higher signaling. The terminal may receive a configuration of at least one SRS resource at the time of codebook-based PUSCH transmission, and may receive a configuration of a maximum of two SRS resources. When the terminal receives the SRI through DCI, an SRS resource indicated by the corresponding SRI refers to an SRS resource corresponding to the SRI among SRS resources which are transmitted before the PDCCH including the corresponding SRI. In addition, the TPMI and the transmission rank may be given through a field "precoding information and number of layers" within DCI, or may be configured through precodingAndNumberOfLayers which is a higher signaling. The TPMI is used to indicate a precoder which is applied to PUSCH transmission. If the terminal receives a configuration of one SRS resource, the TPMI may be used to indicate a precoder to be applied in the one configured SRS resource. If the terminal receives a configuration of a plurality of SRS resources, the TPMI may be used to indicate a precoder to be applied in an SRS resource indicated through the SRI.

The precoder to be used for PUSCH transmission may be selected from an uplink codebook that has the same number of antenna ports as an nrofSRS-Ports value within SRS-Config which is a higher signaling. In the codebook-based PUSCH transmission, the terminal may determine a codebook subset based on the TPMI and codebookSubset in pusch-Config which is a higher signaling. The codebookSubset in pusch-Config which is a higher signaling may be configured as one of "fullyAndPartialAndNonCoherent," "partialAndNonCoherent," or "nonCoherent" based on UE capability that the terminal reports to the base station. If the terminal has reported "partialAndNonCoherent" based on UE capability, the terminal may not expect that a value of codebookSubset which is a higher signaling is configured as "fullyAndPartialAndNonCoherent." If the terminal has reported "nonCoherent" based on UE capability, the terminal may not expect that the value of codebookSubset which is a higher signaling is configured as "fullyAndPartialAndNonCoherent" or "partialAndNonCoherent." When nrofSRS-Ports in SRS-ResourceSet which is a higher signaling indicates two SRS antenna ports, the terminal may not expect that the value of codebookSub set which is a higher signaling is configured as "partialAndNonCoherent."

The terminal may receive a configuration of one SRS resource set in which a value of usage in SRS-ResourceSet which is a higher signaling is configured as "codebook," and one SRS resource in the corresponding SRS resource set may be indicated through an SRI. If a plurality of SRS resources are configured within the SRS resource set in which the usage value in SRS-ResourceSet which is a higher signaling is configured as "codebook," the terminal may expect that nrofSRS-Ports in SRS-Resource which is a higher signaling has the same value for all SRS resources.

The terminal may transmit, to the base station, one or a plurality of SRS resources included in the SRS resource set in which the value of usage is configured as "codebook" according to a higher signaling, and the base station may select one of the SRS resources transmitted by the terminal, and may allow the terminal to perform PUSCH transmission by using transmission beam information of the corresponding SRS resource. In this case, in the codebook-based PUSCH transmission, the SRI may be used as information for selecting an index of one SRS resource, and may be included in the DCI. Additionally, the base station may include, in DCI, information indicating a TPMI and a rank that the terminal may use for PUSCH transmission. The terminal may perform PUSCH transmission by applying a precoder indicated by the rank and the TPMI indicated based on a transmit beam of the corresponding SRS resource, by using the SRS resource indicated by the SRI.

Hereinafter, the non-codebook-based PUSCH transmission will be described. The non-codebook-based PUSCH transmission may be dynamically scheduled through a DCI format 0_0 or 0_1, and may be semi-statically operated by configured grant. When at least one SRS resource is configured within an SRS resource set in which a value of usage in SRS-ResourceSet which is a higher signaling is configured as "nonCodebook," the terminal may receive scheduling of non-codebook-based PUSCH transmission through the DCI format 0_1.

With respect to the SRS resource set in which the value of usage in SRS-ResourceSet which is a higher signaling is configured as "nonCodebook," the terminal may receive a configuration of one connected non-zero power CSI-RS (NZP CSI-RS) resource. The terminal may perform calculation with respect to a precoder for SRS transmission through measurement of the NZP CSI-RS resource connected with the SRS resource set. If a difference between the last reception symbol of an aperiodic NZP CSI-RS resource connected with the SRS resource set, and the first symbol of aperiodic SRS transmission at the terminal is less than 42 symbols, the terminal my not expect that information on the precoder for SRS transmission is updated.

If a value of resourceType in the SRS-ResourceSet which is a higher signaling is configured as "aperiodic," the connected NZP CSI-RS may be indicated by an SRS request which is a field in the DCI format 0_1 or 1_1. In this case, if the connected NZP CSI-RS resource is an aperiodic NZP CSI-RS resource, it indicates the existence of NZP CSI-RS connected when the value of the field SRS request in the DCI format 0_1 or 1_1 is not "00." In this case, the corresponding DCI may not indicate a cross carrier or cross BWP scheduling. In addition, if the value of the SRS request indicates the existence of the NZP CSI-RS, the corresponding NZP CSI-RS is positioned at a slot through which a PDCCH including the SRS request field is transmitted. In this case, TCI states configured in a scheduled subcarrier may not be configured as QCL-TypeD.

If a periodic or semi-continuous SRS resource set is configured, the connected NZP CSI-RS may be indicated through associatedCSI-RS within the SRS-ResourceSet which is a higher signaling. With respect to the non-codebook-based transmission, the terminal may not expect that spatialRelationInfo which is a higher signaling for the SRS resource, and associatedCSI-RS in SRS-ResourceSet which is a higher signal are configured all together.

When the terminal receives a configuration of a plurality of SRS resources, the terminal may determine a precoder to apply to PUSCH transmission and a transmission rank, based on an SRI indicated by the base station. In this case, the SRI may be indicated through a field SRS resource indicator in DCI, or may be configured through srs-ResourceIndicator which is a higher signaling. Like the above-described codebook-based PUSCH transmission, when the terminal is provided with the SRI through DCI, an SRS resource indicated by the corresponding SRI refers to an SRS resource that corresponds to the SRI among SRS resources transmitted before a PDCCH including the corresponding SRI. The terminal may use one or a plurality of SRS resources for SRS transmission, and the maximum number of SRS resources that may be transmitted simultaneously through the same symbol in one SRS resource set may be determined based on UE capability that the terminal reports to the base station. In this case, the SRS resources that are transmitted by the terminal simultaneously occupies the same RB. The terminal configures one SRS port for each SRS resource. Only one SRS resource set in which a value of usage in SRS-ResourceSet which is a higher signaling is configured as "nonCodeook" may be configured, and a maximum of 4 SRS resources may be configured for non-codebook-based PUSCH transmission.

The base station may transmit one NZP-CSI-RS connected with the SRS resource set to the terminal, and the terminal may calculate a precoder to use when transmitting one or a plurality of SRS resources in the corresponding SRS resource set, based on a result of measuring when the corresponding NZP-CSI-RS is received. The terminal may apply the calculated precoder when transmitting one or a plurality of SRS resources in the SRS resource set in which usage is configured as "nonCodebook" to the base station, and the base station may select one or a plurality of SRS resources from the one or plurality of SRS resources received. In this case, in the non-codebook-based PUSCH transmission, the SRI may indicate an index for representing a combination of one or the plurality of SRS resources, and the SRI may be included in DCI. In this case, the number of SRS resources indicated by the SRI transmitted by the base station may be the number of transmission layers of the PUSCH, and the terminal may transmit the PUSCH by applying the precoder applied to the SRS resource to each layer.

[PUSCH: Preparation Procedure Time]

Hereinafter, a PUSCH preparation procedure time will be described. When the base station schedules transmission of a PUSCH for the terminal by using a DCI format 0_0, 0_1 or 0_2, the terminal may require a PUSCH preparation procedure time for transmitting the PUSCH by applying a transmission method indicated by DCI (a transmission precoding method of an SRS resource, the number of transmission layers, a spatial domain transmission filter). In NR, a PUSCH preparation procedure time is defined by considering this. The PUSCH preparation procedure time of the terminal may be calculated by Equation 2:

$$T_{proc,2}=\max((N_2+d_{2,1}+d_2)(2048+144)k2^{-\mu}T_c+T_{ext}+T_{switch}, d_{2,2}). \quad \text{[Equation 2]}$$

Respective variables in $T_{proc,2}$ which is indicated by Equation 2 may have the following meanings:

N2: The number of symbols which are defined according to UE processing capability 1 or 2, which indicates capability of a terminal, and numerology μ. When UE processing capability 1 is reported according to a capability report of the terminal, this variable may have values of table 22, and, when UE processing capability 2 is reported and it is configured through a higher layer signaling that UE processing capability 2 is usable, this variable may have values of table 23;

TABLE 22

| μ | PUSCH preparation time $N_2$ [symbols] |
|---|---|
| 0 | 10 |
| 1 | 12 |
| 2 | 23 |
| 3 | 36 |

TABLE 23

| μ | PUSCH preparation time $N_2$ [symbols] |
|---|---|
| 0 | 5 |
| 1 | 5.5 |
| 2 | 11 for frequency range 1 |

d2, 1: The number of symbols that is defined as 0 if all resource elements of the first OFDM symbol of PUSCH transmission are configured only with DM-RS, and is defined as 1 otherwise;

K: 64;

μ: This corresponds to a value that makes $T_{proc,2}$ increase more among $\mu_{DL}$ or $\mu_{UL}$, $\mu_{DL}$ refers to a numerology of downlink through which a PDCCH including DCI for scheduling a PUSCH is transmitted, and $\mu_{UL}$, refers to a numerology of uplink through which a PUSCH is transmitted;

Tc: This variable is expressed by $1/(\Delta f_{max}*N_f)$, where $\Delta f_{max}$=480*103 Hz, $N_f$=4096;

d2, 2: This variable follows a BWP switching time if DCI for scheduling a PUSCH indicates BWP switching, and has 0 otherwise;

d2: If OFDM symbols of a PUCCH, a PUSCH having a high priority index, and a PUCCH having a low priority index overlap one another on time, a d2 value of the PUSCH having the high priority index may be used. If not, d2 is 0;

Text: If the terminal uses a shared spectrum channel access method, the terminal may calculate Text and may apply the same to the PUSCH preparation procedure time. If not, it is assumed that Text is 0; and Tswitch: It is assumed that Tswitch is a switching interval time if an uplink switching interval is triggered. If not, it is assumed that Tswitch is 0.

Considering time axis resource mapping information of the PUSCH scheduled through DCI and an effect of uplink-downlink timing advance, the BS and the terminal may determine that the PUSCH preparation process time is not sufficient when a first symbol of the PUSCH starts earlier than a first uplink symbol at which the CP starts after Tproc,2 from a last symbol of the PDCCH including the DCI scheduling the PUSCH. Otherwise, the BS and the terminal determine that the PUSCH preparation process time is sufficient. The terminal may transmit the PUSCH only when the PUSCH preparation process time is sufficient, and may ignore scheduling of the PUSCH when the PUSCH preparation process time is not sufficient.

[Regarding CA/DC]

Figure 10:
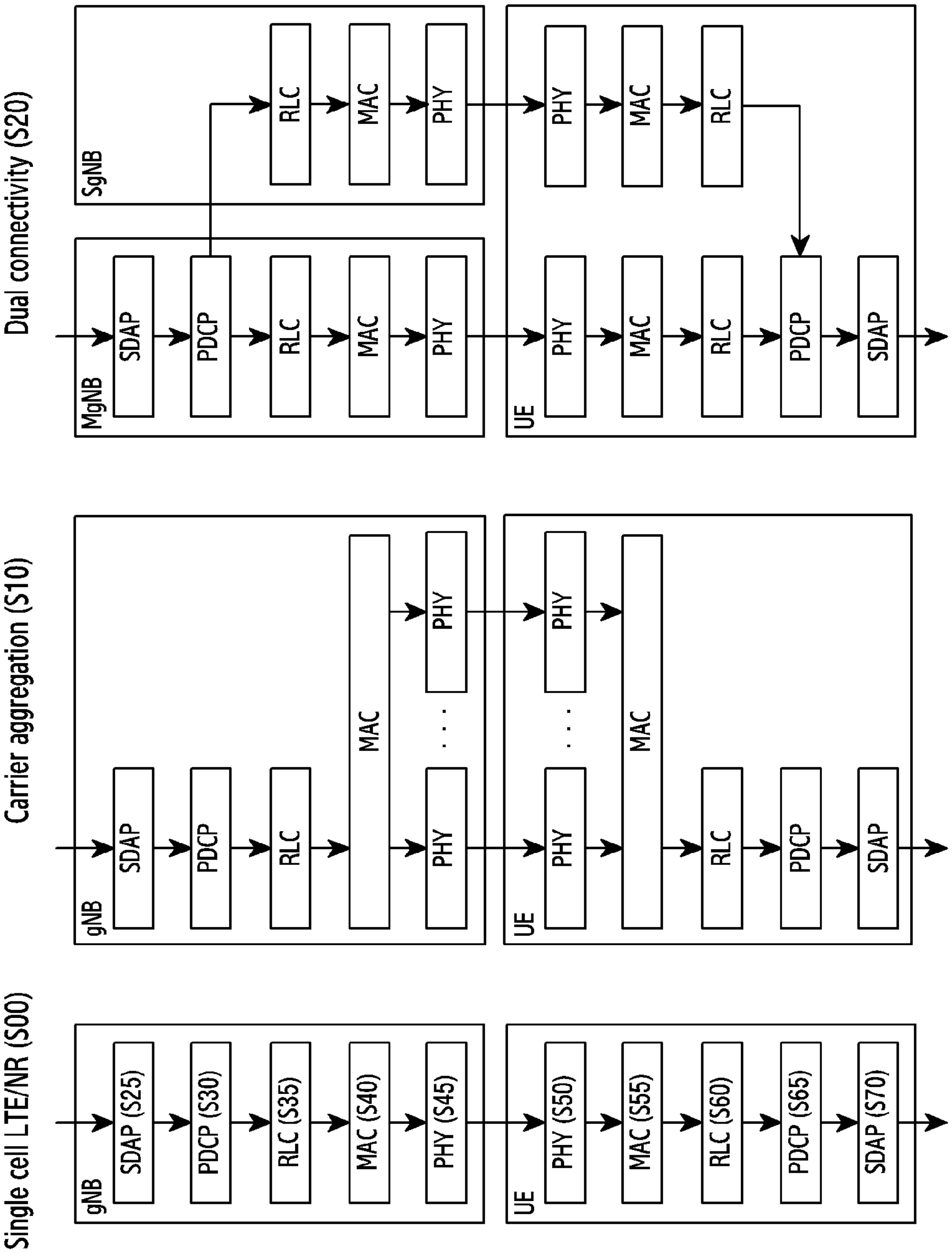
FIG. 10 illustrates a wireless protocol structure of a base station and a terminal in circumstances of single cell, carrier aggregation, dual connectivity in a wireless communication system according to an embodiment of the present disclosure.

FIG. 10 illustrates a wireless protocol structure of a base station and a terminal in circumstances of single cell, carrier aggregation, dual connectivity according to an embodiment of the disclosure.

Referring to FIG. 10, a wireless protocol of a next-generation wireless communication system may include an NR service data adaptation protocol (SDAP) S25, S70, an NR packet data convergence protocol (PDCP) S30, S65, an NR radio link control (RLC) S35, S60, and an NR medium access control (MAC) S40, S55 at each of a terminal and an NR base station.

Primary functions of the NR SDAP S25, S70 may include some of the following functions:

- Transfer of user plane data;
- Mapping between a QoS flow and a data bearer for both DL and UL;
- Marking QoS flow ID in both DL and UL packets; and
- Mapping a reflective QoS flow to a data bearer for the UL SDAP PUDs.

With respect to an SDAP layer device, the terminal may receive a configuration regarding whether a header of the SDAP layer device may be used for every PDCP layer device, for every bearer, or for every logical channel, or whether a function of the SDAP layer device may be used, through an RRC message, and, when the SDAP header is configured, an NAS QoS reflective configuration 1 bit indicator (NAS reflective QoS) of the SDAP header and an AS QoS reflective configuration 1 bit indicator (AS reflective QoS) may indicate to update or reconfigure mapping information regarding a QoS flow and a data bearer of uplink and downlink. The SDAP header may include QoS flow ID information indicating QoS. The QoS information may be used as a data processing priority, scheduling information for supporting a smooth service.

Primary functions of the NR PDCP S30, S65 may include some of the following functions:

- Header compression and decompression: ROHC only;
- Transfer of user data;
- In-sequence delivery of upper layer PUDs;
- Out-of-sequence delivery of upper layer PUDs;
- PDCP PDU reordering for reception;
- Duplicate detection of lower layer SDUs;
- Retransmission of PDCP SDUs;
- Ciphering and deciphering; and
- Timer-based SDU discard in uplink.

The reordering function of the NR PDCP device refers to a function of reordering PDCP PDUs received at a lower layer in sequence based on a PDCP sequence number (SN), and may include a function of delivering data to a higher layer in an order that the PDCP PUDs are reordered. Alternatively, the reordering function of the NR PDCP device may include a function of delivering directly without considering an order, may include a function of reordering and recording lost PDCP PDUs, may include a function of reporting a state on the lost PDCP PDUs to a transmission side, and may include a function of requesting retransmission of the lost PDCP PDUs.

Primary functions of the NR RLC S35, S60 may include some of the following functions:

- Transfer of upper layer PDUs;
- In-sequence delivery of upper layer PUDs;
- Out-of-sequence delivery of upper layer PDUs;
- Error correction through ARQ;
- Concatenation, segmentation and reassembly of RLC SDUs;
- Re-segmentation of RLC data PDUs;
- Reordering of RLC data PDUs;
- Duplicate detection;
- Protocol error detection;
- RLC SDU discard; and
- RLC re-establishment.

The in-sequence delivery of the NR RLC device refers to a function of delivering RLC SDUs received from a lower layer to a higher layer in sequence. The in-sequence delivery of the NR RLC device may include a function of, when one RLC SDU is segmented into a plurality of RLC SDUs and the RLC SDUs are received, reassembling and delivering the RLC SDUs, may include a function of reordering the received RLC PDUs with reference to an RLC SN or a PDCP SN, may include a function of reordering and recording lost RLC PDUs, may include a function of reporting a state of the lost RLC PDUs to a transmission side, and may include a function of requesting retransmission of the lost RLC PDUs. The in-sequence delivery of the NR RLC device may include a function of, when there are lost RLC SDUs, delivering only RLC SDUs before the lost RLC SDU to a higher layer in sequence, or a function of, when a predetermined timer is expired, delivering all RLC SDUs received before the timer starts to a higher layer in sequence even if there are lost RLC SDUs.

Alternatively, the in-sequence delivery of the NR RLC device may include a function of, when the predetermined timer is expired, delivering all RLC SDUs received until the present time to a higher layer in sequence even if there are lost RLC SDUs. In addition, in the above-described example, the RLC PDUs may be processed in order that the RLC PDUs are received (in order that RLC PDUs arrive, regardless of a serial number, a sequence number), and may be delivered to the PDCP device irrespective of a sequence (out-of-sequence delivery), and in the case of segments, segments that are stored in a buffer or may be received later may be received and may constitute one complete RLC PDU, and then, the RLC PDU may be processed and may be delivered to the PDCP device. The NR RLC layer may not include a concatenation function, and the above-described function may be performed in an NR MAC layer or may be replaced with a multiplexing function of the NR MAC layer.

The out-of-sequence delivery of the NR RLC device refers to a function of delivering RLC SDUs received from a lower layer directly to a higher layer irrespective of a sequence, and may include a function of, when one RLC SDU is segmented into a plurality of RLC SDUs and the RLC SDUs are received, reassembling and delivering the RLC SDUs, and may include a function of storing an RLC SN or PDCP SN of the received RLC PDUs, and reordering and recording lost RLC PDUs.

The NR MAC S40, S55 may be connected with various NR RLC layer devices configured in one terminal, and primary functions of the NR MAC may include some of the following functions:

- Mapping between logical channels and transport channels;
- Multiplexing/demultiplexing of MAC SDUs;
- Scheduling information reporting;

HARQ function (Error correction through HARQ);
Priority handling between logical channels of one UE;
Priority handling between UEs by means of dynamic scheduling;
MBMS service identification;
Transport format selection; and
Padding.

The NR PHY layer S45, S50 may perform operations of channel coding and modulating higher layer data and making an OFDM symbol and transmitting to a wireless channel, or demodulating and channel decoding an OFDM symbol received through the wireless channel and delivering the OFDM symbol to a higher layer.

The wireless protocol structure may have its detailed structure changed variously according to a carrier (or cell) operating method. For example, when the base station transmits data to the terminal based on a single carrier (or cell), the base station and the terminal may use a protocol structure that has a single structure for every layer like S00. On the other hand, when the base station transmits data to the terminal based on carrier aggregation (CA) using multi-carrier at a single TRP, the base station and the terminal may use a protocol structure which has a single structure until RLC, but multiplexes a PHY layer through a MAC layer like S10. In another example, when the base station transmits data to the terminal based on dual connectivity (DC) which uses multi-carrier at multi-TRP, the base station and the terminal may use a protocol structure which has a single structure until RLC but multiplexes a PHY layer through a MAC layer like S20.

Referring to the descriptions related to the above-described PDCCH and beam configuration, the present Rel-15 and Rel-16 NR does not support PDCCH repetition transmission and thus may have difficulty in achieving required reliability in a scenario requiring high-reliability like URLLC. The disclosure may enhance PDCCH reception reliability of a terminal by providing a PDCCH repetition transmission method through multiple transmission points (TRP). A specific method will be described in embodiments presented below.

Hereinafter, embodiments of the disclosure will be described in detail with reference to the accompanying drawings. Contents of the disclosure are applicable to an FDD and TDD system. A higher signaling (or a higher layer signaling) described in the disclosure refers to a method of delivering signals from a base station to a terminal by using a downlink data channel of a physical layer, or from a terminal to a base station by using an uplink data channel of a physical layer, and may be referred to as an RRC signaling, a PDCP signaling, or a medium access control (MAC) control element (CE) (MAC CE).

In determining whether to apply cooperative communication, a terminal of the disclosure may use various methods, in which PDCCH(s) for allocating a PDSCH applying cooperative communication has a specific format, or PDCCH(s) for allocating a PDSCH applying cooperative communication includes a specific indicator informing whether to apply cooperative communication, or PDCCH(s) for allocating a PDSCH applying cooperative communication is scrambled into a specific RNTI or application of cooperative communication is assumed in a specific interval indicated by a higher layer. For convenience of explanation, a case in which a terminal receives a PDSCH applying cooperative communication based on similar conditions to those described above will be referred to as an NC-JT case.

In the disclosure, determining a priority between A and B may refer to selecting one that has a higher priority according to a pre-defined priority rule and performing a corresponding operation, or omitting or dropping an operation related to one that has a lower priority.

Hereinbelow, the above-described examples will be described through a plurality of embodiments of the disclosure, but the embodiments are not independent and one or more embodiments may be applied simultaneously or in combination.

Hereinafter, embodiments of the disclosure will be described in detail with reference to the accompanying drawings. A base station which will be described hereinbelow refers to an entity that performs resource allocations of a terminal, and may be at least one of a gNode B, a gNB, an eNode B, a Node B, a base station (BS), a radio access unit, a base station controller, or a node over a network. A terminal may include user equipment (UE), a mobile station (MS), a cellular phone, a smartphone, a computer, or a multimedia system performing a communication function. In the disclosure, a 5G system will be described by way of an example, but embodiments of the disclosure may be applied to other communication systems having similar technical background or channel type. For example, LTE or LTE-A mobile communication and a mobile communication technology developed after 5G may be included therein. Accordingly, embodiments of the disclosure may be applied to other communication systems through some modification within the scope without departing from the scope of the disclosure, based on determination of a person skilled in the art. The contents of the disclosure may be applied to an FDD and TDD system.

In describing the disclosure, detailed descriptions of well-known functions or configurations will be omitted since they would unnecessarily obscure the subject matters of the disclosure. Also, the terms used herein are defined according to the functions of the disclosure. Thus, the terms may vary depending on users' or operators' intentions or practices. Therefore, the terms used herein should be understood based on the descriptions made herein.

In explaining the disclosure hereinbelow, a higher layer signaling may refer to a signaling corresponding to at least one or a combination of one or more of the following signalings:

Master information block (MIB);
System information block (SIB) or SIB X (X=1, 2, . . . );
Radio resource control (RRC); and
Medium access control (MAC) control element (CE).

In addition, an L1 signaling may be a signaling corresponding to at least one or a combination of one or more of signaling methods using the following physical layer channel or signaling:

Physical downlink control channel (PDCCH);
Downlink control information (DCI);
UE-specific DCI;
Group-common DCI;
Common DCI;
Scheduling DCI (for example, DCI used for scheduling downlink or uplink data);
Non-scheduling DCI (for example, DIC not used for scheduling downlink or uplink data);
Physical uplink control channel (PUCCH); and
Uplink control information (UCI).

In the disclosure, determining a priority between A and B may refer to selecting one that has a higher priority according to a pre-defined priority rule and performing a corresponding operation, or omitting or dropping an operation related to one that has a lower priority.

Hereinafter, the above-described examples will be described through a plurality of embodiments, but the embodiments are not independent and one or more embodiments may be applied simultaneously or in combination.

[Network Controlled Repeater]

Currently, in 3GPP Rel-18, researches on a network-controlled repeater (NetRep) which adds a beamforming technology of adaptive antennas to a repeater for transmitting a signal an amplify-forward method are ongoing. In order to transmit a signal to a terminal by using a correct beamforming, a repeater in a base station may be able to receive a control signal of the base station. The repeater may perform a transceiving operation using an adaptive antenna under control of the base station. The repeater may perform not only the transceiving operation using the adaptive antenna but also dynamic TDD configuration, on/off or power control for controlling interference.

The repeater typically amplifies a signal received from the base station and sends the signal to the terminal, and sends a signal received from the terminal to the base station. Therefore, the repeater may amplify and transmit a signal or channel transceived between the base station and the terminal without detecting or decoding the signal or channel. To this end, the repeater between the base station and the terminal is not visible to the terminal. In other words, the terminal may not distinguish between the base station and the repeater, and may see the repeater as the base station. Since the terminal does not require additional information or operation regarding the repeater, any released terminal may be supported by the repeater.

As described above, the repeater may be seen as a normal terminal by the base station. When the repeater is initially installed, the repeater may perform initial access in the same way as a normal terminal, and may receive a configuration that the normal terminal may receive after being connected to a higher layer. The repeater may perform an operation of amplifying and sending after being connected with the base station. The base station may need to know whether the terminal is directly connected with the base station or is connected via the repeater. When the terminal is within a coverage of the repeater, the terminal may communicate with the base station through the repeater, and the base station may recognize this through various methods.

In the disclosure, downlink (DL) indicates a series of processes of receiving a signal transmitted from a base station at a terminal. A DL signal may be directly transmitted from the base station to the terminal, or may be transmitted from the base station to the terminal via the repeater. For reference, in DL, the repeater may receive a signal transmitted from the base station, and simultaneously, may transmit the signal to the terminal. More specifically, DL (Repeater-RX) or Repeater-RX (DL) indicates a series of processes of the repeater receiving a signal transmitted from the base station, and DL (Repeater-TX) or Repeater-TX (DL) indicates a series of processes of the repeater transmitting a signal to the terminal.

Similarly, uplink (UL) indicates a series of processes of receiving a signal transmitted from a terminal at a base station. A UL signal may be directly transmitted from the terminal to the base station, or may be transmitted from the terminal to the base station via the repeater. For reference, in UL, the repeater may receive a signal transmitted from the terminal, and simultaneously, may transmit the signal to the base station. More specifically, UL (Repeater-RX) or Repeater-RX (UL) indicates a series of processes of the repeater receiving a signal transmitted from the terminal, and UL (Repeater-TX) or Repeater-TX (UL) indicates a series of processes of the repeater transmitting a signal to the base station.

Figure 11:
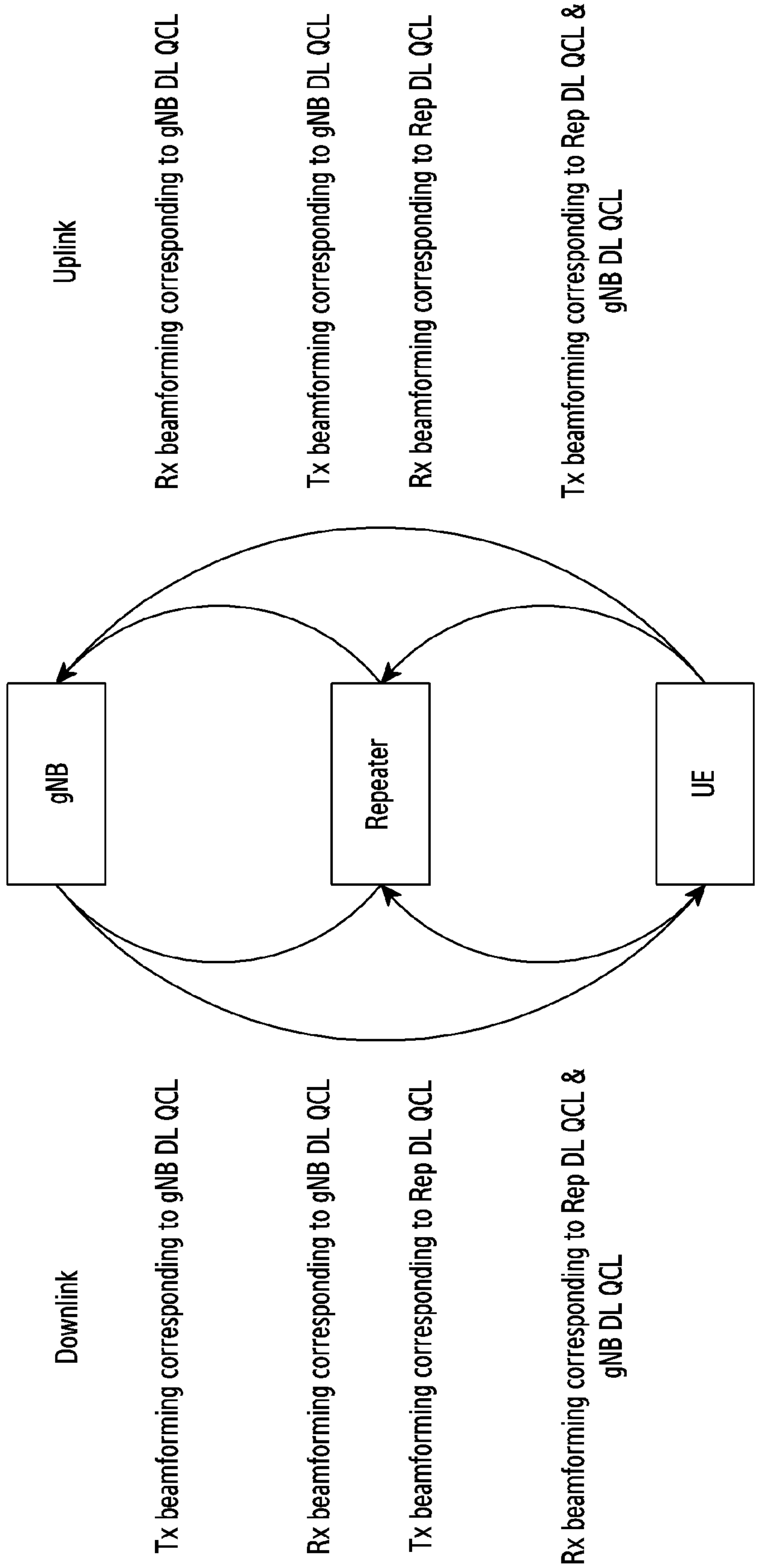
FIG. 11 illustrates a method of a base station, a repeater, a terminal according to an embodiment of the present disclosure.

FIG. 11 illustrates a method of a base station, a repeater, and a terminal according to an embodiment of the present disclosure.

Referring to FIG. 11, the following terms may be defined and used in the disclosure for explanation.

gNB DL QCL and gNB UL QCL

When transmitting a signal through DL, the base station may transmit the signal by using a transmit beamforming (Tx beamforming). In this case, information regarding the transmit beamforming used by the base station may be indicated by gNB DL quasi-co-located (QCL). Herein, the transmit beamforming used by the base station may be referred to as a transmit (Tx) beamforming corresponding to gNB DL QCL. The signal that the base station transmits by using the transmit beamforming corresponding to gNB DL QCL may be transmitted to the repeater or the terminal. The terminal or repeater may use a receive beamforming in order to receive the signal transmitted by the Tx beamforming corresponding to gNB DL QCL.

For reference, the repeater receives the signal by using a receive beamforming corresponding to gNB DL QCL, whereas the terminal receives the signal by using a receive beamforming corresponding to gNB DL QCL and Repeater DL QCL. When the base station transmits a signal through DL, the repeater may use a receive beamforming in order to receive the signal which is transmit-beamformed and transmitted according to gNB DL QCL of the base station. The receive beamforming may be referred to as a receive (RX) beamforming corresponding to gNB DL QCL. When the base station transmits a signal through DL, the terminal may use a receive beamforming in order to receive the signal which is transmit-beamformed and transmitted according to gNB DL QCL of the base station and/or Repeater DL QCL of the repeater. The receive beamforming may be referred to as an RX beamforming corresponding to gNB DL QCL/Repeater DL QCL.

More specifically, the base station may configure an index for indicating unique gNB DL QCL. That is, a unique index may be configured for each gNB DL QCL. gNB DL QCL of different indexes may correspond to different transmit beamformings. The base station may configure/indicate for the repeater or terminal to receive a specific signal. When the base station configures/indicates for the repeater or terminal to receive a specific signal as described above, an index of unique gNB DL QCL corresponding to the corresponding signal may also be configured/indicated. The repeater or terminal may determine a receive beamforming in order to receive the signal transmitted from the base station according to the configured/indicated index. Accordingly, when signals in which gNB DL QCL of the same index is configured/indicated are received, the same receive beamforming may be used.

Herein, the signal may be an SS/PBCH block (SSB) or a channel state information reference signal (CSI-RS).

Similarly, when receiving a signal through UL, the base station may receive the signal by using a receive beamforming (Rx beamforming). In this case, information regarding the receive beamforming which is used by the base station may be indicated by gNB UL QCL. Herein, the receive beamforming which is used by the base station may be referred to as a receive (Rx) beamforming corresponding to gNB UL QCL. The base station may receive a signal transmitted from the terminal or repeater by using the receive beamforming corresponding to gNB UL QCL.

Herein, the terminal or the repeater may use a transmit beamforming in order for the base station to receive a signal by using the receive beamforming corresponding to the gNB UL QCL.

More specifically, the base station may configure an index for indicating gNB UL QCL. That is, a unique index may be configured for each gNB UL QCL. The base station may configure/indicate for the repeater or terminal to transmit a specific signal. As described above, when the base station configures/indicates for the repeater or terminal to transmit a specific signal, an index of unique gNB UL QCL corresponding to the corresponding signal may also be configured/indicated. The repeater or terminal may determine a transmit beamforming in order to transmit the signal to the base station according to the configured/indicated index. Accordingly, when signals in which gNB UL QCL of the same index is configured/indicated are transmitted, the same transmit beamforming may be used.

Herein, the signal may be a sounding reference signal (SRS).

Repeater DL QCL and Repeater UL QCL

When the base station transmits a signal through DL, the repeater may transmit the signal received from the base station to the terminal in an amplify-forward method. Herein, the repeater may transmit the signal by using a transmit beamforming when transmitting the signal. In this case, information regarding the transmit beamforming which is used by the repeater may be indicated by Repeater DL QCL. Herein, the transmit beamforming which is used by the repeater may be referred to as a transmit (Tx) beamforming corresponding to Repeater DL QCL. The signal that the repeater transmits by using the transmit beamforming corresponding to the Repeater DL QCL may be transmitted to the terminal. The terminal may use a receive beamforming in order to receive the signal which is transmitted by the transmit beamforming corresponding to the Repeater DL QCL. For reference, the terminal may use a receive beamforming corresponding to gNB DL QCL of the base station or Repeater DL QCL of the repeater in order to receive not only the signal transmitted from the repeater but also a signal transmitted from the base station.

When the base station receives a signal through UL, the repeater may transmit a signal received from the terminal to the base station in the amplify-forward method. Herein, the repeater may receive the signal by using a receive beamforming when receiving the signal from the terminal. In this case, information regarding the receive beamforming that the repeater uses may be indicated by Repeater UL QCL. The repeater may receive by using a receive beamforming corresponding to Repeater UL QCL.

Hereinbelow, DL will be assumed unless mentioned otherwise. However, the technical concept of the disclosure may be equally applied to UL.

Figure 12:
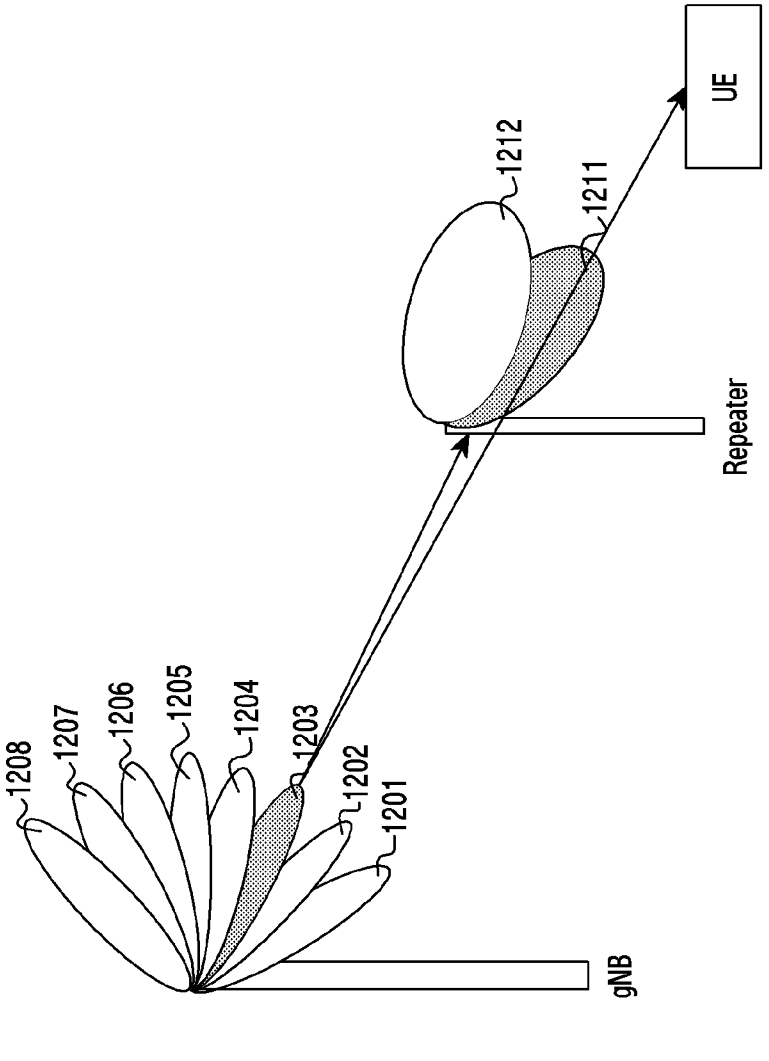
FIG. 12 illustrates a transmit beamforming method of a base station, a repeater, a terminal according to an embodiment of the present disclosure.

FIG. 12 illustrates a method of a base station (gNB), a repeater, and a terminal (UE) used in the present disclosure.

Referring to FIG. 12, the base station may transmit a signal through downlink by using a plurality of transmit beamformings 1201, 1202, . . . , 1208. Herein, it is assumed that the base station may use 8 different transmit beamformings, and the base station may transmit a downlink signal to the repeater and the terminal by using one transmit beamforming 1203. The repeater may transmit the signal through downlink by using a plurality of transmit beamformings 1211, 1212. Herein, it is assumed that the repeater may use two different transmit beamformings, and the repeater may transmit the signal received from the base station in an amplify-forward method by using one transmit beamforming 1211.

[gNB-Repeater QCL Relationship]

The base station may define a relationship between a transmit beamforming of the base station and a transmit beamforming of the repeater. That is, when the base station indicates a specific transmit beamforming, the repeater may transmit a signal by using a transmit beamforming of the repeater corresponding to the transmit beamforming of the base station. More specifically, a transmit beamforming of the repeater which is subordinate to a transmit beamforming of the base station may be defined in the disclosure. The base station may select a specific transmit beamforming, such that a transmit beamforming of the repeater is selected without separate indication. This means that a transmit beamforming is synchronized between the base station and the repeater, and is expressed by a beam synchronized network.

In order to constitute the beam synchronized network, the base station may define a relationship between gNB DL QCL and Repeater DL QCL. This relationship may be referred to as a gNB-Repeater QCL relationship or a gNB-Repeater QCL mapper. That is, when the base station indicates specific gNB DL QCL, the repeater may determine and use Repeater DL QCL corresponding to the specific gNB DL QCL through the gNB-Repeater QCL relationship (or the gNB-Repeater QCL mapper).

For explanation of the disclosure, it is assumed that an index of gNB DL QCL is defined as n=1, 2, . . . , N, and an index of Repeater DL QCL is defined as b=1, 2, . . . B. N may be greater than or equal to B unless mentioned otherwise. There is a base station transmit beamforming of index n corresponding to gNB DL QCL of index n, and there is a repeater transmit beamforming of index b corresponding to Repeater DL QCL of index b.

The base station may define the relationship between gNB DL QCL of index n and Repeater DL QCL of index b as a function f(n, b). Herein, f(n, b) may have 0 or 1. Herein, if f(n, b)=0, gNB DL QCL and Repeater DL QCL are not connected, and, if f(n, b)=1, gNB DL QCL and Repeater DL QCL are connected.

Figure 13:
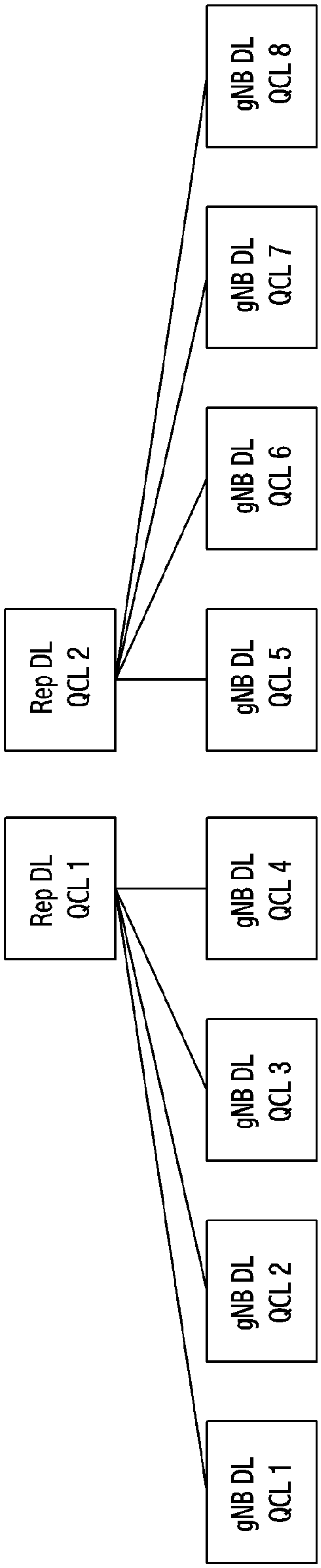
FIG. 13 illustrates a gNB-Repeater QCL mapper according to an embodiment of the present disclosure.

FIG. 13 illustrates a gNB-Repeater QCL mapper according to an embodiment of the present disclosure.

For example, referring to FIG. 13, gNB DL QCL 1, 2, 3, 4 may be connected with Repeater DL QCL 1, and gNB DL QCL 5, 6, 7, 8 may be connected with Repeater DL QCL 2. Accordingly, expressions f(1, 1)=1, f(1, 2)=0, f(2, 1)=1, f(2, 2)=0, f(3, 1)=1, f(3, 2)=0, f(4, 1)=1, f(4, 2)=0, f(1, 1)=0, f(1, 2)=1, f(2, 1)=0, f(2, 2)=1, f(3, 1)=0, f(3, 2)=1, f(4, 1)=0, f(4, 2)=1 may be established.

For reference, function f(n, b) is one of methods of indicating a connection relationship between gNB DL QCL of index n and Repeater DL QCL of index b. In other methods, gNB-Repeater QCL relationship or gNB-Repeater QCL mapper may be defined.

gNB-Repeater QCL mapper of a plurality of repeaters

One or a plurality of repeaters may be connected to one base station. In this case, one or the plurality of repeaters each may transmit a signal transmitted from the base station in the amplify-forward method. Accordingly, the base station may establish a gNB-Repeater QCL relationship for every repeater.

The base station may generate a gNB-Repeater QCL mapper for each of the repeaters, and may configure each gNB-Repeater QCL mapper for each repeater. Herein, one repeater may not know the gNB-Repeater QCL mapper of another repeater.

The base station may satisfy at least the following condition when generating gNB-Repeater QCL mappers of the plurality of repeaters:

When gNB-Repeater QCL mappers are generated for different repeaters, the indexes of gNB DL QCL may be uniquely the same. That is, gNB DL QCL having an index of n in a gNB-Repeater QCL mapper for a first repeater may be gNB DL QCL having an index of n even in a gNB-Repeater QCL mapper for a second repeater. Since this index is used to indicate Repeater DL QCL by using the index of gNB DL QCL in Repeater control information, which will be described below, the different repeaters may not have different indexes.

Figure 14:
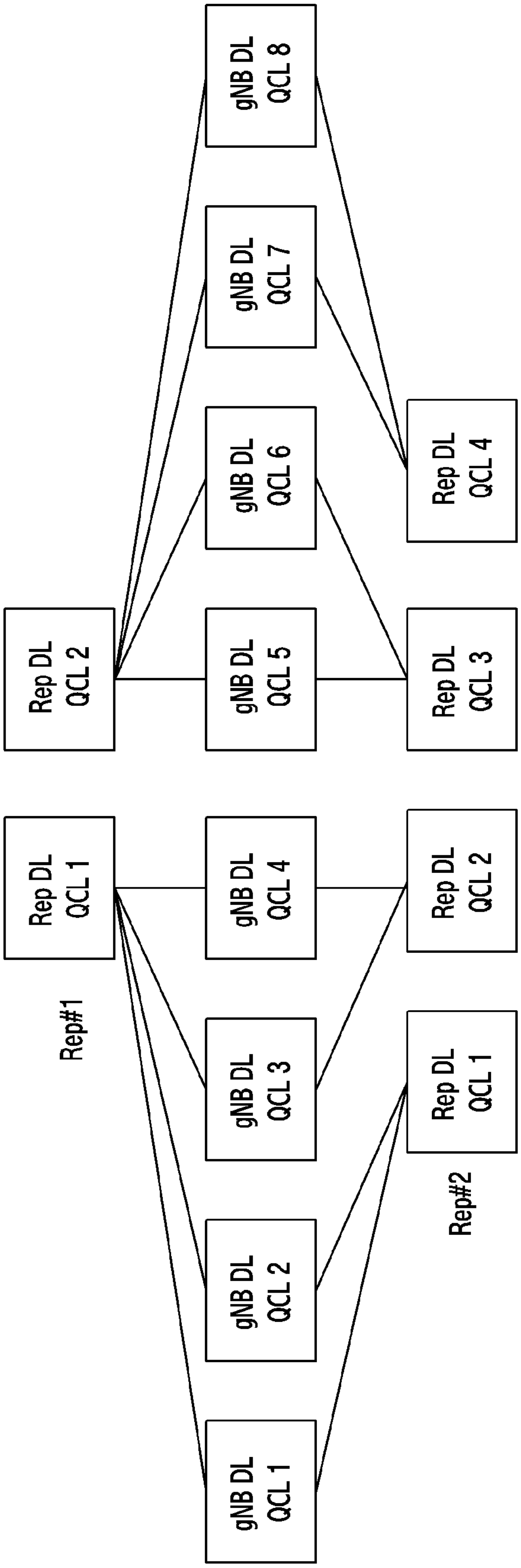
FIG. 14 illustrates a gNB-Repeater QCL mapper of a plurality of repeaters according to an embodiment of the present disclosure.

FIG. 14 illustrates a gNB-Repeater QCL mapper of a plurality of repeaters according to an embodiment of the present disclosure.

Referring to FIG. 14, a gNB-Repeater QCL mappers of a repeater 1 (Rep #1) and a repeater 2 (Rep #2) is illustrated. Herein, the repeater 1 (Rep #1) may have two Rep DL QCLs and the repeater 2 (Rep #2) may have four Rep DL QCLs. Accordingly, the repeaters may have different numbers of Rep DL QCLs (The repeaters may have different numbers of transmit beamformings). However, the same number of gNB DL QCLs and gNB DL QCLs of the same indexes may be used for all of the repeaters in the gNB-Repeater QCL mapper. Herein, the number of gNB DL QCLs may be 8, and the index may be expressed as 1, 2, . . . , 8.

Referring to FIG. 14, in the repeater 1 (Rep #1), gNB DL QCLs 1, 2, 3, 4 may be connected with Rep DL QCL 1 of the repeater 1, and gNB DL QCLs 5, 6, 7, 8 may be connected with Rep DL QCL 2 of the repeater 2. Accordingly, expressions f(1, 1)=1, f(1, 2)=0, f(2, 1)=1, f(2, 2)=0, f(3, 1)=1, f(3, 2)=0, f(4, 1)=1, f(4, 2)=0, f(1, 1)=0, f(1, 2)=1, f(2, 1)=0, f(2, 2)=1, f(3, 1)=0, f(3, 2)=1, f(4, 1)=0, f(4, 2)=1 may be established. The gNB-Repeater QCL mapper may be configured for the repeater 1.

Referring to FIG. 14, in the repeater 2 (Rep #2), gNB DL QCLs 1, 2 may be connected with Rep DL QCL 1 of the repeater 2, gNB DL QCLs 3, 4 may be connected with Rep DL QCL 2 of the repeater 2, gNB DL QCLs 5, 6 may be connected with Rep DL QCL 3 of the repeater 2, and gNB DL QCLs 7, 8 may be connected with Rep DL QCL 4 of the repeater 2. Accordingly, expressions f(1, 1)=1, f(1,2)=0, f(1, 3)=0, f(1, 4)=0, f(2, 1)=1, f(2, 2)=0, f(2, 3)=0, f(2, 4)=0, f(3, 1)=0, f(3, 2)=1, f(3, 3)=0, f(3, 4)=0, f(4, 1)=0, f(4, 2)=1, f(4, 3)=0, f(4, 4)=0, f(5, 1)=0, f(5, 2)=0, f(5, 3)=1, f(5, 4)=0, f(6, 1)=0, f(6, 2)=0, f(6, 3)=1, f(6, 4)=0, f(7, 1)=0, f(7, 2)=0, f(7, 3)=0, f(7, 4)=1, f(8, 1)=0, f(8, 2)=0, f(8, 3)=0, f(8, 4)=1 may be established. The gNB-Repeater QCL mapper may be configured for the repeater 2.

One-to-one, Many-to-One, One-to-Many mapping method

One Repeater DL QCL may be connected to one gNB DL QCL of the base station. This may be referred to as one-to-one mapping. One Repeater DL QCL may be connected to a plurality of gNB DL QCLs of the base station. This may be referred to as many-to-one mapping. Finally, a plurality of Repeater DL QCLs may be connected to one gNB DL QCL of the base station. This may be referred to as one-to-many Mapping.

The base station may determine a gNB-Repeater QCL relationship (gNB-Repeater QCL mapper) in the one-to-one mapping method, and may configure the same for the repeater. More specifically, the one-to-one mapping method may be performed as follows. It is assumed that the base station has N gNB DL QCLs, and the repeater has B Repeater DL QCLs. Herein, generally, N≥B. The base station may select N'=B gNB DL QCLs from the N gNB DL QCLs. The base station may generate a gNB-Repeater QCL relationship by mapping between the N'=B selected gNB DL QCLs of the base station and the B Repeater DL QCLs of the repeater in the one-to-one mapping method.

The base station may determine a gNB-Repeater QCL relationship (gNB-Repeater QCL mapper) in the many-to-one mapping method, and may configure the same for the repeater. More specifically, the many-to-one mapping method may be performed as follows. It is assumed that the base station has N gNB DL QCLs, and the repeater has B Repeater DL QCLs. Herein, generally, N≥B. The base station may select N' gNB DL QCLs from the N gNB DL QCLs. Herein, N'≥B The base station may connect one Repeater DL QCL to each of the N' selected gNB DL QCLs.

The base station may determine a gNB-Repeater QCL relationship (gNB-Repeater QCL mapper) in the one-to-many mapping method, and may configure the same for the repeater. The one-to-many mapping method may be performed as follows. It is assumed that the base station has N gNB DL QCLs, and the repeater has B Repeater DL QCLs. Herein, generally, N≥B. The base station may select N' gNB DL QCLs from the N gNB DL QCLs. Herein, N'<B. The base station may connect one or a plurality of Repeater DL QCLs to each of the N' selected gNB DL QCLs.

The one-to-one, many-to-one, one-to-many mapping methods may be generally expressed as described below.

The base station may generate a gNB-Repeater QCL relationship (gNB-Repeater QCL mapper), and may configure the same for the repeater. More specifically, it is assumed that the base station has N gNB DL QCLs and the repeater has B Repeater DL QCLs. Herein, generally, N≥B. The base station may select N' gNB DL QCLs from the N gNB DL QCLs. The base station may connect one or a plurality of Repeater DL QCLs to each of the N' selected gNB DL QCLs.

gNB DL QCL selection method

A method by which the base station selects N' gNB DL QCLs from N Gnb DL QCLs will be described.

In a first method, the base station may configure reception of one or a plurality of CSI-RSs for the repeater in order to measure a DL channel between the base station and the repeater. Each CSI-RS may have an index of a unique gNB DL QCL configured. The repeater may receive the CSI-RSs by using a receive beamforming corresponding to the unique gNB DL QCL, and may measure quality of a signal. The repeater may report quality of the signal measured in one or the plurality of CSI-RSs to the base station. The reporting may be transmitted from the repeater to the base station through a PUCCH or PUSCH. The base station may select the N' most excellent gNB DL QCLs, based on the quality of the signal measured in one or the plurality of CSI-RSs. Herein, the CSI-RS is one example, and an SSB or a PDCCH (DMRS of the PDCCH), a PDSCH (DMRS of the PDSCH) may be used.

In a second method, the base station may configure transmission of one or a plurality of SRSs for the repeater in order to measure a DL channel between the base station and the repeater. Each SRS may have an index of a unique gNB UL QCL configured. The repeater may transmit the respective SRSs by using a transmit beamforming corresponding to the unique gNB UL QCL. The base station may receive the SRS by using a receive beamforming corresponding to the unique gNB UL QCL. The base station may receive the respective SRSs and may measure quality of an uplink signal. The base station may induce quality of a downlink signal from the quality of the uplink signal by using a channel reciprocity. Accordingly, the base station may select the N' most excellent gNB UL QCLs, based on the quality of the downlink signal from each SRS. In addition, a gNB DL QCL corresponding to the gNB UL DCL may be used. For reference, the gNB DL QCL corresponding to the gNB UL QCL may use a receive beamforming corresponding to the gNB UL QCL as a transmit beamforming.

Figure 15:
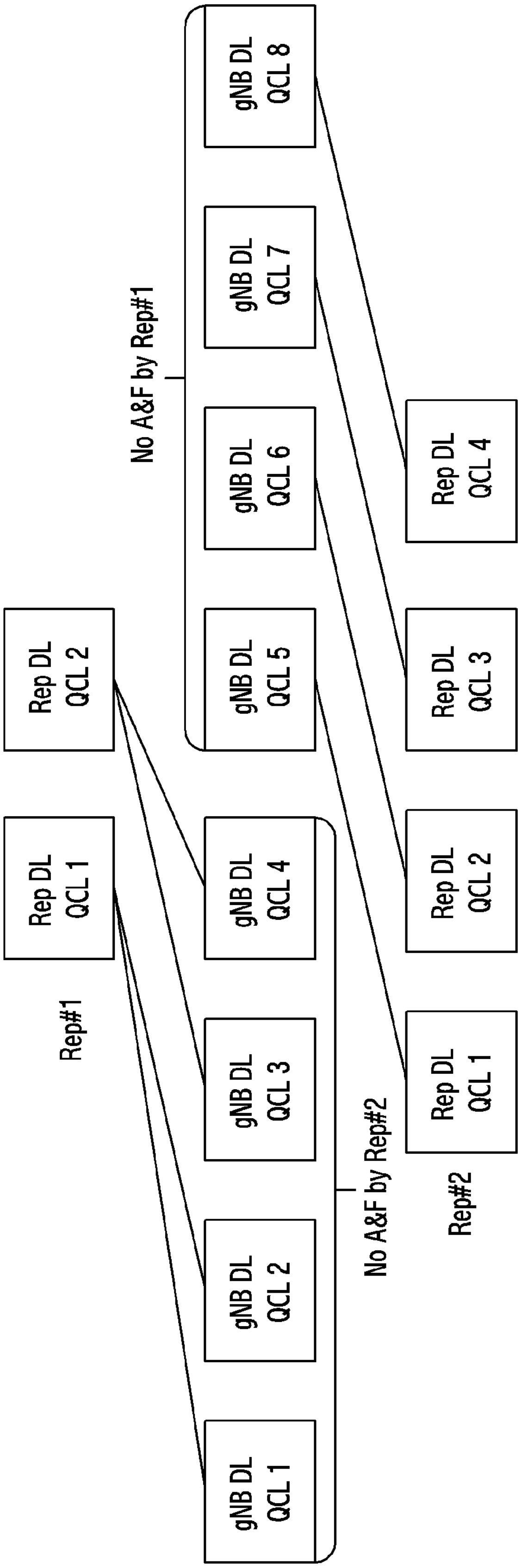
FIG. 15 illustrates a gNB-Repeater QCL mapper of a plurality of repeaters in which some gNB DL QCL is not used for a repeater according to an embodiment of the present disclosure.

FIG. 15 illustrates a gNB-Repeater QCL mapper of a plurality of repeaters according to an embodiment of the present disclosure. In this example, some gNB DL QCLs are not used for the repeaters.

Referring to FIG. 15, a base station may have 8 gNB DL QCLs in total, but some of the gNB DL QCLs may not be connected with a Rep DL QCL of a repeater. A repeater 1 (Rep #1) may have two Rep DL QCLs, and the two Rep DL QCLs may be connected with gNB DL QCLs 1, 2, 3, 4, but may not be connected with gNB DL QCLs 5, 6, 7, 8. Accordingly, the gNB DL QCLs 5, 6, 7, 8 may not have the Rep DL QCL of the corresponding repeater 1. In this case, when the base station transmits a downlink signal to one of the gNB DL QCLs that are not connected (gNB DL QCLs 5, 6, 7, 8 in FIG. 15), the repeater 1 may not perform amplify-forward. That is, the repeater 1 may not transmit the signal of the base station in the above-described case. This is because a channel environment between the repeater 1 and the base station is good in the case of the gNB DL QCLs 1, 2, 3, 4 (a channel condition satisfies a predetermined condition), but is not good in the case of the gNB DL QCLs 5, 6, 7, 8 (a channel condition does not satisfy a predetermined condition).

Referring to FIG. 15, the base station may have 8 gNB DL QCLs in total, but some of the gNB DL QCLs may not be connected with a Rep DL QCL of a repeater. A repeater 2 (Rep #2) may have four Rep DL QCLs, and the four Rep DL QCLs may be connected with the gNB DL QCLs 5, 6, 7, 8, but may not be connected with the gNB DL QCLs 1, 2, 3, 4. Accordingly, the gNB DL QCLs 1, 2, 3, 4 may not have the Rep DL QCL of the corresponding repeater 2. In this case, when the base station transmits a downlink signal to one of the gNB DL QCLs that are not connected (gNB DL QCLs 1, 2, 3, 4 in FIG. 15), the repeater 2 may not perform amplify-forward. That is, in this case, the repeater 2 may not transmit the signal of the base station. This is because a channel environment between the repeater 2 and the base station is good in the case of the gNB DL QCLs 5, 6, 7, 8 (a channel condition satisfies a predetermined condition), but is not good in the case of the gNB DL QCLs 1, 2, 3, 4 (a channel condition does not satisfy a predetermined condition).

In the above-described mapping method, B Repeater DL QCLs are used. However, the base station may select and use fewer Repeater DL QCLs, for example, B'(<B) Repeater DL QCLs. That is, the base station may use only some of the Repeater DL QCLs that are usable by the repeater, and may not use some other Repeater DL QCLs. This method may be used when some of the Repeater DL QCLs provide good performance to a terminal, but some other Repeater DL QCLs do not provide good performance.

According to the one-to-one mapping method and the many-to-one method described above, when one gNB DL QCL is determined, one Repeater DL QCL may be determined accordingly. This characteristic may be used in Repeater control information, which will be described later. However, in the one-to-many method, even when one gNB DL QCL is determined, a plurality of Repeater DL QCLs are determined. Accordingly, additional information is needed to determine one Repeater DL QCL. This will be described in the part of Repeater control information.

RRC Configuration/MAC-CE Update for QCL Mapper.

The base station may configure a gNB-Repeater QCL mapper for the repeater as a higher layer signal. Herein, the higher layer signal may include a radio resource control (RRC) signal.

The base station may change the gNB-Repeater QCL mapper configured for the repeater by using a MAC-CE signal. That is, the base station may replace a previous gNB-Repeater QCL mapper with a new gNB-Repeater QCL mapper through the MAC-CE signal.

Herein, the MAC-CE signal may change the whole gNB-Repeater QCL mapper by newly configuring.

For example, when an index of a new Repeater DL QCL is connected to indexes of some gNB DL QCLs as information included in the MAC-CE signal, the repeater may change to the index of the new Repeater DL QCL for the index of the gNB DL QCL, and may disconnect indexes of the other gNB DL QCLs, which are not included in some gNB DL QCLs, from the index of a previous Repeater DL QCL.

Herein, the MAC-CE signal may change only a part of the gNB-Repeater QCL mapper.

For example, when an index of a new Repeater DL QCL is connected to indexes of some gNB DL QCLs as information included in the MAC-CE signal, the repeater may change to the index of the new Repeater DL QCL for the index of the gNB DL QCL, and may maintain connection of indexes of the other gNB DL QCLs, which are not included in some gNB DL QCLs, with the index of a previous Repeater DL QCL.

MAC-CE application time

When the gNB-Repeater QCL mapper is changed by the MAC-CE signal, a new gNB-Repeater QCL mapper may be applied after a predetermined time or a predetermined symbol from a reception time of a MAC-CE reception signal. Alternatively, when the gNB-Repeater QCL mapper is changed by the MAC-CE signal, a new gNB-Repeater QCL mapper may be applied after a predetermined time or a predetermined symbol from a HARQ-ACK transmission time of a MAC-CE reception signal.

Herein, the predetermined time may be 3 ms. In addition, the predetermined symbol may be the number of symbols within 3 ms. More specifically, the predetermined time or the predetermined symbol may be expressed by $3*N_{symbol}*2^{u}$. Herein, $N_{symbol}$=14 (12 in the case of an extended CP) and u is a subcarrier spacing configuration. u=0 in the case of a subcarrier of 15 kHz, u=1 in the case of a subcarrier of 30 kHz, u=2 in the case of a subcarrier of 60 kHz" u=3 in the case of a subcarrier of 120 kHz, u=4 in the case of a subcarrier of 240 kHz, u=5 in the case of a subcarrier of 480 kHz, u=6 in the case of a subcarrier of 960 kHz. Herein, $2^{u}$*15 kHz is a subcarrier spacing of a downlink signal.

Herein, the application time may be applied to the first slot after the predetermined time or the predetermined symbol.

[Repeater Control Information]

The repeater receives a configuration of the gNB-Repeater QCL mapper from the base station as described above. The repeater may not know at what time and with what gNB DL QCL the base station performs DL transmission. Accordingly, the repeater may receive relevant information from the base station. This information may be referred to as repeater control information (RCI).

The RCI may include a time interval and an index of a gNB DL QCL of the base station in the time interval. The repeater may determine one Repeater DL QCL index according to the index of the gNB DL QCL and the pre-configured gNB-Repeater QCL mapper. The repeater may transmit a signal in an amplify-forward method according to the Repeater DL QCL determined in the time interval.

In a first embodiment of the disclosure, the RCI may include an index of a table entry. Herein, the entry of the table may include a time period and an index of a gNB DL QCL of the base station in the time period. More specifically, each entry of the table may include the following information:

Index of table entry (which may have a value of 0, 1, 2 . . . );

Period and offset. Herein, the period and the offset may be determined by the number of basic time units. The basic time unit may be one of an OFDM symbol, a set of OFDM symbols, a slot, a set of slots or an absolute time (X ms). In the disclosure, for convenience of explanation, the slot may be used as the basic time unit, but the disclosure is not limited thereto. That is, in the disclosure, the gNB DL QCL may be changed per period of P slots. The offset may be applied to a frame boundary. That is, if the offset is O slots, a period of the P slots from slot O of every frame may be applied. That is, the gNB DL QCL is repeated in the next {slot O+P, slot O+P+1, . . . , slot O+2*P−1} during the P slots of {slot O, slot O+1, . . . , slot O+P−1}. For convenience of explanation, it is assumed in the disclosure that O=0; And Indexes of respective gNB DL QCLs of the P slots according to the period.

For example, if P=8, indexes [i_1, i_2, i_3, . . . , i_8] of the 8 gNB DL QCLs may be configured. Herein, i_k=1, 2, . . . , N.

This table may be configured for the repeater as a higher layer signal by the base station. In this case, the higher layer signal may include an RRC signal.

According to the first embodiment, the repeater may receive the index of the table entry from the RCI. The repeater may determine a period and an offset and a gNB DL QCL to be applied to the period and the offset from the index of the table entry configured. The repeater may determine one Repeater DL QCL based on the gNB DL QCL and the gNB-Repeater QCL mapper. The repeater may transmit a signal in an amplify-forward method by using a transmit beamforming corresponding to the Repeater DL QCL which is determined in a slot according to the period and the offset.

Table 24 is a table according to the first embodiment. The first column of the table indicates the index of the table entry, the second column indicates the period and the offset, and the third column indicates gNB DL QCLs. If the repeater receives an indication of index 0 from the RCI, gNB DL QCLs [1, 2, 3, 4, 5, 6, 7, 8] may be assumed in slot 8*n, slot 8*n+1, . . . slot 8*n+7.

TABLE 24

| Index | Period and Offset (P, O) | gNB DL QCLS |
|---|---|---|
| 0 | (P, O) = (8, 0) | [1, 2, 3, 4, 5, 6, 7, 8] |
| 1 | (P, O) = (8, 0) | [1, 1, 2, 2, 3, 3, 4, 4] |
| 2 | (P, O) = (8, 0) | [5, 5, 6, 6, 7, 7, 8, 8] |
| 3 | (P, O) = (12, 0) | [1, 3, 5, 7, 2, 4, 6, 8, 1, 2, 3, 4] |
| . . . | | . . . |

In a second embodiment of the disclosure, the RCI may include an index of a table entry. Herein, the entry of the table may include a time interval and an index of a gNB DL QCL of the base station in the time interval. More specifically, each entry of the table may include the following information:

Index of table entry (which may have a value of 0, 1, 2 . . . );

Time interval. The time interval may be indicated by a basic time unit. The basic time unit may be one of an OFDM symbol, a set of OFDM symbols, a slot, a set of slots or an absolute time (X ms); and Indexes of gNB DL QCLs to be applied to the time interval. For example, if the time interval includes T=8 basic time units, indexes [i_1, i_2, i_3, . . . , i_8] of the 8 gNB DL QCLs may be configured. Herein, i_k=1, 2, . . . , N.

This table may be configured for the repeater as a higher layer signal by the base station. In this case, the higher layer signal may include an RRC signal.

According to the second embodiment, the repeater may receive the index of the table entry from the RCI. The repeater may determine a time interval and a gNB DL QCL to be applied to the time interval from the index of the table entry configured. The repeater may determine one Repeater DL QCL based on the gNB DL QCL and the gNB-Repeater QCL mapper. The repeater may transmit a signal in an amplify-forward method by using a transmit beamforming corresponding to the Repeater DL QCL which is determined in a slot of the time interval.

Table 25 is a table according to the second embodiment. The first column of the table indicates the index of the table entry, the second column indicates the time interval, and the third column indicates gNB DL QCLs. If the repeater receives an indication of index 0 from the RCI, gNB DL QCLs [1, 2, 3, 4, 5, 6, 7, 8] may be assumed in temporal order in the specific 8 slots. In addition, the gNB DL QCL may not be assumed after the specific 8 slots.

TABLE 25

| Index | Time interval (T) | gNB DL QCLs |
|---|---|---|
| 0 | 8 | [1, 2 ,3 ,4, 5, 6, 7, 8] |
| 1 | 8 | [1, 1, 2, 2, 3, 3, 4, 4] |
| 2 | 8 | [5, 5, 6, 6, 7, 7, 8, 8] |
| 3 | 12 | [1, 3, 5, 7, 2, 4, 6, 8, 1, 2, 3, 4] |
| . . . | | . . . |

The first embodiment and the second embodiment of the disclosure described above differ from each other in that it is assumed in the first embodiment that the repeater repeats the gNB DL QCLs per period, whereas, in the second embodiment, an indicated gNB DL QCL is assumed only in an indicated time interval.

Additional indicator for one-to-many mapping

When the Repeater-gNB QCL mapper applies the one-to-many mapping method (a plurality of Repeater DL QCLs are connected to one gNB DL QCL), the repeater may determine one Repeater DL QCL based on index i_k of the gNB DL QCL of the first embodiment or the second embodiment. More specifically, even if i_k is indicated as an index of the gNB DL QCL of the base station, the repeater may not select one Repeater DL QCL since the plurality of Repeater DL QCLs are connected to the gNB DL QCL of the index of i_k. To solve this, the following methods may be performed.

In a first method, the entry of each table in the first embodiment or the second embodiment may include an additional indicator. The indicator may be used to selected one of the plurality of Repeater DL QCLs. More specifically, the additional indicator may have a value of 0, 1, 2, . . . . Herein, 0 indicates the smallest index out of the plurality of Repeater DL QCLs connected to the gNB DL QCL. Herein, 1 indicates the second smallest index out of the plurality of Repeater DL QCLs connected to the gNB DL QCL. Herein, j indicates the (j+1)-th smallest index out of the plurality of Repeater DL QCLs connected to the gNB DL QCL. That is, the index may indicate the indexes of the plurality of repeater DL QCLs in an ascending order.

In a second method, one Repeater DL QCL may be determined based on an index of a basic time unit. For example, when the basic time unit is a slot, one Repeater DL QCL may be determined according to an index of a slot. If Q Repeater DL QCLs are connected to one gNB DL QCL, j=floor (an index/Q of a basic time unit) may be obtained. The repeater may select a Repeater DL QCL that has the (j+1)-th smallest index from the Q Repeater DL QCLs.

In a third method, one Repeater DL QCL may be determined according to an index of a slot received by RCI. If Q Repeater DL QCLs are connected to one gNB DL QCL, j=floor (an index/Q of a slot received by RCI) may be obtained. The repeater may select a Repeater DL QCL that has the (j+1)-th smallest index from the Q Repeater DL QCLs.

Reference numerology for basic time unit

In the first embodiment or the second embodiment, when the repeater receives RCI, a subcarrier spacing of a basic time unit of the RCI (for example, the slot of the first embodiment and the second embodiment) may be determined. More specifically, when an OFDM symbol, an OFDM symbol set, a slot, a slot set is used as the basic time unit, a time length of the basic time unit may be determined according to a subcarrier spacing. A method of determining a subcarrier spacing may include at least one of the following methods.

In a first method, the subcarrier spacing may be configured for the repeater by the base station. In this case, repeaters of one base station may receive a configuration of a subcarrier spacing of the same value. In this case, the subcarrier spacing may satisfy the following condition.

A subcarrier spacing of a certain cell may satisfy at least the following condition. If a subcarrier spacing usable as a BWP in a certain cell is plural in number, a configured subcarrier spacing may be smaller than or equal to the smallest value of the subcarrier spacings. For example, if the subcarrier spacing usable as a BWP in a certain cell is 15 kHz and 30 kHz, a subcarrier spacing that is configurable for the repeater by the terminal may be smaller than or equal to the smallest subcarrier spacing, 15 kHz. Accordingly, 15 kHz may be configured as the subcarrier spacing, but 30 kHz, 60 kHz which are greater than 15 kHz may not be used as the subcarrier spacing. This may prevent a QCL from being changed in the middle of the OFDM symbol since a symbol length is shortened when a high subcarrier spacing is used.

When the repeater transmits signals of a plurality of cells in an amplify-forward method, a value that is smaller than or equal to the smallest value of the subcarrier spacings usable in BWPs of all cells may be used as a subcarrier spacing. For example, when the repeater transmits signals of two cells in the amplify-forward method, if the smallest value of the subcarrier spacings usable in the BWP of the first cell is 30 kHz and the smallest value of the subcarrier spacings usable in the BWP of the second cell is 60 kHz, a value that is smaller than or equal to 30 kHz which is the smallest value among the sub-carrier spacings may be used as a subcarrier spacing. That is, 15 kHz to 30 kHz may be used as a subcarrier spacing. However, for example, 60 kHz, 120 kHz which is larger than 30 kHz may not be used as a subcarrier spacing. The cells may be limited to cells that are included intra-band carrier aggregation (CA).

In a second method, a subcarrier spacing may be determined according to a frequency range (FR) of a cell including a signal transmitted in an amplify-forward method, and may be determined based on the smallest value of the subcarrier spacings usable within the frequency range. For example, if the frequency range is FR1, usable subcarrier spacings are 15 kHz, 30 kHz, 60 kHz, and accordingly, the smallest value, 15 kHz, may be used. If the frequency range is FR2-1, usable subcarrier spacings are 60 kHz, 120 kHz, and accordingly, the smallest value, 60 kHz, may be used. If the frequency range is FR2-2, usable subcarrier spacings are 120 kHz, 480 kHz, 960 kHz, and accordingly, the smallest value, 120 kHz, may be used.

Application time for RCI

In the first embodiment or the second embodiment, when the repeater receives RCI, the repeater may determine a time to apply a Repeater DL QCL according to information indicated by the RCI. This time may be obtained in the following methods.

In a first method, the base station may configure one value for the repeater. This value may be applied after a time at which a PDCCH for transmitting RCI is received, and the Repeater DL QCL may be applied according to information indicated by the RCI after a time at which the corresponding value is configured.

Herein, the one value may be configured by an absolute time (X ms), or may be configured by the number of basic time units. When the one value is configured by the number of basic time units, a length of an OFDM symbol may be determined according to a subcarrier determination method of the first method or the second method described above.

Herein, the time at which the PDCCH for transmitting the RCI is received may be a last symbol where the PDCCH is received. That is, the Repeater DL QCL indicate by the RCI may be applied after the absolute time (X ms) or the number of basic time units after the last symbol.

CORESET, Search space, PDCCH configuration

The base station may configure a CORESET, a search space or a PDCCH for the repeater to receive RCI. The repeater may receive RCI in the configured CORESET, search space through the PDCCH.

In an embodiment of the disclosure, the base station may transmit the RCI via a group-common PDCCH. The group-common PDCCH refers to a PDCCH that is received by a plurality of repeaters. To achieve this, the base station may configure at least the following information for the plurality of repeaters:

- As first information, a radio network temporary identifier (RNTI) which is used in a cyclic redundancy code (CRC) for determining whether RCI transmitted by the group-common PDCCH is successfully received may be configured for the plurality of repeaters. The RNTI may be referred to as RCI-RNTI, and in this regard, the same value may be configured for the plurality of repeaters;

As second information, a length of the RCI transmitted by the group-common PDCCH may be configured for the plurality of repeaters. Different repeaters may require information of different RCI. For example, a first repeater may amplify and forward a signal of one cell (carrier), whereas a second repeater may amplify and forward signals of two or more cells (carriers). Accordingly, the base station transmitting a plurality of pieces of RCI for repeaters may be inefficient. For this, the RCI may include information regarding a plurality of repeaters, and, as the length of the RCI, the same value may be configured for the repeaters. The terminal may receive the group-common PDCCH based on the length of the RCI configured; and As third information, a start position and a length of a bit of information that is needed by the repeater in the RCI transmitted by the group-common PDCCH may be configured for the repeater. For example, when the RCI transmitted by the group-common PDCCH includes information of the first repeater and information of the second repeater, a start position and a length of a bit including information needed by the first repeater may be configured for the first repeater, and a start position and a length of a bit including information needed by the second repeater may be configured for the second repeater. In another example, when the RCI transmitted by the group-common PDCCH includes information of a first cell (carrier) and information of a second cell (carrier), if the first repeater amplifies and forwards a signal of the first cell (carrier), a start position and a length of a bit of information of the first cell (carrier) may be configured for the first repeater, and, if the second repeater amplifies and forwards a signal of a second cell (carrier), a start position and a length of a bit of information of the second cell (carrier) may be configured for the second repeater. If a third repeater amplifies and forwards signals of the first cell (carrier) and the second cell (carrier), a start position and a length of a bit of information of the first cell (carrier) and a position and a length of a bit of information of the second cell (carrier) may be configured.

In an embodiment of the disclosure, the base station may configure a CORESET and a search space for receiving the group-common PDCCH including the RCI for the repeater. Herein, the CORESET may be one of cell common CORESETs, and the search space may be a common search space (CSS). Furthermore, the CORESET and search space configuration may be common to the plurality of repeaters. Herein, the reason why the CORESET is the cell common CORESET and the search space is configured as the CSS is that the plurality of repeaters may receive the group-common PDCCH from the CORESET or the search space.

For reference, a monitoring occasion in which the PDCCH is received and the number of PDCCH candidates per aggregation level may be configured for the search space. For the sake of high reliability, an aggregation level of the group-common PDCCH including the RCI may be limited to some aggregation levels. For example, the aggregation level may be limited to one or two of aggregation levels 8 and 16. In addition, the number of PDCCH candidates may be limited at the aggregation level in order to reduce the number of blind decoding of the group-common PDCCH at the repeater. For example, the number of PDCCH candidates per each aggregation level may be limited to 1 to 2. For example, the repeater may limit the number of PDCCH candidates of all aggregation levels of the group-common PDCCH including the RCI. For example, when aggregation levels 8 and 16 are configured, the number of PDCCH candidates of the aggregation levels 8 and 16 may be limited to 2 or 4.

Search space prioritization

In an embodiment of the disclosure, the repeater may monitor other PDCCHs besides the group-common PDCCH including the RCI. For example, the base station may transmit a PDCCH for scheduling a PDSCH for transmitting a MAC-CE to the repeater, and the repeater may monitor the PDCCH in order to receive the PDCCH. Accordingly, a plurality of search spaces may be configured for the repeater. However, since the repeater may decode PDCCHs within the number of blind decoding given thereto, the repeater may not decode PDCCHs exceeding the number of blind decoding. To this end, the repeater may not receive some search spaces when the number of blind decoding is exceeded.

More specifically, the repeater may perform blind decoding with respect to a search space in which monitoring of the group-common PDCCH including the RCI is configured, in preference to other search spaces. For example, it is assumed that the number of blind decoding given to the repeater is NBD. It is assumed that the number of decoding needed in the search space in which monitoring of the group-common PDCCH including the RCI is configured is NRCI,BD. If NRCI,BD≤NBD, the group-common PDCCHs of the search space in which monitoring of the group-common PDCCH including the RCI is configured may be blind-decoded. In addition, remaining NBD-NRCI,BD may be used for blinding decoding of other search spaces.

More specifically, the repeater may perform blind decoding with respect to a search space in which monitoring of the group-common PDCCH including the RCI is configured, in preference to other search spaces. If the search space in which monitoring of the group-common PDCCH including the RCI is configured, and other search spaces are configured in one slot, the terminal may always monitor only the search space in which monitoring of the group-common PDCCH including the RCI is configured, and may not monitor other search spaces. If the search space in which monitoring of the group-common PDCCH including the RCI is configured is not configured and other search spaces are configured in another slot, the terminal may monitor other search spaces. Herein, the base station may configure the search space in which monitoring of the group-common PDCCH including the RCI is configured to satisfy NRCI, BD≤NBD.

Herein, only the number of blind decoding is considered, but the number of blind decoding may be replaced with the number of control channel elements (CCEs) for channel estimation. Herein, only the number of blind decoding is considered, but the number of blind decoding may be replaced with the number of blind decoding and the number of CCEs for channel estimation.

[Repeater Operation when RCI Reception Fails]

Some repeaters may fail to receive the group-common PDCCH including the RCI. In this case, some repeaters may not know the gNB DL QCL of the base station, and accordingly, may not know the Rep DL QCL of the repeater. Accordingly, operations of the repeater when the repeater fails to receive the group-common PDCCH including the RCI may be defined.

In a first method, when the repeater fails to receive the group-common PDCCH including the RCI and is not able to define a Rep DL QCL of a specific time interval, the repeater may define one of the Rep DL QCLs as a default Rep DL QCL, and may transmit a signal through the default Rep DL QCL in an amplify-forward method. Herein, the default Rep DL QCL may be determined as follows:

- A Rep DL QCL that corresponds to a specific index of the indexes of the Rep DL QCLs is always a default Rep DL QCL. That is, when the repeater gives indexes to Rep DL QCLs, the repeater may map a Rep DL QCL to be used as a default Rep DL QCL to a specific index. Herein, the specific index may be a lowest index (or a highest index);
- A certain one of the Rep DL QCLs may be selected and may be used as a default Rep DL QCL. Herein, a method of selecting a certain one may be implementation of the repeater; and
- The base station may configure one of the Rep DL QCLs as a default Rep DL QCL for the repeater. Since the base station may know the Rep DL QCL that is used by the repeater, the base station may select an appropriate one from the Rep DL QCLs as a default Rep DL QCL, and may configure the selected one for the repeater.

In a second method, when the repeater fails to receive the group-common PDCCH including the RCI and is not able to define a Rep DL QCL of a specific time interval, the repeater may not perform amplify-forward in the specific interval. That is, the repeater may stop transmitting during the specific time interval. To the contrary, when the repeater knows a definition of a Rep DL QCL of a specific time interval through the group-common PDCCH including the RCI, the repeater may perform amplify-forward according to the Rep DL QCL determined in the specific time interval. This is because a channel between the base station and the repeater is so poor that the repeater cannot receive the RCI, and the repeater may not transmit a correct signal to the terminal even when transmitting the signal in the amplify-forward method.

In a third method, when the repeater fails to receive the group-common PDCCH including the RCI and is not able to define a Rep DL QCL of a specific time interval, it may be assumed that the repeater receives a specific value as a RCI value. For example, when an index value of a table entry is transmitted in the RCI, the repeater may assume that a lowest index value is received. The repeater may determine Rep DL QCL information of the specific time interval according to information defined in the table entry corresponding the lowest index value.

In a fourth method, when the repeater fails to receive the group-common PDCCH including the RCI and is not able to define a Rep DL QCL of a specific time interval, the repeater may obtain a Rep DL QCL from QCL information of another signal of the specific time interval. For example, when SS/PBCH is transmitted in the specific time interval, the repeater may obtain an index of a gNB DL QCL from the SS/PBCH, and may obtain a Rep DL QCL through the index.

In a fifth method, when the repeater fails to receive the group-common PDCCH including the RCI and is not able to define a Rep DL QCL of a specific time interval, the repeater may perform amplify-forward by using a Rep DL QCL which is used in a previous time interval before the specific time interval. That is, the repeater may perform amplify-forward by using the Rep DL QCL used in the previous time interval until a group-common PDCCH including new RCI is correctly received.

Semi-static QCL period and flexible QCL period

The operations performed in the first to fifth methods when the repeater fails to receive the group-common PDCCH including the RCI have been described. However, the repeater may frequently fail to receive the group-common PDCCH according to a channel condition between the base station and the repeater, and the repeater may frequently transmit signals through a wrong Rep DL QCL. To prevent this, a semi-static QCL period and a flexible QCL period may be configured as follows.

First, the base station may configure QCL information of a time interval as a higher layer signal for the repeater. The QCL information may be an index of a gNB DL QCL or an index of a Repeater DL QCL.

The time interval may be divided into a semi-static QCL period and a flexible QCL period.

In the semi-static QCL period, the QCL information configured as a higher layer signal may not be changed in the RCI. In other words, the base station may configure a time interval in which QCL information is not changed, and may configure QCL information (gNB DL QCL index or Repeater DL QCL index) that is not changed in the time interval. Accordingly, since the QCL information is fixed regardless of whether the RCI is received, the repeater does not need to apply the first or fifth method described above. That is, in the semi-static QCL period, the repeater may transmit signals through a correct Repeater DL QCL.

The flexible QCL period may be a time interval in which QCL information is changeable by the RCI. In the flexible QCL period, QCL information may be configured for a higher layer. However, the configured QCL may be overridden by QCL information indicated in the RCI. If there is no QCL information indicated through the RCI in the flexible QCL period, the repeater may transmit signals in an amplify-forward method based on the QCL information configured as the higher layer. In the flexible QCL period, the repeater may receive the group-common PDCCH including the RCI. If the repeater fails to receive the group-common PDCCH, the repeater may operate according to the first or fifth method described above.

A higher layer signal may include an RRC signal. In addition, a higher layer signal may include an MAC-CE signal.

The base station may configure a time interval and QCL information for the repeater as follows:

- Period and offset. Herein, the period and the offset may be determined by the number of basic time units. The basic time unit may be one of an OFDM symbol, a set of OFDM symbols, a slot, a set of slots or an absolute time (X ms). In the disclosure, for convenience of explanation, the slot may be used as the basic time unit, but the disclosure is not limited thereto. That is, in the disclosure, a gNB DL QCL may be changed per period of P slots. The offset may be applied to a frame boundary. That is, if the offset is O slots, a period of the P slots from slot O of every frame may be applied. That is, the gNB DL QCL is repeated in the next {slot O+P, slot O+P+1, . . . , slot O+2*P−1} during the P slots of {slot O, slot O+1, . . . , slot O+P−1}. For convenience of explanation, it is assumed in the disclosure that O=0;
- Indexes of respective QCLs of the P slots according to the period (gNB DL QCL indexes or Repeater DL QCL indexes). For example, if P=8, indexes [i_1, i_2, i_3, . . . , i_8] of the 8 gNB DL QCLs may be configured; and
- Semi-static QCL period/Flexible QCL period. Bits corresponding to the indexes may indicate whether P slots according to a period are included in the semi-static QCL period or the flexible QCL period. For example, a most significant bit (MSB) in a bitmap having a length of P may indicate whether the first slot of a period is included in the semi-static QCL period or the flexible QCL period and a least significant bit (LSB) in a bitmap having a length of P may indicate whether the last slot of a period is included in the semi-static QCL period or the flexible QCL period. If a value of a bit is a first value (one of 0 or 1), the slot may be included in the semi-static QCL period, and, if a value of a bit is a second value (a value different from the first value), the slot may be included in the flexible QCL period.

Figure 16:
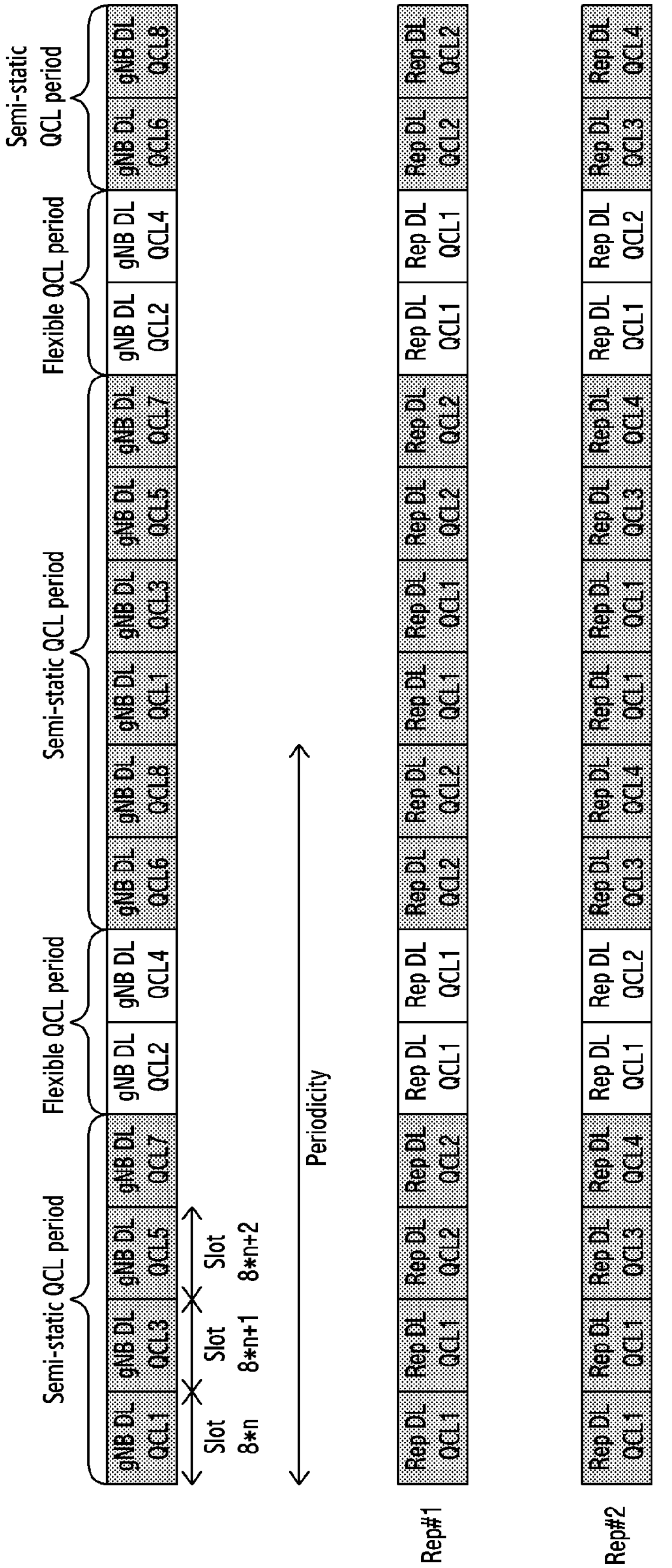
FIG. 16 illustrates a semi-static QCL period and a flexible QCL period according to an embodiment of the present disclosure.

FIG. 16 illustrates a semi-static QCL period and a flexible QCL period according to an embodiment of the present disclosure.

Referring to FIG. 16, a case in which a period of 8 slots, an offset of 0 slot, and gNB DL QCL indexes [1, 3, 5, 7, 2, 4, 6, 8] are configured is illustrated. Herein, it is assumed that a repeater 1 (Rep #1) and a repeater 2 (Rep #2) are operated according to the gNB-Repeater QCL mapper of FIG. 14. The base station may additionally configure the semi-static QCL period and the flexible QCL period. For example, [00001100] may be configured. Herein, 0 may indicate the semi-static QCL period and 1 may indicate the flexible QCL period. That is, the fifth and sixth slots in the period may be the flexible QCL period, and the other slots may be the semi-static QCL period. Accordingly, the repeater may operate on the assumption that the first, second, third, fourth, seventh, eighth slots in the period are configured gNB DL QCL indexes. However, when the repeater receives RCI through the fifth, sixth slots in the period, the repeater may operate on the assumption of gNB DL QCL index indicated by the RCI. In addition, when the repeater fails to receive a group-common PDCCH including RCI, the repeater may operation on the assumption of the configured gNB DL QCL indexes.

Timer based fall back

The base station may configure a timer for the repeater. When the timer is configured, the repeater may decrease by 1 from an initial value every predetermined time. The initial value of the timer may be configured by the base station.

The timer may be initialized to the initial value when the repeater correctly receives RCI.

When the timer reaches 0, the terminal may determine that the terminal may not receive RCI anymore, and may perform at least one of the following operations.

In a first operation, the repeater may not monitor to receive a group-common PDCCH including RCI anymore. That is, the repeater may not determine a Rep DL QCL based on RCI anymore.

In a second operation, the repeater may not transmit in an amplify-forward method anymore. That is, the repeater stops further transmitting.

In a third operation, the repeater may transmit in an amplify-forward method according to a default Rep DL QCL. Herein, a method of determining the default Rep DL QCL may be one of the above-described methods.

In a fourth operation, the repeater may transmit information regarding timer expire to the base station. To achieve this, the base station may configure a channel for transmitting the timer expire information for the repeater. The channel may be one of PRACHs, and may be one of PUCCHs for transmitting a scheduling request (SR). The base station may know information on the timer expire of the repeater by receiving a PRACH or a PUCCH for transmitting an SR.

When the base station receives the timer expire information, the base station may newly configure a CORESET of a new group common PDCCH, a search space, in order to transmit RCI to the repeater. The terminal may initialize the timer upon receiving a configuration of new information.

Figure 17:
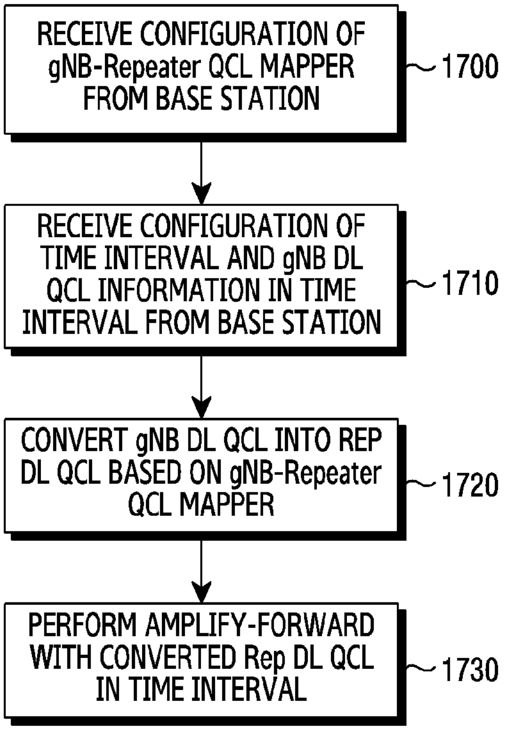
FIG. 17 illustrates operations of a repeater without receiving RCI according to an embodiment of the present disclosure.
Figure 18:
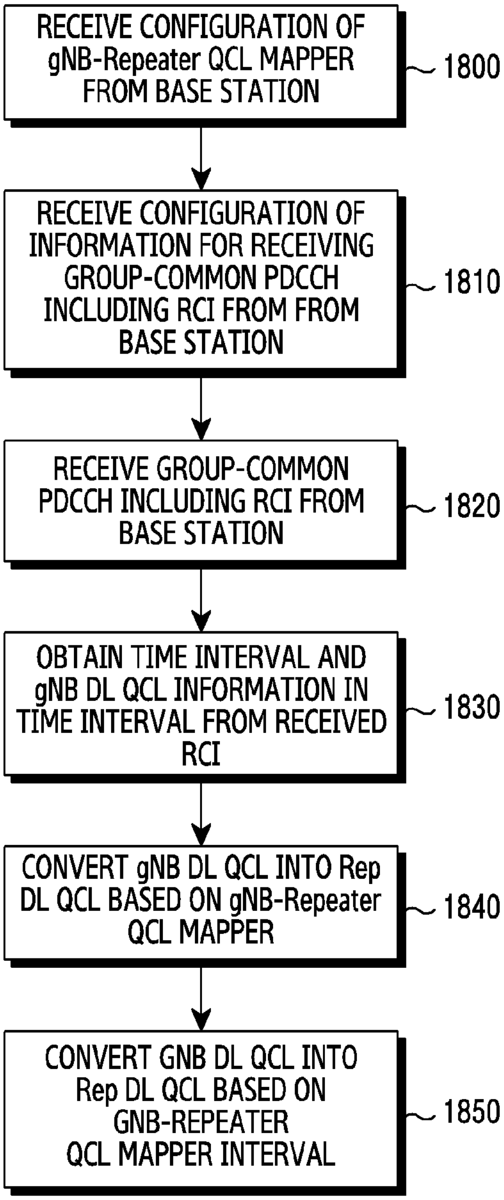
FIG. 18 illustrates operations performed according to RCI reception according to an embodiment of the present disclosure.

A preferred sequence diagram of the repeater according to the disclosure is illustrated in FIG. 17 or 18.

FIG. 17 illustrates operations of the repeater without receiving RCI according to an embodiment of the present disclosure.

Referring to FIG. 17, the repeater may perform the following steps without receiving RCI.

At a first step 1700, the repeater may receive a configuration of a gNB-Repeater QCL mapper from the base station.

At a second step 1710, the repeater may receive a configuration of a time interval and gNB DL QCL information in the time interval from the base station.

At a third step 1720, the repeater may convert a gNB DL QCL into a Rep DL QCL based on the gNB-Repeater QCL mapper. If the gNB-Repeater QCL mapper is one-to-many mapping, the repeater may determine one Rep DL QCL through an additional indicator.

At a fourth step 1730, the repeater may perform amplify-forward with the Rep DL QCL determined at the third step in the time interval configured at the second step.

FIG. 18 illustrates operations performed according to RCI reception according to an embodiment of the present disclosure.

Referring to FIG. 18, the repeater may perform the following steps through reception of RCI.

At a first step 1800, the repeater may receive a configuration of a gNB-Repeater QCL mapper from the base station.

At a second step 1810, the repeater may receive a configuration of information for receiving a group-common PDCCH including RCI from the base station.

At a third step 1820, the repeater may receive a group-common PDCCH including RCI from the base station.

At a fourth step 1830, the repeater may acquire a time interval and gNB DL QCL information in the time interval from the received RCI.

At a fifth step 1840, the repeater may convert a gNB DL QCL into a Rep DL QCL based on the gNB-Repeater QCL mapper.

At a sixth step 1850, the repeater may perform amplify-forward with the Rep DL QCL determined at the fifth step in the time interval received from the RCI at the fourth step.

Figure 19:
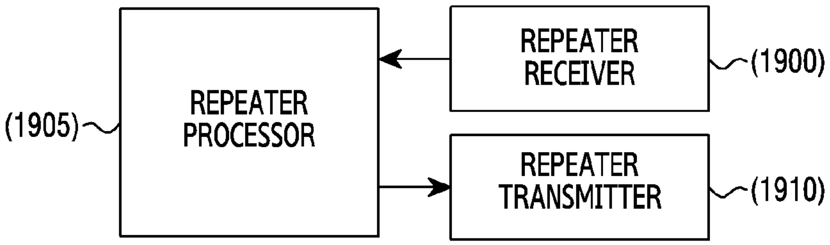
FIG. 19 illustrates a structure of a repeater in a wireless communication system according to an embodiment of the present disclosure.

FIG. 19 illustrates a structure of a repeater in a wireless communication system according to an embodiment of the present disclosure.

Referring to FIG. 19, the repeater may include a transceiver which refers to a repeater receiver 1900 and a repeater transmitter 1910, a memory (not shown), and a repeater processor 1905 (or a repeater controller or a processor). The transceiver 1900, 1910, the memory, and the repeater processor 1905 of the repeater may operate according to the above-described communication method of the repeater. However, the components of the repeater are not limited to the above-described example. For example, the repeater may include more components or fewer components than the components described above. In addition, the transceiver, the memory, and the processor may be implemented in the form of a single chip.

The transceiver 1900, 1910 may transceive a signal with a base station and a terminal. Herein, the signal may include control information and data. To achieve this, the transceiver 1900, 1910 may include a radio frequency (RF) transmitter to up-convert and amplify a frequency of a signal to be transmitted, and an RF receiver to low-noise amplify a received signal and down-convert a frequency. However, these are merely an example of the transceiver 1900, 1910, and components of the transceiver 1900, 1910 are not limited to the RF transmitter and the RF receiver.

In addition, the transceiver 1900, 1910 may receive a signal through a wireless channel and output the signal to the repeater processor 1905, and may transmit a signal outputted from the repeater processor 1905 through a wireless channel.

The memory may store a program necessary for operations of the repeater, and data. In addition, the memory may store control information or data included in a signal transceived by the repeater. The memory may be configured by a storage medium such as a read only memory (ROM), a random access memory (RAM), a hard disk, a compact disc (CD)-ROM, and a digital versatile disc (DVD), or a combination of the storage media. In addition, the memory may be plural in number.

In addition, the repeater processor 1905 may control a series of processes to allow the repeater to operate according to the above-described embodiments. For example, the repeater processor 1905 may control components of the repeater to receive DCI comprised of two layers and to receive a plurality of PDSCHs simultaneously. The repeater processor 1905 may include a plurality of processors, and the processor may control the components of the repeater by executing a program stored in the memory.

Figure 20:
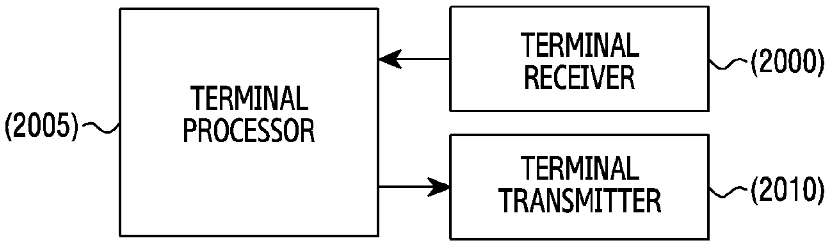
FIG. 20 illustrates a structure of a terminal in a wireless communication system according to an embodiment of the present disclosure.

FIG. 20 illustrates a structure of a terminal in a wireless communication system according to an embodiment of the present disclosure.

Referring to FIG. 20, the repeater may include a transceiver which refers to a terminal receiver 2000 and a terminal transmitter 2010, a memory (not shown), and a terminal processor 2005 (or a terminal controller or a processor). The transceiver 2000, 2010, the memory, and the terminal processor 2005 of the terminal may operate according to the above-described communication method of the terminal. However, the components of the terminal are not limited to the above-described example. For example, the terminal may include more components or fewer components than the components described above. In addition, the transceiver, the memory, and the processor may be implemented in the form of a single chip.

The transceiver 2000, 2010 may transceive a signal with a base station and a repeater. Herein, the signal may include control information and data. To achieve this, the transceiver 2000, 2010 may include an RF transmitter to up-convert and amplify a frequency of a signal to be transmitted, and an RF receiver to low-noise amplify a received signal and down-convert a frequency. However, these are merely an example of the transceiver 2000, 2010, and components of the transceiver 2000, 2010 are not limited to the RF transmitter and the RF receiver.

In addition, the transceiver 2000, 2010 may receive a signal through a wireless channel and output the signal to the terminal processor 2005, and may transmit a signal outputted from the terminal processor 2005 through a wireless channel.

The memory may store a program necessary for operations of the terminal, and data. In addition, the memory may store control information or data included in a signal transceived by the terminal. The memory may be configured by a storage medium such as a ROM, a RAM, a hard disk, a CD-ROM, and a DVD, or a combination of the storage media. In addition, the memory may be plural in number.

In addition, the terminal processor 2005 may control a series of processes to allow the terminal to operate according to the above-described embodiments. For example, the terminal processor 2005 may control components of the terminal to receive DCI comprised of two layers and to receive a plurality of PDSCHs simultaneously. The terminal processor 1905 may include a plurality of processors, and the processor may control the components of the terminal by executing a program stored in the memory.

Figure 21:
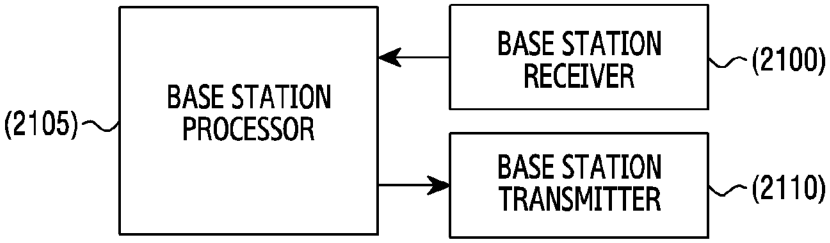
FIG. 21 illustrates a structure of a base station in a wireless communication system according to an embodiment of the present disclosure.

FIG. 21 illustrates a structure of a base station in a wireless communication system according to an embodiment of the present disclosure.

Referring to FIG. 21, the base station may include a transceiver which refers to a base station receiver 2100 and a base station transmitter 2110, a memory (not shown), and a base station processor 2105 (or a base station controller or a processor). The transceiver 2100, 2110, the memory, and the base station processor 2105 of the base station may operate according to the above-described communication method of the base station. However, the components of the base station are not limited to the above-described example. For example, the base station may include more components or fewer components than the components described above. In addition, the transceiver, the memory, and the processor may be implemented in the form of a single chip.

The transceiver 2100, 2110 may transceive a signal with a terminal and a repeater. Herein, the signal may include control information and data. To achieve this, the transceiver 2100, 2110 may include an RF transmitter to up-convert and amplify a frequency of a signal to be transmitted, and an RF receiver to low-noise amplify a received signal and down-convert a frequency. However, these are merely an example of the transceiver 2100, 2110, and components of the transceiver 2100, 2110 are not limited to the RF transmitter and the RF receiver.

In addition, the transceiver 2100, 2110 may receive a signal through a wireless channel and output the signal to the base station processor 2105, and may transmit a signal outputted from the base station processor 2105 through a wireless channel.

The memory may store a program necessary for operations of the base station, and data. In addition, the memory may store control information or data included in a signal transceived by the base station. The memory may be configured by a storage medium such as a ROM, a RAM, a hard disk, a CD-ROM, and a DVD, or a combination of the storage media. In addition, the memory may be plural in number.

In addition, the base station processor 2105 may control a series of processes to allow the base station to operate according to the above-described embodiments. For example, the base station processor 2105 may control respective components of the base station to constitute DCI of two layers including allocation information regarding a plurality of PDSCHs, and to transmit the DCI. The base station processor 2105 may include a plurality of processors, and the processor may control the components of the base station by executing a program stored in the memory.

According to embodiments of the disclosure, a service may be effectively provided in a wireless communication system.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EE-PROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

Embodiments of the disclosure disclosed in the specification and the drawings provides specific examples for easy explanation of the technical features of the disclosure and for easy understanding of the disclosure, and do not limit the scope of the disclosure. That is, it is obvious to a person skilled in the art that other variations based on the technical concept of the disclosure are possible. In addition, the above-described embodiments may be operated in combination when necessary. For example, the base station and the terminal may operate in combination of an embodiment of the disclosure and some of other embodiments. For example, the base station and the terminal may operate in combination of a part of the first embodiment and a part of the second embodiment. In addition, the above-described embodiments have been provided with reference to an FDD LTE system, but other variations based on the technical concept of the above-described embodiments may also be embodied in other systems such as a TDD LTE system, a 5G or NR system.

An order of explanation on the drawings describing the methods of the disclosure does not necessarily correspond to an order of execution, and the order of operations may be changed or operations may be performed in parallel.

In addition, the drawings describing the methods of the disclosure may omit some components or may include only some component without departing from the essence of the disclosure.

In addition, the methods of the disclosure may be executed in combination of a part or all of the contents included in the respective embodiments without departing from the essence of the disclosure.

Various embodiments of the disclosure have been described. Explanations of the disclosure described above are merely examples, and embodiments of the disclosure are not limited to the embodiment disclosed herein. It will be understood by a person skilled in the art that changes can be easily made to other specific forms without changing the technical concept or essential features of the disclosure. The scope of the disclosure should be defined not by the detailed descriptions but by the appended claims, and all changes or changed forms derived from the meanings and scope of the claims and a concept equivalent thereto should be interpreted as being included in the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a repeater in a wireless communication system, the method comprising:

receiving, from a base station via a higher layer signaling, configuration information for a transmission on an access link, the configuration information including a first beam index;

receiving, from the base station via physical downlink control channel (PDCCH), control information indicating a second beam index;

performing the transmission on the access link with a user equipment (UE) based on the second beam index, in case that the configuration information does not include a value; and performing the transmission on the access link with the UE based on the first beam index, in case that the configuration information includes the value.

2. The method of claim 1, wherein the first beam index or the second beam index for the transmission or the receptions on the access link with the UE is identified when a first time interval corresponding to the first beam index overlaps a second time interval corresponding to the second beam index.

3. The method of claim 1, wherein the configuration information includes information on periodicity and offset for the transmission on the access link.

4. The method of claim 1, wherein the configuration information further includes information on subcarrier spacing.

5. The method of claim 1, further comprising:

receiving, from the base station, medium access control (MAC) control element (CE) indicating to change the first beam index, and applying the change after a predetermined time from transmitting hybrid automatic repeat request (HARQ)-acknowledgement (ACK) information.

6. A method of a base station in a wireless communication system, the method comprising:

transmitting, to a repeater via a higher layer signaling, configuration information for a transmission on an access link, the configuration information including a first beam index; and transmitting, to the repeater via physical downlink control channel (PDCCH), control information indicating a second beam index, wherein the repeater performs the transmission on the access link with a user equipment (UE) based on the second beam index, in case that the configuration information does not include a value, and wherein the repeater performs the transmission or on the access link with the UE based on the first beam index, in case that the configuration information includes the value.

7. The method of claim 6, wherein the first beam index or the second beam index for the transmission or the receptions on the access link with the UE is identified when a first time interval corresponding to the first beam index overlaps a second time interval corresponding to the second beam index.

8. The method of claim 6, wherein the configuration information includes information on periodicity and offset for the transmission on the access link.

9. The method of claim 6, wherein the configuration information further includes information on subcarrier spacing.

10. The method of claim 6, further comprising:

transmitting, to the repeater, medium access control (MAC) control element (CE) indicating to change the first beam index, wherein the repeater applies the change after a predetermined time from transmitting hybrid automatic repeat request (HARQ)-acknowledgement (ACK) information.

11. A repeater in a wireless communication system, the repeater comprising:

a transceiver; and at least one controller coupled to the transceiver, the at least one controller configured to:

receive, from a base station via a higher layer signaling, configuration information for a transmission on an access link, the configuration information including a first beam index, receive, from the base station via physical downlink control channel (PDCCH), control information indicating a second beam index, perform the transmission on the access link with a user equipment (UE) based on the second beam index, in case that the configuration information does not include a value, and perform the transmission on the access link with the UE based on the first beam index, in case that the configuration information includes the value.

12. The repeater of claim 11, wherein the first beam index or the second beam index for the transmission on the access link with the UE is identified when a first time interval corresponding to the first beam index overlaps a second time interval corresponding to the second beam index.

13. The repeater of claim 11, wherein the configuration information includes information on periodicity and offset for the transmission on the access link.

14. The repeater of claim 11, wherein the configuration information further includes information on subcarrier spacing.

15. The repeater of claim 11, wherein the at least one controller is further configured to:

receive, from the base station, medium access control (MAC) control element (CE) indicating to change the first beam index, and apply the change after a predetermined time from transmitting hybrid automatic repeat request (HARQ)-acknowledgement (ACK) information.

16. A base station in a wireless communication system, the base station comprising:

a transceiver; and at least one controller coupled to the transceiver, the at least one controller configured to:

transmit, to a repeater via a higher layer signaling, configuration information for a transmission on an access link, the configuration information including a first beam index, transmit, to a repeater via physical downlink control channel (PDCCH), control information indicating a second beam index, and wherein the repeater performs the transmission on the access link with a user equipment (UE) based on the second beam index, in case that the configuration information does not include a value, and wherein the repeater performs the transmission on the access link with the UE based on the first beam index, in case that the configuration information includes the value.

17. The base station of claim 16, wherein the first beam index or the second beam index for the transmission or the receptions on the access link with the UE is identified when a first time interval corresponding to the first beam index overlaps a second time interval corresponding to the second beam index.

18. The base station of claim 16, wherein the configuration information includes information on periodicity and offset for the transmission on the access link.

19. The base station of claim 16, wherein the configuration information further includes information on subcarrier spacing.

20. The base station of claim 16, wherein the at least one controller is further configured to:

transmit, to the repeater, medium access control (MAC) control element (CE) indicating to change the first beam index, wherein the repeater applies the change after a predetermined time from transmitting hybrid automatic repeat request (HARQ)-acknowledgement (ACK) information.

* * * * *